(12) United States Patent
LeTourneau

(10) Patent No.: US 10,394,785 B2
(45) Date of Patent: *Aug. 27, 2019

(54) METHOD AND/OR SYSTEM FOR TRANSFORMING BETWEEN TREES AND ARRAYS

(71) Applicant: Robert T. and Virginia T. Jenkins as Trustees for the Jenkins Family Trust Dated February 8, 2002, Sacramento, CA (US)

(72) Inventor: Jack J. LeTourneau, Santa Barbara, CA (US)

(73) Assignee: Robert T. and Virginia T. Jenkins, Sacramento, CA (US), as Trustees of the Jenkins Family Trust Dated Feb. 8, 2002

( * ) Notice: Subject to any disclaimer, the term of this patent is extended or adjusted under 35 U.S.C. 154(b) by 564 days.

This patent is subject to a terminal disclaimer.

(21) Appl. No.: 14/641,735

(22) Filed: Mar. 9, 2015

(65) Prior Publication Data

US 2015/0310048 A1    Oct. 29, 2015

Related U.S. Application Data

(63) Continuation of application No. 13/625,812, filed on Sep. 24, 2012, now Pat. No. 9,020,961, which is a continuation of application No. 11/385,257, filed on Mar. 20, 2006, now Pat. No. 8,356,040.

(60) Provisional application No. 60/667,448, filed on Mar. 31, 2005.

(51) Int. Cl.
*G06F 16/17* (2019.01)
*G06F 16/22* (2019.01)
*G06F 16/901* (2019.01)
*G06F 16/31* (2019.01)
*G06F 16/174* (2019.01)

(52) U.S. Cl.
CPC ...... *G06F 16/2272* (2019.01); *G06F 16/2246* (2019.01); *G06F 16/322* (2019.01); *G06F 16/9027* (2019.01); *G06F 16/1744* (2019.01)

(58) Field of Classification Search
CPC ................. G06F 17/30327; G06F 16/1744
See application file for complete search history.

(56) References Cited

U.S. PATENT DOCUMENTS

| | | |
|---|---|---|
| 3,201,701 A | 8/1965 | Maitra |
| 3,704,345 A | 11/1972 | Coker |
| 4,001,951 A | 1/1977 | Fasse |
| 4,134,218 A | 1/1979 | Adams et al. |
| 4,156,910 A | 5/1979 | Barton et al. |
| 4,286,330 A | 8/1981 | Isaacson |
| 4,439,162 A | 3/1984 | Blaine |
| 4,677,550 A | 6/1987 | Ferguson |

(Continued)

OTHER PUBLICATIONS

Katajainen et al., Tree Compression and Optimization with Applications, International Journal of Foundations of Computer Science vol. 1 No. 4 (1990), 425-447.*

(Continued)

*Primary Examiner* — Brittany N Allen
(74) *Attorney, Agent, or Firm* — Berkeley Law & Technology Group, LLP

(57) ABSTRACT

Embodiments of articles, apparatuses, devices and/or systems for manipulating hierarchical sets of data are disclosed.

24 Claims, 27 Drawing Sheets

(56) References Cited

U.S. PATENT DOCUMENTS

| | | |
|---|---|---|
| 4,737,109 A | 4/1988 | Abramson |
| 4,745,561 A | 5/1988 | Hirosawa et al. |
| 4,751,684 A | 6/1988 | Holt |
| 4,831,525 A | 5/1989 | Saito et al. |
| 4,867,686 A | 9/1989 | Goldstein |
| 4,931,928 A | 6/1990 | Greenfeld |
| 4,949,388 A | 8/1990 | Bhaskaran |
| 4,989,132 A | 1/1991 | Mellender et al. |
| 4,991,087 A | 2/1991 | Burkowski et al. |
| 5,021,943 A | 6/1991 | Grimes |
| 5,021,992 A | 6/1991 | Kondo |
| 5,050,071 A | 9/1991 | Harris et al. |
| 5,191,522 A | 3/1993 | Bosco et al. |
| 5,235,701 A | 8/1993 | Ohler et al. |
| 5,265,245 A | 11/1993 | Nordstrom et al. |
| 5,295,261 A | 3/1994 | Simonetti |
| 5,325,531 A | 6/1994 | McKeeman |
| 5,335,320 A | 8/1994 | Iwata |
| 5,335,345 A | 8/1994 | Frieder et al. |
| 5,355,496 A | 10/1994 | Fant et al. |
| 5,463,777 A | 10/1995 | Bialkowski et al. |
| 5,493,504 A | 2/1996 | Minato |
| 5,493,678 A | 2/1996 | Arcuri |
| 5,497,500 A | 3/1996 | Rogers et al. |
| 5,509,088 A | 4/1996 | Robson |
| 5,519,627 A | 5/1996 | Mahmood et al. |
| 5,522,068 A | 5/1996 | Berkowitz |
| 5,577,253 A | 11/1996 | Blickstein |
| 5,598,350 A | 1/1997 | Kawanishi et al. |
| 5,606,669 A | 2/1997 | Bertin et al. |
| 5,636,155 A | 6/1997 | Kabuo |
| 5,687,362 A | 11/1997 | Bhargava et al. |
| 5,706,406 A | 1/1998 | Pollock |
| 5,724,512 A | 3/1998 | Winterbottom |
| 5,724,576 A | 3/1998 | Letourneau |
| 5,748,975 A | 5/1998 | Van De Vanter |
| 5,758,152 A | 5/1998 | LeTourneau |
| 5,778,354 A | 7/1998 | Leslie |
| 5,778,371 A | 7/1998 | Fujihara |
| 5,781,906 A | 7/1998 | Aggarwal et al. |
| 5,787,415 A | 7/1998 | Jacobson et al. |
| 5,787,432 A | 7/1998 | Letourneau |
| 5,796,356 A | 8/1998 | Okada et al. |
| 5,802,370 A | 9/1998 | Sitbon et al. |
| 5,822,593 A | 10/1998 | Lamping et al. |
| 5,826,262 A | 10/1998 | Bui |
| 5,848,159 A | 12/1998 | Collins et al. |
| 5,905,138 A | 5/1999 | Van Broekhoven |
| 5,930,805 A | 7/1999 | Marquis |
| 5,937,181 A | 8/1999 | Godefroid |
| 5,970,490 A | 10/1999 | Morgenstern |
| 5,978,790 A | 11/1999 | Buneman et al. |
| 5,987,449 A | 11/1999 | Suciu |
| 5,999,926 A | 12/1999 | Suciu |
| 6,002,879 A | 12/1999 | Radigan et al. |
| 6,003,033 A | 12/1999 | Amano et al. |
| 6,022,879 A | 2/2000 | Crow et al. |
| 6,028,987 A | 2/2000 | Hirairi |
| 6,055,537 A | 4/2000 | LeTourneau |
| 6,076,087 A | 6/2000 | Suciu |
| 6,088,691 A | 7/2000 | Bhargava et al. |
| 6,141,655 A | 10/2000 | Johnson et al. |
| 6,199,103 B1 | 3/2001 | Sakuguchi et al. |
| 6,236,410 B1 | 5/2001 | Politis et al. |
| 6,243,859 B1 | 6/2001 | Chen-Kuang |
| 6,279,007 B1 | 8/2001 | Uppala |
| 6,289,354 B1 | 9/2001 | Aggarwal et al. |
| 6,292,938 B1 | 9/2001 | Sarkar et al. |
| 6,314,559 B1 | 11/2001 | Sollich |
| 6,336,812 B1 | 1/2002 | Cooper et al. |
| 6,341,372 B1 | 1/2002 | Datig |
| 6,442,584 B1 | 8/2002 | Kolli et al. |
| 6,446,256 B1 | 9/2002 | Hyman et al. |
| 6,466,240 B1 | 10/2002 | Maslov |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,606,632 B1 | 8/2003 | Saulpaugh et al. |
| 6,606,741 B2 | 8/2003 | Kojima et al. |
| 6,609,130 B1 | 8/2003 | Saulpaugh et al. |
| 6,610,106 B1 | 8/2003 | Jenks |
| 6,611,844 B1 | 8/2003 | Saulpaugh et al. |
| 6,640,218 B1 | 10/2003 | Golding |
| 6,658,649 B1 | 12/2003 | Bates et al. |
| 6,691,301 B2 | 2/2004 | Bowen |
| 6,714,939 B2 | 3/2004 | Saldanha et al. |
| 6,728,953 B1 | 4/2004 | Walster |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,817,865 B2 | 11/2004 | Charbonneau |
| 6,829,695 B1 | 12/2004 | Ross |
| 6,847,979 B2 | 1/2005 | Allemang et al. |
| 6,854,976 B1 | 2/2005 | Suhr |
| 6,874,005 B2 | 3/2005 | Fortenberry et al. |
| 6,880,148 B1 | 4/2005 | Raph |
| 6,965,990 B2 | 11/2005 | Barsness et al. |
| 6,968,330 B2 | 11/2005 | Edwards et al. |
| 6,978,271 B1 | 12/2005 | Hoffman |
| 7,043,555 B1 | 5/2006 | McCain et al. |
| 7,051,033 B2 | 5/2006 | Agarwal et al. |
| 7,072,904 B2 | 7/2006 | Najork et al. |
| 7,103,838 B1 | 9/2006 | Krishnamurthy et al. |
| 7,107,265 B1 | 9/2006 | Calvignac et al. |
| 7,117,196 B2 | 10/2006 | Gaur et al. |
| 7,117,479 B2 | 10/2006 | Van De Vanter |
| 7,127,704 B2 | 10/2006 | Van De Vanter et al. |
| 7,134,075 B2 | 11/2006 | Hind et al. |
| 7,140,006 B2 | 11/2006 | Harrison et al. |
| 7,162,485 B2 | 1/2007 | Gottlob et al. |
| 7,190,376 B1 | 3/2007 | Tonisson |
| 7,191,182 B2 | 3/2007 | Anonsen et al. |
| 7,203,680 B2 | 4/2007 | Parida |
| 7,203,774 B1 | 4/2007 | Zhou et al. |
| 7,287,026 B2 | 10/2007 | Oommen |
| 7,313,563 B2 | 12/2007 | Bordawekar et al. |
| 7,318,215 B1 | 1/2008 | Krishnan et al. |
| 7,337,163 B1 | 2/2008 | Srinivasan |
| 7,356,802 B2 | 4/2008 | de Sutter et al. |
| 7,360,202 B1 | 4/2008 | Seshadri et al. |
| 7,409,673 B2 | 8/2008 | Kuo et al. |
| 7,419,376 B2 | 9/2008 | Sarvazyan et al. |
| 7,437,666 B2 | 10/2008 | Ramarao |
| 7,475,070 B2 | 1/2009 | Fan et al. |
| 7,496,892 B2 | 2/2009 | Nuss |
| 7,512,932 B2 | 3/2009 | Davidov et al. |
| 7,536,675 B2 | 5/2009 | Gallagher |
| 7,536,676 B2 | 5/2009 | Baker |
| 7,544,062 B2 | 6/2009 | Hauschild et al. |
| 7,561,927 B2 | 7/2009 | Oyama et al. |
| 7,571,156 B1 | 8/2009 | Gupta et al. |
| 7,571,169 B2 | 8/2009 | Jones et al. |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | LeTourneau |
| 7,630,995 B2 | 12/2009 | LeTourneau |
| 7,636,727 B2 | 12/2009 | Schiffmann et al. |
| 7,650,592 B2 | 1/2010 | Eckels et al. |
| 7,669,183 B2 | 2/2010 | Bowman et al. |
| 7,681,177 B2 | 3/2010 | LeTourneau |
| 7,761,847 B2 | 7/2010 | Kornerup et al. |
| 7,761,858 B2 | 7/2010 | Chang et al. |
| 7,765,183 B2 | 7/2010 | Williams, Jr. |
| 7,779,396 B2 | 8/2010 | Meijer et al. |
| 7,801,923 B2 | 9/2010 | LeTourneau |
| 7,861,304 B1 | 12/2010 | Nachenberg |
| 7,882,147 B2 | 2/2011 | LeTourneau |
| 7,890,928 B2 | 2/2011 | Patrudu |
| 7,899,821 B1 | 3/2011 | Schiffmann |
| 8,020,145 B2 | 9/2011 | Fant |

(56) References Cited

U.S. PATENT DOCUMENTS

| | | | |
|---|---|---|---|
| 8,032,860 B2 | 10/2011 | Piehler et al. |
| 8,037,102 B2 | 10/2011 | LeTourneau |
| 8,060,868 B2 | 11/2011 | Meijer et al. |
| 8,112,740 B2 | 2/2012 | Meijer et al. |
| 8,151,276 B2 | 4/2012 | Grechanik |
| 8,181,155 B2 | 5/2012 | Pinto et al. |
| 8,230,526 B2 | 7/2012 | Holland et al. |
| 8,250,526 B2 | 8/2012 | Anderson et al. |
| 8,316,059 B1 | 11/2012 | Schiffmann |
| 8,356,040 B2 | 1/2013 | LeTourneau |
| 8,365,137 B2 | 1/2013 | Fant |
| 8,438,534 B2 | 5/2013 | Thomson |
| 8,443,339 B2 | 5/2013 | LeTourneau |
| 8,484,236 B1 | 7/2013 | Andrews |
| 8,626,777 B2 | 1/2014 | LeTourneau |
| 8,650,201 B2 | 2/2014 | Letourneau |
| 8,683,431 B2 | 3/2014 | Thomson et al. |
| 8,762,942 B2 | 6/2014 | Langworthy et al. |
| 8,869,106 B2 | 10/2014 | Jazdzewski |
| 8,990,769 B2 | 3/2015 | LeTourneau |
| 9,002,862 B2 | 4/2015 | Schiffmann |
| 9,020,961 B2 | 4/2015 | LeTourneau |
| 9,043,347 B2 | 5/2015 | LeTourneau |
| 9,077,515 B2 | 7/2015 | LeTourneau |
| 9,330,128 B2 | 5/2016 | Schiffmann |
| 9,411,841 B2 | 8/2016 | Schiffmann |
| 9,425,951 B2 | 8/2016 | LeTourneau |
| 9,430,512 B2 | 8/2016 | LeTourneau |
| 9,563,653 B2 | 2/2017 | LeTourneau |
| 9,646,034 B2 | 5/2017 | Schiffmann |
| 9,646,107 B2 | 5/2017 | LeTourneau |
| 9,842,130 B2 | 12/2017 | Schiffmann |
| 10,055,438 B2 | 8/2018 | Schiffmann |
| 10,068,003 B2 | 9/2018 | Schiffmann |
| 10,255,311 B2 | 4/2019 | LeTourneau |
| 2001/0003211 A1 | 6/2001 | Bera |
| 2001/0037496 A1 | 11/2001 | Simonyi |
| 2002/0040292 A1 | 4/2002 | Marcu |
| 2002/0059281 A1 | 5/2002 | Watanabe et al. |
| 2002/0062259 A1 | 5/2002 | Katz et al. |
| 2002/0091676 A1 | 7/2002 | Agrawal |
| 2002/0107860 A1 | 8/2002 | Gobeille et al. |
| 2002/0129129 A1 | 9/2002 | Bloch et al. |
| 2002/0130796 A1 | 9/2002 | Tsuchido et al. |
| 2002/0130907 A1 | 9/2002 | Chi |
| 2002/0133347 A1 | 9/2002 | Schoneburg |
| 2002/0133497 A1 | 9/2002 | Draper et al. |
| 2002/0149604 A1 | 10/2002 | Wilkinson |
| 2002/0169563 A1 | 11/2002 | de Carvalho Ferreira |
| 2002/0194163 A1 | 12/2002 | Hopeman |
| 2003/0041088 A1 | 2/2003 | Wilson et al. |
| 2003/0065659 A1 | 4/2003 | Agarwal et al. |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su et al. |
| 2003/0195885 A1 | 10/2003 | Emmick et al. |
| 2003/0195890 A1 | 10/2003 | Oommen |
| 2003/0236794 A1 | 12/2003 | Hostetter et al. |
| 2004/0010752 A1 | 1/2004 | Chan et al. |
| 2004/0019599 A1 | 1/2004 | Trappen |
| 2004/0024724 A1 | 2/2004 | Rubin |
| 2004/0024790 A1 | 2/2004 | Everett |
| 2004/0044659 A1 | 3/2004 | Judd et al. |
| 2004/0054692 A1 | 3/2004 | Seyrat et al. |
| 2004/0060006 A1 | 3/2004 | Lindblad |
| 2004/0060007 A1 | 3/2004 | Gottlob et al. |
| 2004/0068498 A1 | 4/2004 | Patchet et al. |
| 2004/0075677 A1 | 4/2004 | Loyall |
| 2004/0103105 A1 | 5/2004 | Lindblad et al. |
| 2004/0122844 A1 | 6/2004 | Malloy |
| 2004/0125124 A1 | 7/2004 | Kim |
| 2004/0160464 A1 | 8/2004 | Reyna |
| 2004/0205047 A1 | 10/2004 | Carpenter |
| 2004/0215642 A1 | 10/2004 | Cameron et al. |
| 2004/0239674 A1 | 12/2004 | Ewald et al. |
| 2004/0254909 A1 | 12/2004 | Testa |
| 2004/0260683 A1 | 12/2004 | Chan et al. |
| 2004/0260684 A1 | 12/2004 | Agrawal et al. |
| 2004/0268236 A1 | 12/2004 | Childlovskii et al. |
| 2005/0021548 A1 | 1/2005 | Bohannon et al. |
| 2005/0023524 A1 | 2/2005 | Beatty |
| 2005/0027495 A1 | 2/2005 | Matichuk |
| 2005/0027743 A1 | 2/2005 | O'Neil et al. |
| 2005/0028091 A1 | 2/2005 | Bordawekar |
| 2005/0050016 A1 | 3/2005 | Stanoi et al. |
| 2005/0050066 A1 | 3/2005 | Hughes |
| 2005/0058976 A1 | 3/2005 | Vernon |
| 2005/0060332 A1 | 3/2005 | Bernstein et al. |
| 2005/0065964 A1 | 3/2005 | Ziemann et al. |
| 2005/0097084 A1 | 5/2005 | Balmin |
| 2005/0125432 A1 | 6/2005 | Lin et al. |
| 2005/0138073 A1 | 6/2005 | Zhou et al. |
| 2005/0149471 A1* | 7/2005 | Lassalle ............ G06F 17/30625 |
| 2005/0154265 A1 | 7/2005 | Miro et al. |
| 2005/0154979 A1 | 7/2005 | Chidlovskii et al. |
| 2005/0156761 A1 | 7/2005 | Oh |
| 2005/0165732 A1 | 7/2005 | Burges |
| 2005/0187900 A1 | 8/2005 | LeTourneau |
| 2005/0214727 A1 | 9/2005 | Stoianovici et al. |
| 2005/0216445 A1 | 9/2005 | Rao |
| 2005/0267908 A1 | 12/2005 | LeTourneau |
| 2005/0286788 A1 | 12/2005 | Orr |
| 2006/0004817 A1 | 1/2006 | Andrews |
| 2006/0005122 A1 | 1/2006 | Lemoine |
| 2006/0015538 A1 | 1/2006 | LeTourneau |
| 2006/0053122 A1 | 3/2006 | Korn et al. |
| 2006/0074838 A1 | 4/2006 | Srivastava |
| 2006/0095442 A1 | 5/2006 | LeTourneau |
| 2006/0095455 A1 | 5/2006 | LeTourneau |
| 2006/0123029 A1 | 6/2006 | LeTourneau |
| 2006/0129582 A1 | 6/2006 | Schiffmann et al. |
| 2006/0209351 A1 | 9/2006 | Saito et al. |
| 2006/0259533 A1 | 11/2006 | LeTourneau |
| 2006/0271573 A1 | 11/2006 | LeTourneau |
| 2007/0003917 A1 | 1/2007 | Kitching et al. |
| 2007/0198538 A1 | 8/2007 | Palacios |
| 2008/0270435 A1 | 10/2008 | Furusho |
| 2008/0313196 A1 | 10/2008 | Furusho |
| 2010/0094885 A1 | 4/2010 | LeTourneau |
| 2010/0094908 A1 | 4/2010 | LeTourneau |
| 2010/0114969 A1 | 4/2010 | LeTourneau |
| 2010/0191775 A1 | 7/2010 | Schiffmann et al. |
| 2010/0205581 A1 | 8/2010 | LeTourneau |
| 2012/0144388 A1 | 6/2012 | Schiffmann |
| 2016/0162528 A1 | 6/2016 | LeTourneau |

OTHER PUBLICATIONS

Borodin et al., A Tradeoff Between Search and Update Time for the Implicit Dictionary Problem, Theoretical Computer Science 58 (1988) 57-68.*
U.S. Appl. No. 11/412,417, filed Apr. 26, 2006, Schiffmann.
U.S. Appl. No. 11/480,094, filed Apr. 26, 2006, LeTourneau, J.J.
U.S. Appl. No. 12/627,816, filed Nov. 30, 2009, Schiffmann.
U.S. Appl. No. 12/702,243, filed Feb. 8, 2010, LeTourneau, J.J.
U.S. Appl. No. 12/830,236, filed Jul. 2, 2010, LeTourneau, J.J.
"Core Technology Benchmarks a White Paper", Jul. 2002, downloaded from the internet Mar. 2, 2004.
"Origin Data, Inc. White Paper", © 1999, pp. 1-13.
"The Associative Model of Data White Paper", Lazy Software, Ltd., 2000.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Alderson et al., "Toward an Optimization Driven Framework for Designing and Generating Realistic Internet Topologies" ACM SIGCOMM Computer Communications Review 41, vol. 33, No. 1, pp. 41-46, 2003.

(56) References Cited

OTHER PUBLICATIONS

Apostol, "A Centennial History of the Prime Number Theorem", Engineering and Science, No. 4, 1996.
Benedikt et al., "Definable Relations and First-Order Query Languages over Strings" Journal of the ACM, vol. 50, No. 5, pp. 694-751, 2003.
Cano et al., "Lazy Evaluation in Penniless Propagation over Join Trees", Networks, vol. 39(4), 2002 Wiley Periodicals, Inc., 175-185, 2002.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.
Cooper et al., "*Oh! Pascal!*", 1982, W.W. Norton & Company, Inc., Chapter 12, Arrays for Random Access, pp. 295-327.
Dubiner, M., Galil, Z., and Magen, E. "Faster Tree Pattern Matching.", Journal of the Association for Computing Machinery, vol. 41, No. 2, Mar. 1994, pp. 205-213.
Durango Bill's Enumeration of Trees. http://web.archive.org/web/20021028184112/http://www.durangobill.com/Trees.html, 1998.
Er, M.C., "Enumerating Ordered Trees Lexicographically", The Computation Journal, vol. 28, Issue 5, pp. 538-542, 1985.
Google search (Kleene prime enumeration operation natural numerals sequences "Kleene prime") conducted by Examiner on Jul. 18, 2009, 2 pages.
Google Search (Kleene prime enumeration operation natural numerals sequences "enumeration operation") conducted by Examiner on Jul. 18, 2009, 2 pages.
Google Search (Kleene prime enumeration operation) conducted by Examiner on Jul. 18, 2009, 2 pages.
Hoffman et al., "Pattern Matching in Trees", Purdue University, Jan. 1982, Journal for the Association for Computing Machinery, vol. 29, Issue 1, pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Johnston et al. Advances in Dataflow Programming Languages, ACM Computing Surveys, vol. 36, No. 1, pp. 1-34, 2004.
Kharbutli et al., "Using Prime Numbers for Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Letourneau, "The Elementary Theory of Object Oriented Arithmetic", pp. 1-9, Apr. 1990.
Malhotra et al, "A Methodology for Formal Expression of Hierarchy in Model Solution", IEEE, pp. 258-267,1983.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Ramesh, R. and Ramakrishnan, I.V., "Nonlinear Pattern Matching in Trees." Journal of the Association for Computer Machinery, vol. 39, No. 2. Apr. 1992, pp. 295-316.
Reiss, "Semantics-Based Code Search", IEEE ICSE, pp. 243-253, 2009.
Sechrest et al., "Blending Hierarchical and Attribute-Based File Naming", Distributed Computing System, 1992, Proceedings of the 12th International Conference on Jun. 9-12, 1992, pp. 572-580.
Shanmugasundaram et al., "Querying SML Views of Relational Data", Proceedings of the 27th VLDB Conference, Roma, Italy, 2001, 9 pages.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer-Verlag Berlin Heidelberg, © 1991, Arithmetic Encoding, The Cantor Pairing Function, pp. 14-23, and 305.
Somani et al., "Phased-Mission System Analysis Using Boolean Algebraic Methods", May 1994, ACM Press, vol. 22, Issue 1.
Sproat et al., "Compilation of Weighted Finite-State Tranducers from Decision Trees" ACM, pp. 215-222, 1996.
Stanat, D.F., and McAllister, D.F., "Discrete Mathematics in Computer Science", Prentice-Hall, 1977, Binary Relations, Ch. 3, Sec. 3.2, Trees, p. 131-145.
Talukdar, "Learning to Create Data-Integrating Queries", ACM PVLDB, pp. 785-796, 2008.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Wu, "A Prime Number Labeling Scheme for Dynamic Ordered XML Trees", IEEE, 2004, 13 pages.
Zaks, S., "Lexicographic Generation of Ordered Trees", Dept. of Computer Science, University of Illinois, The Journal of Theoretical Computer Science, vol. 10(1), pp. 63-82, Revised 1978.
U.S. Appl. No. 11/005,859 / Application filed Dec. 6, 2004, 120 pages.
U.S. Appl. No. 11/005,859 / Notice to File Missing parts dated Jan. 10, 2005, 2 pages.
U.S. Appl. No. 11/005,859 / Response to Notice to File Missing parts dated Apr. 1, 2005, 9 pages.
U.S. Appl. No. 11/005,859 / Preliminary Amendment filed Apr. 28, 2005, 193 pages.
U.S. Appl. No. 11/005,859 / Office Action—Restriction Requirement dated Dec. 12, 2007, 7 pages.
U.S. Appl. No. 11/005,859 / Response to Office Action—Restriction Requirement filed Jan. 14, 2008, 82 pages.
U.S. Appl. No. 11/005,859 / Non-final Office Action dated Mar. 21, 2008, 10 pages.
U.S. Appl. No. 11/005,859 / Amendment filed Jul. 21, 2008, 86 pages.
U.S. Appl. No. 11/005,859 / Final Office Action dated Oct. 30, 2008, 14 pages.
U.S. Appl. No. 11/005,859 / Amendment filed Dec. 30, 2008, 83 pages.
U.S. Appl. No. 11/005,859 / Advisory Action dated Jan. 13, 2009, 4 pages.
U.S. Appl. No. 11/005,859 / RCE with amendment filed Apr. 30, 2009, 86 pages.
U.S. Appl. No. 11/005,859 / Final Office Action dated Jul. 8, 2009, 9 pages.
U.S. Appl. No. 11/005,859 / Examiner Interview Summary, 3 pages.
U.S. Appl. No. 11/005,859 / Amendment filed Dec. 8, 2009, 83 pages.
U.S. Appl. No. 11/005,859 / Advisory Action dated Dec. 22, 2009, 3 pages.
U.S. Appl. No. 11/005,859 / RCE with Amendment filed Jan. 7, 2010, 85 pages.
U.S. Appl. No. 11/005,859 / Non-Final Office Action dated Jan. 21, 2010, 8 pages.

(56) References Cited

OTHER PUBLICATIONS

U.S. Appl. No. 11/005,859 / Response to Non-Final Office Action filed Feb. 25, 2010, 83 pages.
U.S. Appl. No. 11/005,859 / Final Office Action dated Jun. 8, 2010, 9 pages.
U.S. Appl. No. 11/005,859 / Office Action Response dated Sep. 1, 2010, 89 pages.
U.S. Appl. No. 11/005,859 / Advisory Action dated Sep. 14, 2010, 3 pages.
U.S. Appl. No. 11/005,859 / Notice of Appeal dated Sep. 29, 2010, 1 page.
U.S. Appl. No. 11/005,859 / Office Action dated Oct. 15, 2010, 5 pages.
U.S. Appl. No. 11/005,859 / Office Action Response dated Jan. 18, 2011, 95 pages.
U.S. Appl. No. 11/005,859 / Final Office Action dated Mar. 30, 2011, 7 pages.
U.S. Appl. No. 11/005,859 / Notice of Allowance and Fees Due, dated Jun. 9, 2011, 11 pages.
U.S. Appl. No. 11/005,859 / Amendment after Notice of Allowance and Issue Fee Payment, dated Sep. 9, 2011, 2 pages.
U.S. Appl. No. 11/005,859 / Issue Notification, dated Sep. 21, 2011, 1 page.
U.S. Appl. No. 13/229,624 / Application as filed Sep. 9, 2011, 139 pages.
U.S. Appl. No. 13/229,624 / Filing receipt, dated Sep. 21, 2011, 4 pages.
U.S. Appl. No. 13/229,624 / Non-Final Office Action, dated Nov. 23, 2011, 8 pages.
U.S. Appl. No. 13/229,624 / Notice of Publication, dated Dec. 30, 2011, 1 page.
U.S. Appl. No. 13/229,624 / Amendment, dated Feb. 23, 2012, 22 pages.
U.S. Appl. No. 13/229,624 / Final Office Action, dated Mar. 20, 2012, 10 pages.
U.S. Appl. No. 13/229,624 / Amendment after final, dated Jun. 13, 2012, 25 pages.
U.S. Appl. No. 13/229,624 / Advisory Action, dated Jun. 20, 2012, 4 pages.
U.S. Appl. No. 13/229,624 / RCE, dated Jul. 20, 2012, 26 pages.
U.S. Appl. No. 13/229,624 / Non-Final Rejection, dated Oct. 2, 2013, 9 pages.
U.S. Appl. No. 13/229,624 / Response to non-final office action, dated Dec. 27, 2013, 11 pages.
U.S. Appl. No. 13/229,624 / Non-Final Office Action, dated Apr. 4, 2014, 5 Pages.
U.S. Appl. No. 13/229,624 / Non-Final Office Action Response, dated Aug. 1, 2014, 9 Pages.
U.S. Appl. No. 13/229,624 / Final Rejection. dated Oct. 30, 2014, 6 pages.
U.S. Appl. No. 13/229,624 / Response and Amendments after Final, filed Jan. 30, 2015, 11 pages.
U.S. Appl. No. 13/229,624 / Advisory Action, dated Mar. 11, 2015, 3 pages.
U.S. Appl. No. 13/229,624 / Applicant Initiated Interview Summary, dated Mar. 19, 2015, 3 pages.
U.S. Appl. No. 13/229,624 / Response After Final Action and Interview Summary, filed Mar. 27, 2015, 20 pages.
U.S. Appl. No. 13/229,624 / RCE and Amendments, filed Apr. 27, 2015, 17 pages.
U.S. Appl. No. 13/229,624 / Notice of Allowance and Fees, dated Jul. 6, 2015, 21 pages.
U.S. Appl. No. 11/007,139 / Application filed Dec. 7, 2004, 90 pages.
U.S. Appl. No. 11/007,139 / Notice to File Missing Parts dated Jan. 19, 2005, 2 pages.
U.S. Appl. No. 11/007,139 / Response to Notice to File Missing Parts dated Apr. 1, 2005, 9 pages.
U.S. Appl. No. 11/007,139 / Preliminary Amendment filed Apr. 28, 2005, 146 pages.
U.S. Appl. No. 11/007,139 / Non-final Office Action dated May 14, 2007, 58 pages.
U.S. Appl. No. 11/007,139 / Amendment filed Oct. 15, 2007, 32 pages.
U.S. Appl. No. 11/007,139 / Supplemental Response filed Oct. 17, 2007, 7 pages.
U.S. Appl. No. 11/007,139 / Non-final Office Action dated Jan. 2, 2008 with Examiner's search results, 21 pages.
U.S. Appl. No. 11/007,139 / Amendment filed Apr. 2, 2008, 30 pages.
U.S. Appl. No. 11/007,139 / Final Office Action dated Aug. 15, 2008, 30 pages.
U.S. Appl. No. 11/007,139 / Amendment filed Oct. 15, 2008, 26 pages.
U.S. Appl. No. 11/007,139 / Advisory Action dated Oct. 22, 2008, 26 pages.
U.S. Appl. No. 11/007,139 / RCE with Amendment filed Nov. 14, 2008, 32 pages.
U.S. Appl. No. 11/007,139 / Non-Final Office Action dated Dec. 8, 2008, 24 pages.
U.S. Appl. No. 11/007,139 / Amendment filed May 8, 2009, 31 pages.
U.S. Appl. No. 11/007,139 / Final Office Action dated Aug. 4, 2009, 26 pages.
U.S. Appl. No. 11/007,139 / Amendment filed Dec. 4, 2009, 28 pages.
U.S. Appl. No. 11/007,139 / Advisory Action dated Dec. 14, 2009, 4 pages.
U.S. Appl. No. 11/007,139 / RCE with amendment filed Jan. 4, 2010, 27 pages.
U.S. Appl. No. 11/007,139 / Non-Final Office Action dated Jan. 27, 2010, 31 pages.
U.S. Appl. No. 11/007,139 / Response to Non-Final Office Action filed Apr. 27, 2010, 30 pages.
U.S. Appl. No. 11/007,139 / Office Action dated Jul. 20, 2010, 20 pages.
U.S. Appl. No. 11/007,139 / Office Action response dated Oct. 20, 2010, 33 pages.
U.S. Appl. No. 11/007,139 / Advisory Action dated Oct. 25, 2010, 2 pages.
U.S. Appl. No. 11/007,139 / Office Action response dated Nov. 18, 2010, 24 pages.
U.S. Appl. No. 11/007,139 / Advisory Action dated Dec. 1, 2010, 4 pages.
U.S. Appl. No. 11/007,139 / Office Action response and Notice of Appeal dated Dec. 20, 2010, 29 pages.
U.S. Appl. No. 11/007,139 / Office Action dated Jan. 3, 2011, 24 pages.
U.S. Appl. No. 11/007,139 / Office Action response, dated May 3, 2011, 27 pages.
U.S. Appl. No. 11/007,139 / Final Office Action, dated Jul. 18, 2011, 23 pages.
U.S. Appl. No. 11/007,139 / Amendment after final dated Oct. 18, 2011, 30 pages.
U.S. Appl. No. 11/007,139 / Advisory Action and rule 312 amendment, dated Nov. 4, 2011, 4 pages.
U.S. Appl. No. 11/007,139 / Notice of Appeal filed Nov. 16, 2011, 1 page.
U.S. Appl. No. 11/007,139 / Appeal Brief filed May 1, 2012, 93 pages.
U.S. Appl. No. 11/007,139 / Notice of defective appeal brief, mailed May 7, 2012, 3 pages.
U.S. Appl. No. 11/007,139 / Appeal Brief filed May 15, 2012, 9 pages.
U.S. Appl. No. 11/007,139 / Examiner's answer to appeal brief, mailed Aug. 20, 2012, 35 pages.
U.S. Appl. No. 11/007,139 / Reply Brief, mailed Oct. 22, 2012, 29 pages.
U.S. Appl. No. 11/007,139 / Appeal Docketing Notice, mailed Nov. 6, 2012, 2 pages.
U.S. Appl. No. 11/006,320 / Application filed Dec. 6, 2004, 75 pages.

(56) References Cited

OTHER PUBLICATIONS

U.S. Appl. No. 11/006,320 / Response to Missing Parts and Preliminary Amendment filed May 9, 2005, 135 pages.
U.S. Appl. No. 11/006,320 / Office Action—Restriction Requirement dated Mar. 26, 2007, 7 pages.
U.S. Appl. No. 11/006,320 / Response to Restriction Requirement filed Apr. 27, 2007, 34 pages.
U.S. Appl. No. 11/006,320 / Notice of Non-Compliant Amendment dated Jul. 6, 2007, 3 pages.
U.S. Appl. No. 11/006,320 / Response to Non-Compliant Amendment filed Jul. 25, 2007, 33 pages.
U.S. Appl. No. 11/006,320 / Non-final Office Action dated Oct. 1, 2007, 24 pages.
U.S. Appl. No. 11/006,320 / Amendment filed Jan. 29, 2008, 45 pages.
U.S. Appl. No. 11/006,320 / Notice of Non-Compliant Amendment dated Apr. 8, 2008, 4 pages.
U.S. Appl. No. 11/006,320 / Amendment filed May 5, 2008, 44 pages.
U.S. Appl. No. 11/006,320 / Non-final Office Action dated Aug. 15, 2008, 33 pages.
U.S. Appl. No. 11/006,320 / Amendment filed Nov. 14, 2008, 40 pages.
U.S. Appl. No. 11/006,320 / Office Action—Shortened Statutory Period dated Jan. 27, 2009, 2 pages.
U.S. Appl. No. 11/006,320 / Amendment filed Apr. 27, 2009, 44 pages.
U.S. Appl. No. 11/006,320 / Final Office Action dated Jul. 29, 2009, 13 pages.
U.S. Appl. No. 11/006,320 / Amendment filed Nov. 30, 2009, 10 pages.
U.S. Appl. No. 11/006,320 / Non-final Office Action dated Dec. 4, 2009, 25 pages.
U.S. Appl. No. 11/006,320 / Response to Non-Final Office Action filed Feb. 23, 2010, 11 pages.
U.S. Appl. No. 11/006,320 / Final Office Action dated May 24, 2010, 11 pages.
U.S. Appl. No. 11/006,320 / Office Action response dated Aug. 24, 2010, 15 pages.
U.S. Appl. No. 11/006,320 / Notice of Allowance dated Sep. 17, 2010, 8 pages.
U.S. Appl. No. 11/006,320 / Examiner Interview Summary and supplemental Notice of Allowance dated Dec. 17, 2010, 9 pages.
U.S. Appl. No. 11/006,320 / Rule 312 Amendment and Issue Fee payment dated Dec. 17, 2010, 10 pages.
U.S. Appl. No. 11/006,320 / Issue Notification dated Jan. 12, 2011, 1 page.
U.S. Appl. No. 12/972,326 / Application as filed Dec. 17, 2010, 74 pages.
U.S. Appl. No. 12/972,326 / Filing receipt and Notice to File Missing Parts dated Jan. 6, 2011, 5 pages.
U.S. Appl. No. 12/972,326 / Response to Notice to File Missing parts dated Jan. 26, 2011, 14 pages.
U.S. Appl. No. 12/972,326 / Filing Receipt, dated Feb. 18, 2011, 3 pages.
U.S. Appl. No. 12/972,326 / Preliminary amendment dated May 20, 2011, 15 pages.
U.S. Appl. No. 12/972,326 / Notice of publication and non-compliant amendment dated Jun. 2, 2011, 3 pages.
U.S. Appl. No. 12/972,326 / Preliminary amendment dated Jul. 5, 2011, 21 pages.
U.S. Appl. No. 12/972,326 / Notice of additional fee due, dated Jul. 12, 2011, 2 pages.
U.S. Appl. No. 12/972,326 / Preliminary Amendment dated Aug. 10, 2011, 7 pages.
U.S. Appl. No. 12/972,326 / Non-Final Office Action, dated Feb. 23, 2012, 9 pages.
U.S. Appl. No. 12/972,326 / Abandonment, mailed Sep. 18, 2012, 2 pages.
U.S. Appl. No. 13/014,677 / Application as filed Jan. 26, 2011, 90 pages.
U.S. Appl. No. 13/014,677 / Notice to file missing parts and filing receipt, dated Mar. 23, 2011, 5 pages.
U.S. Appl. No. 13/014,677 / Notice of Abandonment dated Nov. 29, 2011, 2 pages.
U.S. Appl. No. 11/006,848 / Application as filed Dec. 7, 2004, 59 pages.
U.S. Appl. No. 11/006,848 / Notice to File Missing Parts dated Mar. 18, 2005, 2 pages.
U.S. Appl. No. 11/006,848 / Response to Notice to File Missing Parts dated May 3, 2005, 101 pages.
U.S. Appl. No. 11/006,848 / Non-Final Office Action dated Apr. 4, 2007, 11 pages.
U.S. Appl. No. 11/006,848 / Response to Non-Final Office Action dated Oct. 3, 2007, 20 pages.
U.S. Appl. No. 11/006,848 / Supplemental Amendment dated Nov. 13, 2007, 4 pages.
U.S. Appl. No. 11/006,848 / Non-Final Office Action dated Feb. 5, 2008, 16 pages.
U.S. Appl. No. 11/006,848 / Response to Non-Final Office Action filed Aug. 4, 2008, 27 pages.
U.S. Appl. No. 11/006,848 / Final Office Action dated Dec. 2, 2008, 30 pages.
U.S. Appl. No. 11/006,848 / RCE filed May 4, 2009, 24 pages.
U.S. Appl. No. 11/006,848 / Notice of Allowance dated Jun. 11, 2009, 8 pages.
U.S. Appl. No. 11/006,848 / Issue fee dated Sep. 11, 2009, 10 pages.
U.S. Appl. No. 11/006,848 / Issue Notification dated Oct. 28, 2009, 1 page.
U.S. Appl. No. 12/573,829 / Application as filed Oct. 5, 2009, 64 pages.
U.S. Appl. No. 12/573,829 / Notice to File Missing Parts and Filing Receipt dated Oct. 20, 2009, 5 pages.
U.S. Appl. No. 12/573,829 / Preliminary Amendment dated Dec. 21, 2009, 17 pages.
U.S. Appl. No. 12/573,829 / Filing receipt dated Jan. 4, 2010, 5 pages.
U.S. Appl. No. 12/573,829 / Notice of Publication dated Apr. 15, 2010, 1 page.
U.S. Appl. No. 12/573,829 / Office Action dated Jun. 28, 2010, 35 pages.
U.S. Appl. No. 12/573,829 / Office Action Response dated Sep. 28, 2010, 22 pages.
U.S. Appl. No. 12/573,829 / Office Action dated Nov. 1, 2010, 29 pages.
U.S. Appl. No. 12/573,829 / Office Action Response dated Jan. 3, 2011, 29 pages.
U.S. Appl. No. 12/573,829 / Advisory Action dated Jan. 7, 2011, 3 pages.
U.S. Appl. No. 12/573,829 / Notice of Appeal dated Jan. 11, 2011, 1 page.
U.S. Appl. No. 12/573,829 / Appeal Brief, mailed May 4, 2011, 68 pages.
U.S. Appl. No. 12/573,829 / Examiner's Answer to Appeal Brief, mailed Jul. 21, 2011, 31 pages.
U.S. Appl. No. 12/573,829 / Reply brief filed Sep. 21, 2011, 17 pages.
U.S. Appl. No. 12/573,829 / Reply brief noted Oct. 5, 2011, 2 pages.
U.S. Appl. No. 12/573,829 / Appeal Docketing notice Oct. 11, 2011, 2 pages.
U.S. Appl. No. 12/573,829 / Appeal Board Decision, dated May 9, 2014, 10 pages.
U.S. Appl. No. 12/573,829 / Request for continued examination, dated Jul. 9, 2014, 19 pages.
U.S. Appl. No. 12/573,829 / Non-Final Rejection and Examiner'Search, dated Apr. 28, 2015, 22 pages.
U.S. Appl. No. 11/006,841 / Application as filed Dec. 7, 2004, 63 pages.
U.S. Appl. No. 11/006,841 / Notice to file missing parts dated Jan. 10, 2005, 2 pages.
U.S. Appl. No. 11/006,841 / Response to Notice to file missing parts and preliminary amendment dated Apr. 14, 2005, 105 pages.

(56) References Cited

OTHER PUBLICATIONS

U.S. Appl. No. 11/006,841 / Non-Final OA mailed Apr. 6, 2007, 16 pages.
U.S. Appl. No. 11/006,841 / Response to Non-Final OA mailed Sep. 6, 2007, 63 pages.
U.S. Appl. No. 11/006,841 / Restriction Requirement dated Nov. 27, 2007, 5 pages.
U.S. Appl. No. 11/006,841 / Restriction Requirement response dated Dec. 27, 2007, 36 pages.
U.S. Appl. No. 11/006,841 / Restriction Requirement dated Mar. 17, 2008, 9 pages.
U.S. Appl. No. 11/006,841 / Response to Restriction Requirement dated Jul. 17, 2008, 33 pages.
U.S. Appl. No. 11/006,841 / Final Office Action dated Oct. 29, 2008, 54 pages.
U.S. Appl. No. 11/006,841 / Response to Final Office Action dated Dec. 29, 2008, 45 pages.
U.S. Appl. No. 11/006,841 / Advisory Action dated Jan. 6, 2009, 3 pages.
U.S. Appl. No. 11/006,841 / RCE mailed Apr. 23, 2009, 48 pages.
U.S. Appl. No. 11/006,841 / Supplemental Response dated Jun. 26, 2009, 34 pages.
U.S. Appl. No. 11/006,841 / Notice of Allowance dated Jun. 29, 2009, 40 pages.
U.S. Appl. No. 11/006,841 / Issue Fee dated Sep. 29, 2009, 4 pages.
U.S. Appl. No. 12/006,841 / Issue Notification dated Nov. 11, 2009, 1 page.
U.S. Appl. No. 12/578,411 / Continuation application filed Oct. 13, 2009, 75 pages.
U.S. Appl. No. 12/578,411 / Notice of Missing Parts dated Oct. 28, 2009, 6 pages.
U.S. Appl. No. 12/578,411 / Response to Missing Parts filed Dec. 28, 2009, 25 pages.
U.S. Appl. No. 12/578,411 / Filing Receipt dated Jan. 7, 2010, 3 pages.
U.S. Appl. No. 12/578,411 / Notice of Publication dated Apr. 15, 2010, 1 page.
U.S. Appl. No. 12/578,411 / Restriction requirement dated Jun. 8, 2011, 6 pages.
U.S. Appl. No. 12/578,411 / Response to restriction requirement dated Jul. 6, 2011, 19 pages.
U.S. Appl. No. 12/578,411 / Non-Final Office Action, dated Aug. 23, 2011, 19 pages.
U.S. Appl. No. 12/578,411 / Non-Final Office Action response dated Dec. 22, 2011, 38 pages.
U.S. Appl. No. 12/578,411 / Final Rejection dated Jan. 20, 2012, 16 pages.
U.S. Appl. No. 12/578,411 / Amendment, dated May 21, 2012, 23 pages.
U.S. Appl. No. 12/578,411 / Advisory Action, dated May 31, 2012, 4 pages.
U.S. Appl. No. 12/578,411 / RCE, mailed Jun. 12, 2012, 38 pages.
U.S. Appl. No. 12/578,411 / Notice of Allowance, dated Aug. 19, 2013, 19 pages.
U.S. Appl. No. 12/578,411 / Issue fee payment and Rule 312 amendment, dated Nov. 14, 2013, 14 pages.
U.S. Appl. No. 12/578,411 / Examiner response to rule 312 amendment, dated Nov. 19, 2013, 2 pages.
U.S. Appl. No. 12/578,411 / Response to Amendment under rule 312, dated Dec. 3, 2013, 3 pages.
U.S. Appl. No. 12/578,411 / Issue Notification, dated Dec. 18, 2013, 1 page.
U.S. Appl. No. 14/086,837 / Application as filed Nov. 21, 2013, 68 Pages.
U.S. Appl. No. 14/086,837 / Notice to File Missing Parts, dated Dec. 12, 2013, 5 Pages.
U.S. Appl. No. 14/086,837 / Applicant Response to Pre-Exam Formalities Notice, dated Jun. 11, 2014, 26 Pages.
U.S. Appl. No. 14/086,837 / Notice of Publication, dated Sep. 25, 2014, 4 Pages.
U.S. Appl. No. 14/086,837 / Terminal Disclaimer, filed Nov. 14, 2014, 1 page.
U.S. Appl. No. 14/086,837 / Examiner's search strategy and results, dated Dec. 2, 2014, 9 pages.
U.S. Appl. No. 14/086,837 / Notice of Allowance and Fees, dated Dec. 2, 2014, 17 pages.
U.S. Appl. No. 14/086,837 / Amendment After Notice of Allowance, filed Feb. 27, 2015, 9 pages.
U.S. Appl. No. 14/086,837 / Issue Fee Payment, filed Feb. 27, 2015, 1 page.
U.S. Appl. No. 14/635,836 / Application as filed Mar. 2, 2015, 70 pages.
U.S. Appl. No. 14/635,836 / Filing Receipt, dated Mar. 12, 2015, 3 pages.
U.S. Appl. No. 14/635,836 / Notice to File Missing Parts, dated Mar. 12, 2015, 2 pages.
U.S. Appl. No. 14/635,836 / Applicant Response to Pre-Exam Formalities Notice, filed May 12, 2015, 40 pages.
U.S. Appl. No. 11/006,440 / Application as filed Dec. 6, 2004, 85 pages.
U.S. Appl. No. 11/006,440 / Notice to file missing parts dated Jan. 11, 2005, 2 pages.
U.S. Appl. No. 11/006,440 / Response to Notice to file missing parts dated Mar. 15, 2005, 8 pages.
U.S. Appl. No. 11/006,440 / Preliminary Amendment dated Apr. 28, 2005, 140 pages.
U.S. Appl. No. 11/006,440 / Preliminary Amendment and Substitute Specification dated Oct. 10, 2006, 139 pages.
U.S. Appl. No. 11/006,440 / Restriction Requirement dated Mar. 29, 2007, 5 pages.
U.S. Appl. No. 11/006,440 / Response to Restriction Requirement dated Apr. 30, 2007, 42 pages.
U.S. Appl. No. 11/006,440 / Non-Final Office Action dated Jun. 21, 2007, 15 pages.
U.S. Appl. No. 11/006,440 / Response to Non-Final Office Action dated Nov. 20, 2007, 42 pages.
U.S. Appl. No. 11/006,440 / Final Office Action dated Feb. 6, 2008, 13 pages.
U.S. Appl. No. 11/006,440 / Response to Final Office Action dated Apr. 7, 2008, 34 pages.
U.S. Appl. No. 11/006,440 / Advisory Action dated May 9, 2008, 3 pages.
U.S. Appl. No. 11/006,440 / Notice of appeal dated Aug. 4, 2008, 1 page.
U.S. Appl. No. 11/006,440 / RCE mailed Nov. 4, 2008, 39 pages.
U.S. Appl. No. 11/006,440 / Final Office Action dated Jan. 23, 2009, 22 pages.
U.S. Appl. No. 11/006,440 / Amendment after Final dated Apr. 23, 2009, 34 pages.
U.S. Appl. No. 11/006,440 / Supplemental Amendment dated Jul. 17, 2009, 29 pages.
U.S. Appl. No. 11/006,440 / Notice of Allowance dated Jul. 31, 2009, 15 pages.
U.S. Appl. No. 11/006,440 / Examiner's Amendment and Reasons for Allowance dated Sep. 3, 2009, 9 pages.
U.S. Appl. No. 11/006,440 / Issue Fee dated Nov. 2, 2009, 12 pages.
U.S. Appl. No. 11/006,440 / Issue Notification dated Dec. 2, 2009, 1 page.
U.S. Appl. No. 12/627,816 / Continuation application filed Nov. 30, 2009, 95 pages.
U.S. Appl. No. 12/627,816 / Notice of Missing Parts dated Dec. 15, 2009, 2 pages.
U.S. Appl. No. 12/627,816 / Response to Missing Parts filed Apr. 12, 2010, 21 pages.
U.S. Appl. No. 12/627,816 / Filing Receipt dated Apr. 20, 2010, 3 pages.
U.S. Appl. No. 12/627,816 / Notice of Publication dated Jul. 29, 2010, 1 page.
U.S. Appl. No. 12/627,816 / Non-Final OA, mailed May 5, 2011, 19 pages.
U.S. Appl. No. 12/627,816 / Non-Final OA response, mailed Nov. 7, 2011, 12 pages.

(56) References Cited

OTHER PUBLICATIONS

U.S. Appl. No. 12/627,816 / Final Rejection dated Nov. 17, 2011, 18 pages.
U.S. Appl. No. 12/627,816 / RCE mailed Feb. 17, 2012, 20 pages.
U.S. Appl. No. 12/627,816 / Terminal disclaimer review, mailed Mar. 7, 2012, 1 page.
U.S. Appl. No. 12/627,816 / Notice of Allowance, dated Aug. 1, 2013, 16 pages.
U.S. Appl. No. 12/627,816 / Issue fee payment and Rule 312 amendment, dated Nov. 1, 2013, 14 pages.
U.S. Appl. No. 12/627,816 / Examiner response to rule 312 amendment, dated Nov. 13, 2013, 2 pages.
U.S. Appl. No. 12/627,816 / Issue Notification, dated Nov. 26, 2013, 1 page.
U.S. Appl. No. 14/086,808 / Application as filed Nov. 21, 2013, 87 Pages.
U.S. Appl. No. 14/086,808 / Notice to File Missing Parts and Filing Receipt, dated Dec. 11, 2013, 5 Pages.
U.S. Appl. No. 14/086,808 / Applicant Response to Pre-Exam Formalities Notice, dated Jun. 11, 2014, 53 Pages.
U.S. Appl. No. 14/086,808 / Filing receipt, dated Jun. 17, 2014, 3 Pages.
U.S. Appl. No. 14/086,808 / Notice of Publication, dated Sep. 25, 2014, 1 Page.
U.S. Appl. No. 14/086,808 / Terminal Disclaimer, filed Oct. 24, 2014, 2 pages.
U.S. Appl. No. 14/086,808 / Terminal Disclaimer Review Decision, Mailed Oct. 29, 2014, 1 page.
U.S. Appl. No. 14/086,808 / Terminal Disclaimer, filed Nov. 4, 2014, 2 pages.
U.S. Appl. No. 14/086,808 / Terminal Disclaimer Review Decision, Mailed Nov. 13, 2014, 1 page.
U.S. Appl. No. 14/086,808 / Examiner's search strategy and results, dated Nov. 17, 2014, 5 pages.
U.S. Appl. No. 14/086,808 / Notice of Allowance and fees, dated Nov. 17, 2014, 16 pages.
U.S. Appl. No. 14/086,808 / Issue Fee Payment and Rule 312 amendment, filed Feb. 17, 2015, 1 page.
U.S. Appl. No. 14/625,473 / Application as filed Feb. 28, 2015, 92 pages.
U.S. Appl. No. 14/625,473 / Filing Receipt, dated Mar. 18, 2015, 3 pages.
U.S. Appl. No. 14/625,473 / Notice to File Missing Parts, dated Mar. 18, 2015.
U.S. Appl. No. 14/625,473 / Response to Pre-Exam Formalities Notice and Preliminary Amendment, filed May 18, 2015, 28 pages.
U.S. Appl. No. 14/625,473 / Filing Receipt, dated May 20, 2015, 3 pages.
U.S. Appl. No. 11/006,446 / Application filed Dec. 6, 2004, 91 pages.
U.S. Appl. No. 11/006,446 / Notice of Missing Parts dated Jan. 24, 2005, 3 pages.
U.S. Appl. No. 11/006,446 / Response to Notice to File Missing Parts dated Mar. 29, 2005, 8 pages.
U.S. Appl. No. 11/006,446 / Preliminary Amendment filed Apr. 28, 2005, 118 pages.
U.S. Appl. No. 11/006,446 / Office Action—Restriction Requirement dated Apr. 4, 2007, 5 pages.
U.S. Appl. No. 11/006,446 / Response to Office Action—Restriction Requirement filed May 3, 2007, 6 pages.
U.S. Appl. No. 11/006,446 / Non-final Office Action dated Jul. 26, 2007, 45 pages.
U.S. Appl. No. 11/006,446 / Amendment filed Nov. 26, 2007, 38 pages.
U.S. Appl. No. 11/006,446 / Non-final Office Action dated Feb. 20, 2008, 67 pages.
U.S. Appl. No. 11/006,446 / Amendment filed Jul. 21, 2008, 33 pages.
U.S. Appl. No. 11/006,446 / Final Office Action dated Oct. 28, 2008, 49 pages.
U.S. Appl. No. 11/006,446 / Amendment filed Dec. 29, 2008, 33 pages.
U.S. Appl. No. 11/006,446 / Advisory Action dated Jan. 7, 2009, 4 pages.
U.S. Appl. No. 11/006,446 / RCE with Amendment filed Apr. 28, 2009, 38 pages.
U.S. Appl. No. 11/006,446 / Non-final Office Action dated Jul. 7, 2009, 41 pages.
U.S. Appl. No. 11/006,446 / Examiner Interview Summary and Search Results dated Oct. 26, 2009, 6 pages.
U.S. Appl. No. 11/006,446 / Amendment dated Dec. 7, 2009, 33 pages.
U.S. Appl. No. 11/006,446 / Examiner Interview Summary dated Mar. 19, 2010, 4 pages.
U.S. Appl. No. 11/006,446 / Notice of Allowance/Allowability dated Mar. 19, 2010, 29 pages.
U.S. Appl. No. 11/006,446 / Issue Fee Payment and 312 Amendment filed Jun. 21, 2010, 23 pages.
U.S. Appl. No. 11/006,446 / Rule 312 Amendment dated Aug. 19, 2010, 2 pages.
U.S. Appl. No. 11/006,446 / Formal drawings mailed Aug. 25, 2010, 29 pages.
U.S. Appl. No. 11/006,446 / Issue Notification dated Sep. 1, 2010, 1 page.
U.S. Appl. No. 12/830,236 / Divisional Application filed Jul. 2, 2010, 103 pages.
U.S. Appl. No. 12/830,236 / Notice to File Corrected Application Papers dated Jul. 16, 2010, 5 pages.
U.S. Appl. No. 12/830,236 / Response to Notice to File Corrected Application Papers dated Aug. 25, 2010, 32 pages.
U.S. Appl. No. 12/830,236 / Filing receipt dated Sep. 3, 2010, 3 pages.
U.S. Appl. No. 12/830,236 / Notice of Publication dated Dec. 16, 2010, 1 page.
U.S. Appl. No. 12/830,236 / Restriction requirement dated Mar. 18, 2011, 6 pages.
U.S. Appl. No. 12/830,236 / Restriction requirement response, dated Apr. 18, 2011, 5 pages.
U.S. Appl. No. 12/830,236 / Non-Final Office Action, dated May 11, 2011, 10 pages.
U.S. Appl. No. 12/830,236 / Response to Non-Final Office Action dated Jul. 6, 2011, 18 pages.
U.S. Appl. No. 12/830,236 / Final Office Action, dated Oct. 14, 2011, 18 pages.
U.S. Appl. No. 12/830,236 / Amendment after final, filed Jan. 17, 2012, 26 pages.
U.S. Appl. No. 12/830,236 / Advisory Action, dated Feb. 8, 2012, 6 pages.
U.S. Appl. No. 12/830,236 / Notice of Appeal filed Mar. 8, 2012, 3 pages.
U.S. Appl. No. 12/830,236 / RCE, filed Jun. 5, 2012, 23 pages.
U.S. Appl. No. 12/830,236 / Non-Final Office Action, dated Jul. 31, 2012, 18 pages.
U.S. Appl. No. 12/830,236 / Amendment, filed Nov. 1, 2012, 27 pages.
U.S. Appl. No. 12/830,236 / Final Office Action, dated Feb. 27, 2013, 35 pages.
U.S. Appl. No. 12/830,236 / Response after final, dated Jun. 27, 2013, 36 pages.
U.S. Appl. No. 12/830,236 / Advisory action, dated Jul. 12, 2013, 4 pages.
U.S. Appl. No. 12/830,236 / Notice of appeal, filed Jul. 19, 2013, 2 pages.
U.S. Appl. No. 12/830,236 / Appeal brief, filed Sep. 18, 2013, 44 pages.
U.S. Appl. No. 12/830,236 / Examiners answer to appeal brief, mailed Dec. 18, 2013, 35 pages.
U.S. Appl. No. 12/830,236 / Reply Brief as filed Feb. 18, 2014, 16 Pages.
U.S. Appl. No. 12/830,236 / Appeal Docketing Notice, Mailed Mar. 21, 2014, 2 Pages.
U.S. Appl. No. 11/385,257 / Application filed Mar. 20, 2006, 118 pages.

(56) References Cited

OTHER PUBLICATIONS

U.S. Appl. No. 11/385,257 / Notice of Missing Parts dated May 3, 2006, 2 pages.
U.S. Appl. No. 11/385,257 / Response to Missing Parts filed Aug. 3, 2006, 46 pages.
U.S. Appl. No. 11/385,257 / Notice of Publication dated Nov. 30, 2006, 1 page.
U.S. Appl. No. 11/385,257 / Non-final Office Action dated Apr. 29, 2008, 44 pages.
U.S. Appl. No. 11/385,257 / Amendment filed Jul. 29, 2008, 29 pages.
U.S. Appl. No. 11/385,257 / Final Office Action dated Dec. 9, 2008, 47 pages.
U.S. Appl. No. 11/385,257 / RCE with Amendment filed May 11, 2009, 38 pages.
U.S. Appl. No. 11/385,257 / Supplemental Amendment filed May 26, 2009, 32 pages.
U.S. Appl. No. 11/385,257 / Notice of Non-Compliant Amendment dated Jun. 1, 2009, 3 pages.
U.S. Appl. No. 11/385,257 / Amendment filed Jun. 30, 2009, 34 pages.
U.S. Appl. No. 11/385,257 / Non-final Office Action dated Sep. 14, 2009, 60 pages.
U.S. Appl. No. 11/385,257 / Response to Non-Final Office Action filed Jan. 13, 2010, 34 pages.
U.S. Appl. No. 11/385,257 / Final Office Action dated Apr. 12, 2010, 47 pages.
U.S. Appl. No. 11/385,257 / RCE mailed Aug. 12, 2010, 35 pages.
U.S. Appl. No. 11/385,257 / Office Action dated Sep. 30, 2010, 39 pages.
U.S. Appl. No. 11/385,257 / Office Action response, dated Mar. 29, 2011, 31 pages.
U.S. Appl. No. 11/385,257 / Final Rejection dated Jun. 1, 2011, 40 pages.
U.S. Appl. No. 11/385,257 / Request for continued Examination dated Nov. 1, 2011, 30 pages.
U.S. Appl. No. 11/385,257 / Non-Final Office Action, dated Jan. 9, 2012, 40 pages.
U.S. Appl. No. 11/385,257 / Amendment, dated Apr. 6, 2012, 30 pages.
U.S. Appl. No. 11/385,257 / Notice of allowance and Examiner interview summary, dated Jun. 22, 2012, 36 pages.
U.S. Appl. No. 11/385,257 / Office communication concerning previous IDS filing, dated Oct. 4, 2012, 4 pages.
U.S. Appl. No. 11/385,257 / Miscellaneous Communication to Applicant, dated Oct. 15, 2012, 3 pages.
U.S. Appl. No. 11/385,257 / Rule 312 Amendment, dated Dec. 12, 2012, 10 pages.
U.S. Appl. No. 11/385,257 / Issue Notification, dated Dec. 22, 2012, 1 page.
U.S. Appl. No. 13/625,812 / Application as filed Sep. 24, 2012, 123 pages.
U.S. Appl. No. 13/625,812 / Notice to file missing parts, dated Oct. 15, 2012, 6 pages.
U.S. Appl. No. 13/625,812 / Response to Notice to file missing parts and preliminary amendment, dated Mar. 8, 2013, 47 pages.
U.S. Appl. No. 13/625,812 / Notice of incomplete reply, dated Mar. 15, 2013, 3 pages.
U.S. Appl. No. 13/625,812 / Response to incomplete reply notice, dated Apr. 2, 2013, 5 pages.
U.S. Appl. No. 13/625,812 / Non-final office action, dated Jul. 26, 2013, 29 pages.
U.S. Appl. No. 13/625,812 / Publication notice, mailed Aug. 1, 2013, 1 page.
U.S. Appl. No. 13/625,812 / Response to non-final office action, dated Oct. 9, 2013, 15 pages.
U.S. Appl. No. 13/625,812 / Final rejection, dated Dec. 3, 2013, 28 pages.
U.S. Appl. No. 13/625,812 / Response After Final Action, dated Apr. 1, 2014, 1 Page.
U.S. Appl. No. 13/625,812 / Advisory Action (PTOL-303), dated Apr. 9, 2014, 3 Pages.
U.S. Appl. No. 13/625,812 / Notice of Appeal, filed May 5, 2014, 1 Page.
U.S. Appl. No. 13/625,812 / Request for Continued Examination, dated Aug. 4, 2014, 18 Pages.
U.S. Appl. No. 13/625,812 / Request for Corrected Filing Receipt, dated Aug. 21, 2014, 6 Pages.
U.S. Appl. No. 13/625,812 / Filing Receipt, dated Aug. 27, 2014, 3 Pages.
U.S. Appl. No. 13/625,812 / Notice of Allowance and Fees, dated Dec. 9, 2014, 20 pages.
U.S. Appl. No. 13/625,812 / Filing Receipt, dated Feb. 2, 2015, 3 pages.
U.S. Appl. No. 13/625,812 / Filing Receipt, dated Feb. 6, 2015, 3 pages.
U.S. Appl. No. 13/625,812 / Terminal Disclaimer filed Mar. 2, 2015, 1 page.
U.S. Appl. No. 13/625,812 / Post Allowance Arguments/Amendments, filed Mar. 6, 2015, 6 pages.
U.S. Appl. No. 13/625,812 / Amendment After Notice of Allowance, filed Mar. 9, 2015, 3 pages.
U.S. Appl. No. 13/625,812 / Issue Fee Payment, filed Mar. 9, 2015, 1 page.
U.S. Appl. No. 13/625,812 / Terminal Disclaimer Review Decision, mailed Mar. 12, 2015.
U.S. Appl. No. 11/319,758 / Application filed Dec. 27, 2005, 79 pages.
U.S. Appl. No. 11/319,758 / Notice of Missing Parts dated Feb. 1, 2006, 2 pages.
U.S. Appl. No. 11/319,758 / Response to Missing Parts filed Jul. 3, 2006, 15 pages.
U.S. Appl. No. 11/319,758 / Non-final Office Action dated Nov. 12, 2008, 46 pages.
U.S. Appl. No. 11/319,758 / Amendment filed May 12, 2009, 40 pages.
U.S. Appl. No. 11/319,758 / Final Office Action dated Aug. 3, 2009, 39 pages.
U.S. Appl. No. 11/319,758 / RCE filed Jan. 4, 2010, 45 pages.
U.S. Appl. No. 11/319,758 / Non-Final Office Action dated Mar. 30, 2010, 39 pages.
U.S. Appl. No. 11/319,758 / Office Action response dated Jul. 29, 2010, 30 pages.
U.S. Appl. No. 11/319,758 / Final Office Action dated Oct. 28, 2010, 31 pages.
U.S. Appl. No. 11/319,758 / Request for Continued Examination, dated Mar. 28, 2011, 32 pages.
U.S. Appl. No. 11/319,758 / Non-Final office action dated Jun. 3, 2011, 31 pages.
U.S. Appl. No. 11/319,758 / Non-Final Office Action Response dated Nov. 3, 2011, 29 pages.
U.S. Appl. No. 11/319,758 / Final Office Action, dated Jan. 17, 2012, 22 pages.
U.S. Appl. No. 11/319,758 / Amendment after final, dated May 17, 2012, 34 pages.
U.S. Appl. No. 11/319,758 / Advisory Action, dated Jun. 20, 2012, 3 pages.
U.S. Appl. No. 11/319,758 / Amendment after final, dated Jun. 28, 2012, 29 pages.
U.S. Appl. No. 11/319,758 / Notice of Allowance and examiner's interview summary, dated Jul. 17, 2012, 10 pages.
U.S. Appl. No. 11/319,758 / Issue Fee payment, Rule 312 and Miscellaneous Communication, dated Oct. 12, 2012, 12 pages.
U.S. Appl. No. 11/319,758 / Issue Notification, dated Oct. 31, 2012, 1 page.
U.S. Appl. No. 13/632,581 / Application as filed Oct. 1, 2012, 88 Pages.
U.S. Appl. No. 13/632,581 / Notice to File Missing Parts and Filing Receipt, dated Oct. 22, 2012, 27 Pages.
U.S. Appl. No. 13/632,581 / Filing Receipt, mailed 3/5/4, 3 Pages.
U.S. Appl. No. 13/632,581 / Notice of Publication, dated Jun. 13, 2013, 1 Page.

(56) References Cited

OTHER PUBLICATIONS

U.S. Appl. No. 13/632,581 / Non-final Office Action, dated Jul. 3, 2013, 22 Pages.
U.S. Appl. No. 13/632,581 / Non-Final Office Action Response, dated Sep. 11, 2013, 23 Pages.
U.S. Appl. No. 13/632,581 / Final Office Action, dated Dec. 18, 2013, 27 Pages.
U.S. Appl. No. 13/632,581 / Response After Final Action, dated Mar. 18, 2014, 37 Pages.
U.S. Appl. No. 13/632,581 / Advisory Action (PTOL-303), dated Apr. 3, 2014, 4 Pages.
U.S. Appl. No. 13/632,581 / Notice of Appeal filed Jul. 17, 2014, 2 Pages.
U.S. Appl. No. 13/632,581 / Request for Continued Examination, dated Jul. 16, 2014, 23 Pages.
U.S. Appl. No. 13/632,581 / Notice Non-Compliant Amendment, dated Oct. 20, 2014, 5 pages.
U.S. Appl. No. 13/632,581 / Amendment/Req Reconsideration after Non-Final Reject, Filed Nov. 4, 2014, 16 pages.
U.S. Appl. No. 13/632,581 / Non-Final Rejection, dated Jan. 27, 2015, 16 pages.
U.S. Appl. No. 13/632,581 / Amendment/Req Reconsideration Non-Final Rejection and Amendments, filed Apr. 20, 2015, 24 pages.
U.S. Appl. No. 11/006,842 / Application as filed Dec. 7, 2004, 58 pages.
U.S. Appl. No. 11/006,842 / Notice to file missing parts dated Jan. 10, 2005, 2 pages.
U.S. Appl. No. 11/006,842 / Response to Notice to file missing parts dated Apr. 1, 2005, 7 pages.
U.S. Appl. No. 11/006,842 / Preliminary Amendment dated May 2, 2005, 93 pages.
U.S. Appl. No. 11/006,842 / Restriction Requirement dated Jan. 23, 2008, 5 pages.
U.S. Appl. No. 11/006,842 / Response to Restriction Requirement dated Feb. 25, 2008, 25 pages.
U.S. Appl. No. 11/006,842 / Restriction Requirement dated May 13, 2008, 5 pages.
U.S. Appl. No. 11/006,842 / Response to Restriction Requirement dated Aug. 13, 2008, 24 pages.
U.S. Appl. No. 11/006,842 / Non-Final Office Action dated Nov. 3, 2008.
U.S. Appl. No. 11/006,842 / Response to Non-Final Office Action dated May 4, 2009, 35 pages.
U.S. Appl. No. 11/006,842 / Supplemental Response dated Jul. 17, 2009, 23 pages.
U.S. Appl. No. 11/006,842 / Notice of Allowance dated Jul. 27, 2009, 13 pages.
U.S. Appl. No. 11/006,842 / Issue Fee filed Oct. 27, 2009, 1 page.
U.S. Appl. No. 11/006,842 / Issue notification dated Nov. 18, 2009, 1 page.
U.S. Appl. No. 12/613,450 / Continuation application filed Nov. 5, 2009, 63 pages.
U.S. Appl. No. 12/613,450 / Notice of Missing Parts dated Nov. 18, 2009, 2 pages.
U.S. Appl. No. 12/613,450 / Preliminary Amendment and Response to Missing Parts filed Jan. 19, 2010, 16 pages.
U.S. Appl. No. 12/613,450 / Filing receipt dated Jan. 27, 2010, 3 pages.
U.S. Appl. No. 12/613,450 / Notice of Publicaiton dated May 6, 2010, 1 page.
U.S. Appl. No. 12/613,450 / Restriction requirement dated Jun. 10, 2011, 5 pages.
U.S. Appl. No. 12/613,450 / Response to restriction requirement dated Jul. 6, 2011, 17 pages.
U.S. Appl. No. 12/613,450 / Non-Final Office Action, dated Aug. 25, 2011, 15 pages.
U.S. Appl. No. 12/613,450 / Non-Final OA response mailed Dec. 27, 2011, 28 pages.
U.S. Appl. No. 12/613,450 / Final rejection, dated Feb. 14, 2012, 14 pages.
U.S. Appl. No. 12/613,450 / Amendment after final, dated Jun. 8, 2012, 23 pages.
U.S. Appl. No. 12/613,450 / Advisory Action, dated Jun. 20, 2012, 4 pages.
U.S. Appl. No. 12/613,450 / RCE, mailed Jul. 12, 2012, 25 pages.
U.S. Appl. No. 12/613,450 / Notice of Allowance, dated Oct. 7, 2013, 20 pages.
U.S. Appl. No. 12/613,450 / Electronic Terminal Disclaimer filed and approved, Jan. 2, 2014, 2 pages.
U.S. Appl. No. 12/613,450 / Amendment After Final or Under 37CFR 1.312, initialed by the Examiner, dated Jan. 14, 2014, 2 Pages.
U.S. Appl. No. 12/613,450 / Issue Notification, dated Jan. 22, 2014, 1 Page.
U.S. Appl. No. 14/149,749 / Application as filed Jan. 7, 2014, 59 Pages.
U.S. Appl. No. 14/149,749 / Notice to File Missing Parts and Filing Receipt, dated Jan. 23, 2014, 6 Pages.
U.S. Appl. No. 14/149,749 / Applicant Response to Pre-exam Formalities Notice, dated May 23, 2014 12 Pages.
U.S. Appl. No. 14/149,749 / Applicant Respone to Pre-Exam Formalities Notice, dated Aug. 25, 2014, 103 Pages.
U.S. Appl. No. 14/149,749 / Filing Receipt, dated Sep. 4, 2014, 3 Pages.
U.S. Appl. No. 14/149,749 / Notice of Publication, dated Dec. 11, 2014, 1 page.
U.S. Appl. No. 14/149,749 / Electronic Terminal Disclaimer Filed and Approved Feb. 23, 2015.
U.S. Appl. No. 14/149,749 / Examiner Initiated Interview Summary, dated Feb. 24, 2015, 2 pages.
U.S. Appl. No. 14/149,749 / Notice of Allowance and Fees and Examiner Search, dated Apr. 17, 2015, 30 pages.
U.S. Appl. No. 11/320,538 / Application filed Dec. 27, 2005, 76 pages.
U.S. Appl. No. 11/320,538 / Notice of Missing Parts dated Feb. 2, 2006, 2 pages.
U.S. Appl. No. 11/320,538 / Response to Missing Parts filed Aug. 2, 2006, 36 pages.
U.S. Appl. No. 11/320,538 / Non-final Office Action dated Apr. 1, 2009, 27 pages.
U.S. Appl. No. 11/320,538 / Amendment filed Jul. 1, 2009, 54 pages.
U.S. Appl. No. 11/320,538 / Final Office Action dated Nov. 2, 2009, 29 pages.
U.S. Appl. No. 11/320,538 / Response to Final Office Action filed Jan. 4, 2010, 23 pages.
U.S. Appl. No. 11/320,538 / Advisory Action dated Jan. 19, 2010, 3 pages.
U.S. Appl. No. 11/320,538 / RCE and Amendment filed Apr. 2, 2010, 26 pages.
U.S. Appl. No. 11/320,538 / Non-Final Office Action dated Jun. 9, 2010, 24 pages.
U.S. Appl. No. 11/320,538 / Office action dated Dec. 22, 2010, 10 pages.
U.S. Appl. No. 11/320,538 / Notice of Appeal, mailed May 23, 2011, 6 pages.
U.S. Appl. No. 11/320,538 / Pre-brief appeal conference decision mailed Jun. 30, 2011, 2 pages.
U.S. Appl. No. 11/320,538 / Request for Continued Examination dated Dec. 23, 2011, 21 pages.
U.S. Appl. No. 11/320,538 / Non-Final Office Action, dated Dec. 19, 2012, 12 pages.
U.S. Appl. No. 11/320,538 / Response to Non-final office action, dated Apr. 17, 2013, 20 pages.
U.S. Appl. No. 11/320,538 / Notice of allowance, dated Aug. 1, 2013, 25 pages.
U.S. Appl. No. 11/320,538 / Issue fee payment, dated Nov. 1, 2013, 7 pages.
U.S. Appl. No. 11/320,538 / Rule 312 amendment, dated Nov. 19, 2013, 20 pages.

(56) References Cited

OTHER PUBLICATIONS

U.S. Appl. No. 11/320,538 / Issue Notification, dated Dec. 4, 2013, 1 page.
U.S. Appl. No. 14/086,741 / Application as filed Dec. 12, 2013, 77 Pages.
U.S. Appl. No. 14/086,741 / Filing Receipt and Notice to File Missing Parts, dated Dec. 12, 2013, 6 Pages.
U.S. Appl. No. 14/086,741 / Applicant Response to Pre-Exam Formalities Notice, dated Jun. 12, 2014, 60 Pages.
U.S. Appl. No. 14/086,741 / Filing Receipt, dated Jun. 17, 2014, 3 Pages.
U.S. Appl. No. 14/086,741 / Notice of Publication, dated Sep. 25, 2014, 1 Page.
U.S. Appl. No. 14/086,741 / Terminal Disclaimer as filed Sep. 29, 2014, 1 Page.
U.S. Appl. No. 14/086,741 / Terminal Disclaimer Review Decision, Mailed Sep. 30, 2014, 1 Page.
U.S. Appl. No. 14/086,741 / Notice of Allowance and Fees and Examiner Summary, dated Oct. 3, 2014, 21 pages.
U.S. Appl. No. 14/086,741 / Notice of Allowance and Fees Due, filed Oct. 3, 2014, 22 pages.
U.S. Appl. No. 14/086,741 / Amendment after Notice of Allowance, filed Jan. 5, 2015, 14 pages.
U.S. Appl. No. 14/086,741 / Issue Fee Payment, filed Jan. 5, 2015, 1 page.
U.S. Appl. No. 14/086,741 / Response to Amendment under Rule 312, dated Jan. 22, 2015, 2 pages.
U.S. Appl. No. 14/086,741 / Notice of Allowance and Fees and Examiner Search strategy, dated Mar. 16, 2015, 40 pages.
U.S. Appl. No. 14/086,741 / Issue Notification, dated Apr. 1, 2015, 1 page.
U.S. Appl. No. 14/596,154 / Application as filed Jan. 13, 2015, 60 pages.
U.S. Appl. No. 14/596,154 / Filing Receipt, dated Jan. 27, 2015, 3 pages.
U.S. Appl. No. 14/596,154 / Notice to File Missing Parts, dated Jan. 27, 2015, 3 pages.
U.S. Appl. No. 14/596,154 / Applicant Response to Pre Exam Formalities Notice with Preliminary Amendments, filed Mar. 27, 2015, 85 pages.
U.S. Appl. No. 14/596,154 / Filing Receipt, dated Apr. 2, 2015, 3 pages.
U.S. Appl. No. 14/596,154 / Notice of Publication, dated Jul. 9, 2015, 1 page.
U.S. Appl. No. 11/361,500 / Application as filed Feb. 23, 2006, 72 pages.
U.S. Appl. No. 11/361,500 / Notice to file missing parts dated Mar. 23, 2006, 2 pages.
U.S. Appl. No. 11/361,500 / Response to Notice to File Missing Parts dated Jul. 19, 2006, 27 pages.
U.S. Appl. No. 11/361,500 / Notice of Publication dated Nov. 16, 2006, 1 page.
U.S. Appl. No. 11/361,500 / Office Action dated May 27, 2009, 18 pages.
U.S. Appl. No. 11/361,500 / Response to Office Action dated Aug. 27, 2009, 34 pages.
U.S. Appl. No. 11/361,500 / Notice of Allowance dated Dec. 11, 2009, 8 pages.
U.S. Appl. No. 11/361,500 / Issue Fee Payment and Rule 312 Amendment dated Jan. 6, 2010, 28 pages.
U.S. Appl. No. 11/361,500 / Response to Rule 312 Amendment dated Jan. 25, 2010, 4 pages.
U.S. Appl. No. 11/361,500 / Issue Notification dated Feb. 24, 2010, 1 page.
U.S. Appl. No. 12/702,243 / Continuation Application with Preliminary Amendment filed Feb. 8, 2010, 83 pages.
U.S. Appl. No. 12/702,243 / Notice of Missing Parts dated Feb. 25, 2010, 2 pages.
U.S. Appl. No. 12/702,243 / Response to Missing Parts filed Apr. 26, 2010, 8 pages.
U.S. Appl. No. 12/702,243 / Filing receipt dated May 4, 2010, 3 pages.
U.S. Appl. No. 12/702,243 / Notice of Publication dated Aug. 12, 2010, 1 page.
U.S. Appl. No. 12/702,243 / Non-Final rejection, dated Aug. 30, 2012, 8 pages.
U.S. Appl. No. 12/702,243 / Amendment, dated Nov. 20, 2012, 14 pages.
U.S. Appl. No. 12/702,243 / Terminal Disclaimer, mailed Jan. 2, 2013, 5 pages.
U.S. Appl. No. 12/702,243 / Terminal Disclaimer decision, mailed Jan. 4, 2013, 1 page1.
U.S. Appl. No. 12/702,243 / Notice of allowance and fees due and examiner interview summary, dated Jan. 10, 2013, pages.
U.S. Appl. No. 12/702,243 / Issue notification, dated Apr. 24, 2013, 1 page.
U.S. Appl. No. 13/860,482 / Application as filed Apr. 10, 2013, 98 Pages.
U.S. Appl. No. 13/860,482 / Notice to File Missing Parts and Filing Receipt, dated Mat 21, 2013, 5 Pages.
U.S. Appl. No. 13/860,482 / Applicant Response to Pre-Exam Formalities Notice, dated Oct. 22, 2013, 3 Pages.
U.S. Appl. No. 13/860,482 / Notice of Publication, dated Feb. 6, 2014, 1 Page.
U.S. Appl. No. 13/860,482 / Non-Final Office Action, dated Jun. 9, 2014, 11 Pages.
U.S. Appl. No. 13/860,482 / Non-Final Office Action Response, dated Sep. 8, 2014, 19 Pages.
U.S. Appl. No. 13/860,482 / Terminal Disclaimer Review Decision, Sep. 9, 2014, 1 page.
U.S. Appl. No. 13/860,482 / Terminal Disclaimer filed Oct. 8, 2014, 1 page.
U.S. Appl. No. 13/860,482 / Terminal Disclaimer Review Decision, Oct. 9, 2014, 1 page.
U.S. Appl. No. 13/860,482 / Notice of Allowance and Fees Due, dated Nov. 5, 2014, 8 Pages.
U.S. Appl. No. 13/860,482 / Issue Fee Payment and Rule 312 Amendments, filed Feb. 4, 2015, 4 pages.
U.S. Appl. No. 13/860,482 / Issue Notification, dated Mar. 4, 2015, 1 page.
U.S. Appl. No. 14/614,292 / Application as filed Feb. 4, 2015, 76 pages.
U.S. Appl. No. 14/614,292 / Notice to File Missing Parts and Filing Receipt, dated Feb. 20, 2015, 5 pages.
U.S. Appl. No. 14/614,292 / Applicant Response to Pre-Exam Formalities Notice and Amendments, filed Apr. 17, 2015, 30 pages.
U.S. Appl. No. 14/614,292 / Filing Receipt, dated Apr. 24, 2015, 3 pages.
U.S. Appl. No. 11/412,417 / Application filed Apr. 26, 2006, 96 pages.
U.S. Appl. No. 11/412,417 / Notice of Missing Parts dated May 19, 2006, 2 pages.
U.S. Appl. No. 11/412,417 / Response to Notice of Missing Parts filed Jul. 19, 2006, 14 pages.
U.S. Appl. No. 11/412,417 / Non-final Office Action dated Apr. 1, 2008, 53 pages.
U.S. Appl. No. 11/412,417 / Amendment filed Aug. 1, 2008, 34 pages.
U.S. Appl. No. 11/412,417 / Final Office Action dated Nov. 13, 2008, 40 pages.
U.S. Appl. No. 11/412,417 / RCE and Amendment filed May 12, 2009, 36 pages.
U.S. Appl. No. 11/412,417 / Non-final Office Action dated Jun. 30, 2009, 141 pages.
U.S. Appl. No. 11/412,417 / Examiner Interview Summary dated Oct. 30, 2009, 3 pages.
U.S. Appl. No. 11/412,417 / Amendment filed Oct. 30, 2009, 33 pages.
U.S. Appl. No. 11/412,417 / Final Office Action dated Jan. 4, 2010, 37 pages.
U.S. Appl. No. 11/412,417 / RCE with Amendment filed May 4, 2010, 27 pages.

(56) References Cited

OTHER PUBLICATIONS

U.S. Appl. No. 11/412,417 / Supplemental Office Action Response dated Jun. 22, 2010, 22 pages.
U.S. Appl. No. 11/412,417 / Notice of Allowance and bibliographic data sheet dated Jul. 6, 2010, 9 pages.
U.S. Appl. No. 11/412,417 / RCE mailed Oct. 5, 2010, 4 pages.
U.S. Appl. No. 11/412,417 / Notice of Allowance and bibliographic data sheet dated Oct. 26, 2010, 4 pages.
U.S. Appl. No. 11/412,417 / Issue Fee Payment and Comments on Reasons for Allowance dated Jan. 26, 2011, 6 pages.
U.S. Appl. No. 11/412,417 / Issue Notification dated Feb. 9, 2011, 1 page.
U.S. Appl. No. 13/030,084 / Application filed Feb. 17, 2011, 103 pages.
U.S. Appl. No. 13/030,084 / Filing receipt and Notice to File Missing parts dated Mar. 3, 2011, 6 pages.
U.S. Appl. No. 13/030,084 / Response to Notice to File Missing Parts, dated Aug. 3, 2011, 23 pages.
U.S. Appl. No. 13/030,084 / Updated filing receipt, dated Aug. 11, 2011, 3 pages.
U.S. Appl. No. 13/030,084 / Non-Final Rejection dated Oct. 26, 2011, 34 pages.
U.S. Appl. No. 13/030,084 / Notice of Publication dated Nov. 17, 2011, 1 page.
U.S. Appl. No. 13/030,084 / Amendment, dated Jan. 26, 2012, 35 pages.
U.S. Appl. No. 13/030,084 / Notice regarding non-compliant amendment, dated Jan. 31, 2012, 4 pages.
U.S. Appl. No. 13/030,084 / Amendment, dated Feb. 9, 2012, 35 pages.
U.S. Appl. No. 13/030,084 / Final Rejection, dated Mar. 28, 2012, 62 pages.
U.S. Appl. No. 13/030,084 / Amendment after final, dated Jun. 14, 2012, 88 pages.
U.S. Appl. No. 13/030,084 / Advisory Action, dated Jun. 26, 2012, 4 pages.
U.S. Appl. No. 13/030,084 / RCE, mailed Jul. 23, 2012, 89 pages.
U.S. Appl. No. 13/030,084 / Notice regarding non-compliant amendment, dated Jul. 25, 2012, 2 pages.
U.S. Appl. No. 13/030,084 / Amendment, dated Jan. 2, 2013, 40 pages.
U.S. Appl. No. 13/030,084 / Refund request, dated Jan. 23, 2013 17 pages.
U.S. Appl. No. 13/030,084 / Non-Final office action, dated Apr. 30, 2013, 39 pages.
U.S. Appl. No. 13/030,084 / Response to non-final office action, dated Jul. 30, 2013, 28 pages.
U.S. Appl. No. 13/030,084 / Non-final office action, dated Oct. 10, 2013, 44 pages.
U.S. Appl. No. 13/030,084 / Response after Non-Final Reject, dated Jan. 2, 2014, 1 Page.
U.S. Appl. No. 13/030,084 / Final Rejection, dated Mar. 19, 2014, 41 Pages.
U.S. Appl. No. 13/030,084 / Amendment Submitted/Entered with Filing of CPA/RCE, dated May 19, 2014, 38 Pages.
U.S. Appl. No. 13/030,084 / Advisory Action (PTOL-303), dated Jun. 6, 2014, 4 Pages.
U.S. Appl. No. 13/030,084 / Applicant Initiated Interview Summary (PTOL-413), dated Jul. 1, 2014, 3 Pages.
U.S. Appl. No. 13/030,084 / Request for Continued Examination, dated Aug. 15, 2014, 26 Pages.
U.S. Appl. No. 13/030,084 / Non-Final Rejection and Examiner's Search, dated Mar. 24, 2015, 24 pages.
U.S. Appl. No. 13/030,084 / Amendment/Req. Reconsideration After Non-Final Rejection, filed Jun. 24, 2015, 28 pages.
U.S. Appl. No. 11/480,094 / Application filed Jun. 29, 2006, 125 pages.
U.S. Appl. No. 11/480,094 / Notice to File Corrected Application Papers dated Aug. 2, 2006, 2 pages.
U.S. Appl. No. 11/480,094 / Response to Notice to File Corrected Application Papers filed Nov. 2, 2006, 32 pages.
U.S. Appl. No. 11/480,094 / Filing Receipt dated Dec. 7, 2006, 3 pages.
U.S. Appl. No. 11/480,094 / Non-final Office Action dated Nov. 7, 2008, 28 pages.
U.S. Appl. No. 11/480,094 / Amendment filed May 7, 2009, 37 pages.
U.S. Appl. No. 11/480,094 / Final Office Action dated Jul. 28, 2009, 16 pages.
U.S. Appl. No. 11/480,094 / RCE with Amendment filed Dec. 28, 2009, 39 pages.
U.S. Appl. No. 11/480,094 / Office Action dated Dec. 15, 2010, 15 pages.
U.S. Appl. No. 11/480,094 / Office Action response, dated May 16, 2011, 29 pages.
U.S. Appl. No. 11/480,094 / Final Office Action, dated Aug. 1, 2011, 13 pages.
U.S. Appl. No. 11/480,094 / Amendment after final dated Nov. 1, 2011, 32 pages.
U.S. Appl. No. 11/480,094 / Advisory Action dated Nov. 14, 2011, 3 pages.
U.S. Appl. No. 11/480,094 / Notice of Appeal mailed Nov. 28, 2011, 1 page.
U.S. Appl. No. 11/480,094 / Abandonment, mailed Jul. 31, 2012, 2 pages.
Coenen, Frans; Leng, Paul and Ahmed, Shakil; "T-Trees, Vertical Partitioning and Distributed Association Rule Mining", IEEE, 2003.
U.S. Appl. No. 13/229,624 / Issue Fee Payment, dated Sep. 28, 2015, 1 page.
U.S. Appl. No. 13/229,624 / Issue Notification, dated Oct. 14, 2015, 1 page.
U.S. Appl. No. 14/870,744 / Application as filed Sep. 30, 2015, 127 pages.
U.S. Appl. No. 14/870,744 / Preliminary Amendments, dated Oct. 6, 2015, 10 pages.
U.S. Appl. No. 14/870,744 / Notice to File Missing Parts, dated Oct. 16, 2015, 2 pages.
U.S. Appl. No. 14/870,744 / Filing Receipt, dated Oct. 16, 2015, 3 pages.
U.S. Appl. No. 11/007,139 / Patent Board Decision, dated Jul. 24, 2015, 8 pages.
U.S. Appl. No. 12/573,829 / Amendment/Req. Reconsideration After Non-Final Rejection, filed Jul. 27, 2015, 21 pages.
U.S. Appl. No. 12/573,829 / Final Rejection and Examiner search, dated Sep. 15, 2015, 17 pages.
U.S. Appl. No. 12/573,829 / Response After Final Action, dated Nov. 16, 2015, 17 pages.
U.S. Appl. No. 12/573,829 / Advisory Action, dated Dec. 2, 2015, 4 pages.
U.S. Appl. No. 12/573,829 / Request for Continued Examination and Amendments, dated Dec. 14, 2015, 17 pages.
U.S. Appl. No. 14/086,837 / Issue Notification, dated May 6, 2015, 1 page.
U.S. Appl. No. 14/635,836 / Filing Receipt, dated May 19, 2015, 3 pages.
U.S. Appl. No. 14/635,836 / Notice of Publication, dated Aug. 27, 2015, 1 page.
U.S. Appl. No. 14/635,836 / Electronic Terminal Disclaimer Approved and Filed, Nov. 13, 2015, 3 pages.
U.S. Appl. No. 14/086,808 / Amendment After Notice of Allowance, dated Feb. 17, 2015, 17 pages.
U.S. Appl. No. 14/086,808 / Response to Amendment under Rule 312, dated Feb. 20, 2015, 2 pages.
U.S. Appl. No. 14/086,808 / Response to Amendment under Rule 312, dated Feb. 25, 2015, 3 pages.
U.S. Appl. No. 14/086,808 / Issue Notification, dated Mar. 18, 2015, 1 page.
U.S. Appl. No. 14/625,473 / Notice of Publication, dated Aug. 27, 2015, 1 page.
U.S. Appl. No. 14/625,473 / Electronic Terminal Disclaimer Filed and Approved, Nov. 13, 2015, 3 pages.

(56) References Cited

OTHER PUBLICATIONS

U.S. Appl. No. 13/632,581 / Final Rejection, dated Jul. 20, 2015, 21 pages.
U.S. Appl. No. 13/632,581 / After Final Consideration Request and Response, dated Sep. 21, 2015, 28 pages.
U.S. Appl. No. 13/632,581 / Advisory Action and After Final Decision, dated Oct. 2, 2015, 18 pages.
U.S. Appl. No. 13/632,581 / RCE and Amendments, dated Nov. 30, 2015, 55 pages.
U.S. Appl. No. 14/149,749 / Amendment after Notice of Allowance, filed May 27, 2015, 10 pages.
U.S. Appl. No. 14/149,749 / Issue Fee Payment, filed May 27, 2015, 1 page.
U.S. Appl. No. 14/149,749 / Electronic Terminal Disclaimer Filed and Approved, May 27, 2015, 3 pages.
U.S. Appl. No. 14/149,749 / Response to Amendment under Rule 312, dated May 29, 2015, 1 page.
U.S. Appl. No. 14/149,749 / Response to Amendment under Rule 312, dated Jun. 1, 2015, 3 pages.
U.S. Appl. No. 14/149,749 / Issue Notification, dated Jun. 17, 2015, 1 page.
U.S. Appl. No. 14/726,192 / Application as filed May 29, 2015, 39 pages.
U.S. Appl. No. 14/726,192 / Filing Receipt, dated Jun. 9, 2015, 3 pages.
U.S. Appl. No. 14/726,192 / Notice to File Missing Parts, dated Jun. 9, 2015, 2 pages.
U.S. Appl. No. 14/726,192 / Applicant Response to Pre-Exam Formalities Notice and Amendments, filed Aug. 12, 2015, 114 pages.
U.S. Appl. No. 14/726,192 / Filing Receipt, dated Aug. 20, 2015, 3 pages.
U.S. Appl. No. 14/726,192 / Electronic Terminal Disclaimer Filed and Approved, Nov. 20, 2015, 3 pages.
U.S. Appl. No. 14/726,192 / Notice of Publication, dated Nov. 27, 2015, 1 page.
U.S. Appl. No. 14/596,154 / Electronic Terminal Disclaimer Filed and Approved, Nov. 20, 2015, 3 pages.
U.S. Appl. No. 14/614,292 / Notice of Publication, dated Aug. 6, 2015, 1 page.
U.S. Appl. No. 14/614,292 / Electronic Terminal Disclaimer Filed and Approved, Nov. 20, 2015, 3 pages.
U.S. Appl. No. 13/030,084 / Terminal Disclaimer filed and Approved, Sep. 10, 2015, 3 pages.
U.S. Appl. No. 13/030,084 / Notice of Allowance and Fees, dated Sep. 17, 2015, 24 pages.
U.S. Appl. No. 13/030,084 / Issue Fee Payment and Amendment, dated Dec. 10, 2015, 4 pages.
U.S. Appl. No. 14/968,429 / Application as filed Dec. 14, 2015.
Boppana et al., "Full Fault Dictionary Storage Based on Labeled Tree Encoding", Proceedings of 14th VLSI Test Symposium, 1996, pp. 174-179.
Caviness et al, "Simplification of Radical Expressions", ACM, pp. 329-338, 1976.
Ferragina et al., "The String B-Tree: A New Data Structure for String Search in External Memory and Its Applications", Journal of the ACM, vol. 46, No. 2, pp. 236-280, 1999.
Hirschberg, "Algorithm for Computing Maximal Common Sebsequences", Communicatoin of the ACM, vol. 18, No. 6, pp. 341-343, 1975.
Prasad et al., "Efficient Bit-Parallel Multi-Patterns String Matching Algorithms for Limited Expression", ACM, pp. 1-6, 2010.
Schmidt et al., "Comparision of Tree and Graph Encodings as Function of Problem Complexity", ACM, pp. 1674-1679, 2007.
Siegel, "All Searches Are Divided into Three Parts String Searches Using Ternary Trees", ACM, pp. 57-68, 1988.
Sinha et al, "Efficient Trie Based Sorting of Large Sets of Strings," ACM, pp. 1-8, 2003.
Spinells "Declarative Peephole Optimization Using String Pattern Matching", ACM, pp. 47-51, 1999.
Thiemann, "Grammar-Based Analysis of String Expressions", ACM, pp. 59-70, 2005.
Wagner et al., "The String-to-String Correction Problem", Journal of the Association for Computing Machinery, vol. 21, No. 1, pp. 168-173, 1974.
Xie et al., "S-Looper: Automatice Summarization for Multipath String Loops", ACM, pp. 188-198, 2015.
Yates et al, "A New Approach to Text Searchin", Communications of the ACM, vol. 35, No. 10, pp. 74-82, 1992.
U.S. Appl. No. 14/870,744 / Applicant Response to Pre-Exam Formalities Notice, dated Feb. 19, 2016, 2 pages.
U.S. Appl. No. 14/870,744 / Filing Receipt, dated Mar. 2, 2016, 3 pages.
U.S. Appl. No. 14/870,744 / Notice of Publication, dated Jun. 9, 2016, 1 page.
U.S. Appl. No. 14/870,744 / Non-Final Rejection, dated Aug. 24, 2017, 11 pages.
U.S. Appl. No. 14/870,744 / Amendment/Req. Reconsideration-After Non-Final Reject, dated Nov. 24, 2017, 30 pages.
U.S. Appl. No. 14/870,744 / Final Rejection, dated Mar. 30, 2018, 20 pages.
U.S. Appl. No. 14/870,744 / Response After Final Action, dated May 30, 2018, 33 pages.
U.S. Appl. No. 14/870,744 / Advisory Action, dated Jul. 3, 2018, 5 pages.
U.S. Appl. No. 11/007,139 / Non-Final Rejection, dated Dec. 31, 2015, 10 pages.
U.S. Appl. No. 11/007,139 / Amendment/Req. Reconsideration-After Non-Final Rejection, dated Mar. 28, 2016, 19 pages.
U.S. Appl. No. 11/007,139 / Final Rejection, dated Jun. 20, 2016, 12 pages.
U.S. Appl. No. 11/007,139 / Response After Final Action, dated Jul. 29, 2016, 17 pages.
U.S. Appl. No. 11/007,139 / Notice of Allowance and Fees, dated Aug. 23, 2016, 10 pages.
U.S. Appl. No. 11/007,139 / Filing Receipt, dated Sep. 2, 2016, 3 pages.
U.S. Appl. No. 11/007,139 / RCE, Nov. 10, 2016, 3 pages.
U.S. Appl. No. 11/007,139 / Notice of Allowance and Fees, dated Dec. 29, 2016, 8 pages.
U.S. Appl. No. 11/007,139 / Issue Notification, dated Apr. 19, 2017, 1 page.
U.S. Appl. No. 15/043,267 / Application as filed Feb. 12, 2016, 92 pages.
U.S. Appl. No. 15/043,267 / Preliminary Amendment, dated Feb. 12, 2016, 7 pages.
U.S. Appl. No. 15/043,267 / Filing Receipt, dated Mar. 7, 2016, 3 pages.
U.S. Appl. No. 15/043,267 / Preliminary Amendment, dated Jun. 10, 2016, 9 pages.
U.S. Appl. No. 15/043,267 / Filing Receipt, dated Oct. 25, 2016, 3 pages.
U.S. Appl. No. 15/043,267 / Notice of Publication, dated Feb. 2, 2017, 1 page.
U.S. Appl. No. 12/573,829 / Non-Final Rejection, dated Jun. 13, 2016, 18 pages.
U.S. Appl. No. 12/573,829 / Amendment/Req. Reconsideration—After Non-Final Reject, dated Sep. 13, 2016, 24 pages.
U.S. Appl. No. 12/573,829 / Filing Receipt, dated Sep. 15, 2016, 3 pages.
U.S. Appl. No. 12/573,829 / Non-Final Rejection, dated Dec. 16, 2016, 10 pages.
U.S. Appl. No. 12/573,829 / Amendment/Req. Reconsideration—After Non-Final Reject, dated Mar. 16, 2017, 18 pages.
U.S. Appl. No. 12/573,829 / Final Rejection, dated May 2, 2017, 20 pages.
U.S. Appl. No. 12/573,829 / After Final Consideration Program Request, Jul. 5, 2017, 13 pages.
U.S. Appl. No. 12/573,829 / Advisory Action/After Final Consideration Program Decision, dated Aug. 29, 2017, 5 pages.
U.S. Appl. No. 12/573,829 / RCE and Amendments, dated Sep. 5, 2017, 24 pages.

(56) References Cited

OTHER PUBLICATIONS

U.S. Appl. No. 12/573,829 / Non-Final Rejection, dated Dec. 27, 2017, 13 pages.
U.S. Appl. No. 12/573,829 / Amendment/Req. Reconsideration—After Non-Final Reject, dated Mar. 27, 2018, 22 pages.
U.S. Appl. No. 12/573,829 / Final Rejection, dated Jul. 11, 2018, 15 pages.
U.S. Appl. No. 14/635,836 / Notice of Allowance and Fees Due, dated Apr. 18, 2016, 25 pages.
U.S. Appl. No. 14/635,836 / Issue Fee Payment and Amendment after NOA, dated Jul. 15, 2016, 15 pages.
U.S. Appl. No. 14/635,836 / Response to Amendment under Rule 312, dated Jul. 21, 2016, 1 page.
U.S. Appl. No. 14/635,836 / Response to Amendment under Rule 312, dated Jul. 22, 2016, 2 page.
U.S. Appl. No. 14/635,836 / Issue Notification, dated Aug. 10, 2016, 1 page.
U.S. Appl. No. 15/250,118 / Application as filed Aug. 29, 2016, 71 pages.
U.S. Appl. No. 15/250,118 / Preliminary Amendment, dated Aug. 29, 2016, 20 pages.
U.S. Appl. No. 15/250,118 / Filing Receipt, dated Sep. 9, 2016, 3 pages.
U.S. Appl. No. 15/250,118 / Applicant Response to Pre-Exam Formalities Notice, dated Nov. 8, 2016, 21 pages.
U.S. Appl. No. 15/250,118 / Filing Receipt, dated Nov. 15, 2016, 3 pages.
U.S. Appl. No. 15/250,118 / Notice of Publication, dated Feb. 23, 2017, 1 page.
U.S. Appl. No. 15/250,118 / Non-Final Rejection, dated Jun. 15, 2017, 22 pages.
U.S. Appl. No. 15/250,118 / Amendment/Req. Reconsideration—After Non-Final Reject, dated Sep. 14, 2017, 44 pages.
U.S. Appl. No. 15/250,118 / Final Rejection, dated Dec. 15, 2017, 25 pages.
U.S. Appl. No. 15/250,118 / RCE and Amendments, dated Apr. 16, 2018, 44 pages.
U.S. Appl. No. 14/625,473 / Notice of Allowance, dated Mar. 28, 2016, 19 pages.
U.S. Appl. No. 14/625,473 / Issue Fee Payment and Amendments after Notice of Allowance, dated Jun. 28, 2016, 24 pages.
U.S. Appl. No. 14/625,473 / Response to Amendment under Rule 312, dated Jun. 30, 2016, 1 page.
U.S. Appl. No. 14/625,473 / Issue Notification, dated Jul. 20, 2016, 1 page.
U.S. Appl. No. 15/214,168 / Application as filed with preliminary amendments, dated Jul. 19, 2016, 116 pages.
U.S. Appl. No. 15/214,168 / Filing Receipt, dated Aug. 3, 2016, 4 pages.
U.S. Appl. No. 15/214,168 / Corrected Filing Receipt, dated Oct. 12, 2016, 4 pages.
U.S. Appl. No. 15/214,168 / Notice of Publication, dated Nov. 10, 2016, 1 page.
U.S. Appl. No. 15/214,168 / Non-Final Rejection, dated Mar. 2, 2017, 20 pages.
U.S. Appl. No. 15/214,168 / Amendment/Req. Reconsideration—After Non-Final Reject, dated Jun. 2, 2017, 39 pages.
U.S. Appl. No. 15/214,168 / Terminal Disclaimer, Jul. 17, 2017, 4 pages.
U.S. Appl. No. 15/214,168 / Notice of Allowance and Fees Due, dated Aug. 1, 2017, 26 pages.
U.S. Appl. No. 15/214,168 / Amendment after Notice of Allowance, dated Nov. 1, 2017, 22 pages.
U.S. Appl. No. 15/214,168 / Issue Notification, dated Nov. 21, 2017, 1 page.
U.S. Appl. No. 15/802,348 / Application as filed with Preliminary Amendment, dated Nov. 2, 2017, 126 pages.
U.S. Appl. No. 15/802,348 / Filing Receipt, dated Nov. 30, 2017, 4 pages.
U.S. Appl. No. 15/802,348 / Notice to File Corrected Application Papers, dated Nov. 30, 2017, 2 pages.
U.S. Appl. No. 15/802,348 / Applicant Response to Pre-Exam Formalities Notice, dated Jan. 9, 2018, 17 pages.
U.S. Appl. No. 15/802,348 / Filing Receipt, dated Jan. 11, 2018, 4 pages.
U.S. Appl. No. 15/802,348 / Notice of Publication, dated Apr. 19, 2018, 1 page.
U.S. Appl. No. 12/830,236 / Patent Board Decision, Mar. 9, 2016, 6 pages.
U.S. Appl. No. 12/830,236 / RCE and Amendments, dated Apr. 27, 2016, 15 pages.
U.S. Appl. No. 12/830,236 / Non-Final Rejection and Examiner Search, dated Jun. 29, 2016, 75 pages.
U.S. Appl. No. 12/830,236 / Amendment/Req. Reconsideration—After Non-Final Reject, dated Sep. 6, 2016, 12 pages.
U.S. Appl. No. 12/830,236 / Final Rejection, dated Dec. 14, 2016, 22 pages.
U.S. Appl. No. 12/830,236 / Response After Final Action, dated Feb. 13, 2017, 14 pages.
U.S. Appl. No. 12/830,236 / Advisory Action, dated Mar. 3, 2017, 2 pages.
U.S. Appl. No. 12/830,236 / RCE and Amendments, dated Apr. 14, 2017, 17 pages.
U.S. Appl. No. 12/830,236 / Non-Final Rejection, dated Jun. 21, 2017, 30 pages.
U.S. Appl. No. 12/830,236 / Amendment/Req. Reconsideration—After Non-Final Reject, dated Oct. 23, 2017, 18 pages.
U.S. Appl. No. 12/830,236 / Non-Final Rejection, dated Feb. 6, 2018, 28 pages.
U.S. Appl. No. 12/830,236 / Amendment/Req. Reconsideration—After Non-Final Reject, dated May 4, 2018, 26 pages.
U.S. Appl. No. 13/632,581 / Filing Receipt, dated Jan. 22, 2016, 4 pages.
U.S. Appl. No. 13/632,581 / Electronic Terminal Disclaimer, Mar. 7, 2016, 3 pages.
U.S. Appl. No. 13/632,581 / Issue Fee Payment, dated Mar. 16, 2016, 1 page.
U.S. Appl. No. 13/632,581 / Amendment after Notice of Allowance, dated Mar. 16, 2016 19 pages.
U.S. Appl. No. 13/632,581 / Response to Amendment under Rule 312, dated Mar. 22, 2016, 2 pages.
U.S. Appl. No. 13/632,581 / Issue Notification, dated Apr. 13, 2016, 1 page.
U.S. Appl. No. 15/081,612 / Application as filed Mar. 25, 2016, 87 Pages.
U.S. Appl. No. 15/081,612 / Notice to File Missing Parts and Filing Receipt, dated Apr. 11, 2016, 4 Pages.
U.S. Appl. No. 15/081,612 / Filing Receipt, dated Apr. 11, 2016, 3 Pages.
U.S. Appl. No. 15/081,612 / Applicant Response to Pre-Exam Formalities Notice and Preliminary Amendments, dated Jun. 13, 2016, 34 pages.
U.S. Appl. No. 15/081,612 / Preliminary Amendment, dated Jun. 14, 2016, 4 pages.
U.S. Appl. No. 15/081,612 / Filing Receipt, dated Jun. 21, 2016, 3 pages.
U.S. Appl. No. 15/081,612 / Non-Final Rejection, dated Jul. 27, 2016, 9 pages.
U.S. Appl. No. 15/081,612 / Electronic Terminal Disclaimer, Sep. 23, 2016, 3 pages.
U.S. Appl. No. 15/081,612 / Notice of Publication, dated Sep. 29, 2016, 1 page.
U.S. Appl. No. 15/081,612 / Amendment/Req. Reconsideration—After Non-Final Reject, dated Oct. 17, 2016, 10 pages.
U.S. Appl. No. 15/081,612 / Notice of Allowance and Fees, dated Oct. 27, 2016, 5 pages.
U.S. Appl. No. 15/081,612 / RCE, Jan. 30, 2017, 2 pages.
U.S. Appl. No. 15/081,612 / Issue Fee Payment, dated Jan. 30, 2017, 1 page.
U.S. Appl. No. 15/081,612 / Notice of Allowance and Fees Due, dated Jan. 30, 2017, 2 pages.

(56) References Cited

OTHER PUBLICATIONS

U.S. Appl. No. 15/081,612 / Notice of Allowance and Fees Due, dated Feb. 13, 2017, 7 pages.
U.S. Appl. No. 15/081,612 / Amendment After Notice of Allowance, dated Mar. 20, 2017, 4 pages.
U.S. Appl. No. 15/081,612 / Issue Fee Payment, dated Mar. 20, 2017, 1 page.
U.S. Appl. No. 15/081,612 / Issue Notification, dated Apr. 20, 2017, 1 page.
U.S. Appl. No. 15/464,205 / Application as filed Mar. 20, 2017, 84 pages.
U.S. Appl. No. 15/464,205 / Notice to File Missing Parts, dated Mar. 28, 2017, 5 pages.
U.S. Appl. No. 15/464,205 / Applicant Response to Pre-Exam Formalities Notice, dated May 31, 2017, 86 pages.
U.S. Appl. No. 15/464,205 / Filing Receipt, dated Mar. 28, 2017, 4 pages.
U.S. Appl. No. 15/464,205 / Preliminary Amendment, dated May 31, 2017, 8 pages.
U.S. Appl. No. 15/464,205 / Filing Receipt, dated Jun. 2, 2017, 4 pages.
U.S. Appl. No. 14/726,192 / Issue Fee Payment and Amendment after Notice of Allowance, dated Jul. 18, 2016, 13 pages.
U.S. Appl. No. 14/726,192 / Response to Amendment under Rule 312, dated Jul. 21, 2016, 1 page.
U.S. Appl. No. 14/726,192 / Response to Amendment under Rule 312, dated Jul. 22, 2016, 2 pages.
U.S. Appl. No. 14/726,192 / Issue Notification, dated Aug. 3, 2016, 1 page.
U.S. Appl. No. 15/240,964 / Application and Preliminary Amendments as filed Aug. 18, 2016, 70 pages.
U.S. Appl. No. 15/240,964 / Filing Receipt, dated Aug. 31, 2016, 3 pages.
U.S. Appl. No. 15/240,964 / Notice of Publication, dated Dec. 8, 2016.
U.S. Appl. No. 15/240,964 / Non-Final Rejection, dated Mar. 14, 2017, 23 pages.
U.S. Appl. No. 15/240,964 / Amendment/Req. Reconsideration—After Non-Final Reject, dated Jun. 14, 2017, 27 pages.
U.S. Appl. No. 15/240,964 / Final Rejection, dated Aug. 9, 2017, 25 pages.
U.S. Appl. No. 15/240,964 / After Final Consideration Program Request, Oct. 10, 2017, 30 pages.
U.S. Appl. No. 15/240,964 / Advisory Action, dated Oct. 30, 2017, 3 pages.
U.S. Appl. No. 15/240,964 / RCE and Amendments, dated Nov. 9, 2017, 31 pages.
U.S. Appl. No. 14/596,154 / Non-Final Rejection, dated Sep. 21, 2017, 19 pages.
U.S. Appl. No. 14/596,154 / Amendment/Req. Reconsideration—After Non-Final Reject, dated Dec. 12, 2017, 37 pages.
U.S. Appl. No. 14/596,154 / Notice of Allowance and Fees Due, dated May 2, 2018, 8 pages.
U.S. Appl. No. 14/614,292 / Non-Final Rejection, dated May 19, 2016, 10 pages.
U.S. Appl. No. 14/614,292 / Amendment/Req. Reconsideration—After Non-Final Rejection, dated Aug. 18, 2016, 20 pages.
U.S. Appl. No. 14/614,292 / Notice of Allowance and Fees, dated Sep. 21, 2016, 8 pages.
U.S. Appl. No. 14/614,292 / Issue Fee Payment and Amendment after Notice of Allowance, dated Dec. 21, 2016, 4 pages.
U.S. Appl. No. 14/614,292 / Issue Notification, dated Jan. 18, 2017, 1 page.
U.S. Appl. No. 15/411,823 / Application as filed Jan. 20, 2017, 77 pages.
U.S. Appl. No. 15/411,823 / Preliminary Amendment, dated Jan. 20, 2017, 25 pages.
U.S. Appl. No. 15/411,823 / Filing Receipt, dated Jan. 31, 2017, 3 pages.
U.S. Appl. No. 15/411,823 / Notice of Publication, dated May 11, 2017, 1 page.
U.S. Appl. No. 15/411,823 / Non-Final Rejection, dated Jan. 25, 2018, 10 pages.
U.S. Appl. No. 15/411,823 / Amendment/Req. Reconsideration—After Non-Final Rejection, dated Apr. 24, 2018, 18 pages.
U.S. Appl. No. 15/411,823 / Terminal Disclaimer—Filed and Approved, Apr. 24, 2018, 3 pages.
U.S. Appl. No. 15/411,823 / Notice of Allowance and Fees Due, dated Jul. 13, 2018, 8 pages.
U.S. Appl. No. 14/968,429 / Filing Receipt, dated Jan. 4, 2016, 3 pages.
U.S. Appl. No. 14/968,429 / Applicant Response to Pre-Exam Formalities Notice, dated Jan. 14, 2016, 35 pages.
U.S. Appl. No. 14/968,429 / Filing Receipt, dated Jan. 21, 2016, 3 pages.
U.S. Appl. No. 14/968,429 / Notice of Publication, dated Apr. 28, 2016, 1 page.
U.S. Appl. No. 14/968,429 / Non-Final Rejection, dated May 15, 2017, 8 pages.
U.S. Appl. No. 14/968,429 / Amendment/Req. Reconsideration—After Non-Final Reject, dated Aug. 9, 2017, 19 pages.
U.S. Appl. No. 14/968,429 / Final Rejection, dated Oct. 24, 2017, 10 pages.
U.S. Appl. No. 14/968,429 / Response After Final Action, dated Dec. 26, 2017, 28 pages.
U.S. Appl. No. 14/968,429 / Advisory Action, dated Jan. 11, 2018, 5 pages.
U.S. Appl. No. 14/968,429 / Terminal Disclaimer—Filed and Approved, Feb. 7, 2018, 3 pages.
U.S. Appl. No. 14/968,429 / Response After Final Action, dated Feb. 7, 2018, 13 pages.
U.S. Appl. No. 14/968,429 / Notice of Allowance and Fees Due, dated Feb. 26, 2018, 8 pages.
U.S. Appl. No. 14/968,429 / Notice of Allowance and Fees Due, dated Mar. 19, 2018, 6 pages.
U.S. Appl. No. 14/968,429 / Amendment after Notice of Allowance, dated May 31, 2018, 12 pages.
U.S. Appl. No. 14/968,429 / Amendment after Notice of Allowance, dated Jun. 13, 2018, 12 pages.
U.S. Appl. No. 14/968,429 / Response to Amendment under Rule 312, dated Jul. 10, 2018, 2 pages.
U.S. Appl. No. 14/968,429 / Response to Amendment under Rule 312, dated Jul. 23, 2018, 2 pages.
U.S. Appl. No. 14/870,744 / RCE and Amendments, dated Jul. 27, 2018, 33 pages.
U.S. Appl. No. 14/870,744 / Notice of Allowance and Fees Due, dated Sep. 6, 2018, 11 pages.
U.S. Appl. No. 12/573,829 / After Final Consideration Program Request, Sep. 7, 2018, 23 pages.
U.S. Appl. No. 12/830,236 / Final Rejection, dated Sep. 5, 2018, 30 pages.
U.S. Appl. No. 15/240,964 / Non-Final Rejection, dated Jul. 30, 2018, 32 pages.
U.S. Appl. No. 14/596,154 / Issue Notification, dated Aug. 21, 2018, 1 page.
U.S. Appl. No. 16/048,119 / Application as filed Jul. 27, 2018, 81 pages.
U.S. Appl. No. 16/048,119 / Filing Receipt, dated Aug. 24, 2018, 3 pages.
U.S. Appl. No. 16/048,119 / Notice to File Missing Parts, dated Aug. 24, 2018, 2 pages.
U.S. Appl. No. 14/968,429 / Issue Notification, dated Aug. 1, 2018, 1 page.
U.S. Appl. No. 16/048,061 / Application filed Jul. 27, 2018, 101 pages.
U.S. Appl. No. 16/048,061 / Notice to File Missing Parts, dated Aug. 13, 2018, 2 pages.
U.S. Appl. No. 16/048,061 / Filing Receipt, dated Aug. 13, 2018, 4 pages.
U.S. Appl. No. 12/573,829 / Advisory Action, dated Sep. 24, 2018, 4 pages.

(56) References Cited

OTHER PUBLICATIONS

U.S. Appl. No. 12/573,829 / RCE and Amendments, dated Oct. 9, 2018, 20 pages.
U.S. Appl. No. 15/250,118 / Terminal Disclaimer, Dec. 11, 2018, 4 pages.
U.S. Appl. No. 15/802,348 / Preliminary Amendment, dated Oct. 26, 2018, 24 pages.
U.S. Appl. No. 12/830,236 / After Final Consideration Program Request, Nov. 5, 2018, 24 pages.
U.S. Appl. No. 12/830,236 / After Final Consideration Program Decision, Nov. 18, 2018, 4 pages.
U.S. Appl. No. 15/240,964 / Amendment/Req. Reconsideration—After Non-Final Reject, dated Oct. 30, 2018, 43 pages.
U.S. Appl. No. 16/048,113 / Applicant Response to Pre-Exam Formalities Notice and Amendment, dated Oct. 22, 2018, 38 pages.
U.S. Appl. No. 16/048,113 / Filing Receipt, dated Oct. 24, 2018, 3 pages.
U.S. Appl. No. 15/411,823 / Issue Notification, dated Nov. 7, 2018, 1 page.
U.S. Appl. No. 16/164,430 / Application as filed Oct. 18, 2018, 79 pages.
U.S. Appl. No. 16/164,430 / Notice to File Missing Parts, dated Nov. 6, 2018, 2 pages.
U.S. Appl. No. 16/164,430 / Filing Receipt, dated Nov. 6, 2018, 4 pages.
U.S. Appl. No. 16/048,061 / Applicant Response to Pre-Exam Formalities Notice, dated Oct. 12, 2018, 13 pages.
U.S. Appl. No. 16/048,061 / Filing Receipt, dated Oct. 16, 2018, 4 pages.
U.S. Appl. No. 16/048,061 / Request for Corrected Filing Receipt, dated Oct. 31, 2018, 6 pages.
U.S. Appl. No. 16/048,061 / Filing Receipt, dated Nov. 5, 2018, 4 pages.
U.S. Appl. No. 15/043,267, Response to Office Action, dated Jul. 2, 2019, 24 pages.
U.S. Appl. No. 12/573,829, Notice of Allowance and Fees Due, dated May 21, 2019.
U.S. Appl. No. 15/250,118: Issue Notification, dated Jun. 11, 2019, 1 page.
U.S. Appl. No. 16/379,674: Filing Receipt, Apr. 24, 2019, 4 pages.
U.S. Appl. No. 15/802,348: Amendment/Req. Reconsideration—After Non-Final Reject, dated May 13, 2019, 22 pages.
U.S. Appl. No. 12/830,236: Supplemental Notice of Allowability, dated May 21, 2019, 24 pages.
U.S. Appl. No. 12/830,236, Issue Fee Payment, dated Jul. 1, 2019, 3 pages.
U.S. Appl. No. 16/459,930, filed Jul. 2, 2019, 99 pages.
U.S. Appl. No. 16/427,054: Notice to File Missing Parts, dated Jun. 11, 2019, 2 pages.
U.S. Appl. No. 16/427,054: Filing Receipt, Jun. 11, 2019, 4 pages.
U.S. Appl. No. 16/164,430: Notice of Publication, dated May 2, 2019, 1 page.
U.S. Appl. No. 14/870,744: Notice of Allowance and Fees Due, dated Mar. 12, 2019, 7 pages.
U.S. Appl. No. 14/870,744: Interview Summary, dated Mar. 8, 2019, 2 pages.
U.S. Appl. No. 14/870,744: Issue Notification, dated Mar. 20, 2019, 1 page.
U.S. Appl. No. 16/209,872: Applicant Response to Pre-Exam Formalities Notice and Preliminary Amendment, dated Feb. 21, 2019, 17 pages.
U.S. Appl. No. 15/043,267, Office Action, dated Apr. 2, 2019, 21 pages.
U.S. Appl. No. 15/250,118: Issue Fee Payment and Rule 312 Amendment, dated Apr. 5, 2019, 20 pages.
U.S. Appl. No. 16/379,674, filed Apr. 9, 2019, 83 pages.
U.S. Appl. No. 15/802,348: Non-Final Rejection, dated Feb. 11, 2019, 18 pages.
U.S. Appl. No. 12/830,236: Notice of Allowance and Fees Due, dated Apr. 2, 2019, 15 pages.
U.S. Appl. No. 15/464,205: Preliminary Amendment, dated Feb. 22, 2019, 11 pages.
U.S. Appl. No. 15/240,964: Notice of Allowance and Fees Due, dated Feb. 21, 2019, 26 pages.
U.S. Appl. No. 16/164,430: Applicant Response to Pre-Exam Formalities Notice and Preliminary Amendment, dated Jan. 18, 2019, 29 pages.
U.S. Appl. No. 16/164,535: Applicant Response to Pre-Exam Formalities Notice and Replacement Drawings, dated Jan. 7, 2019, 23 pages.

\* cited by examiner

150  Fig. 3

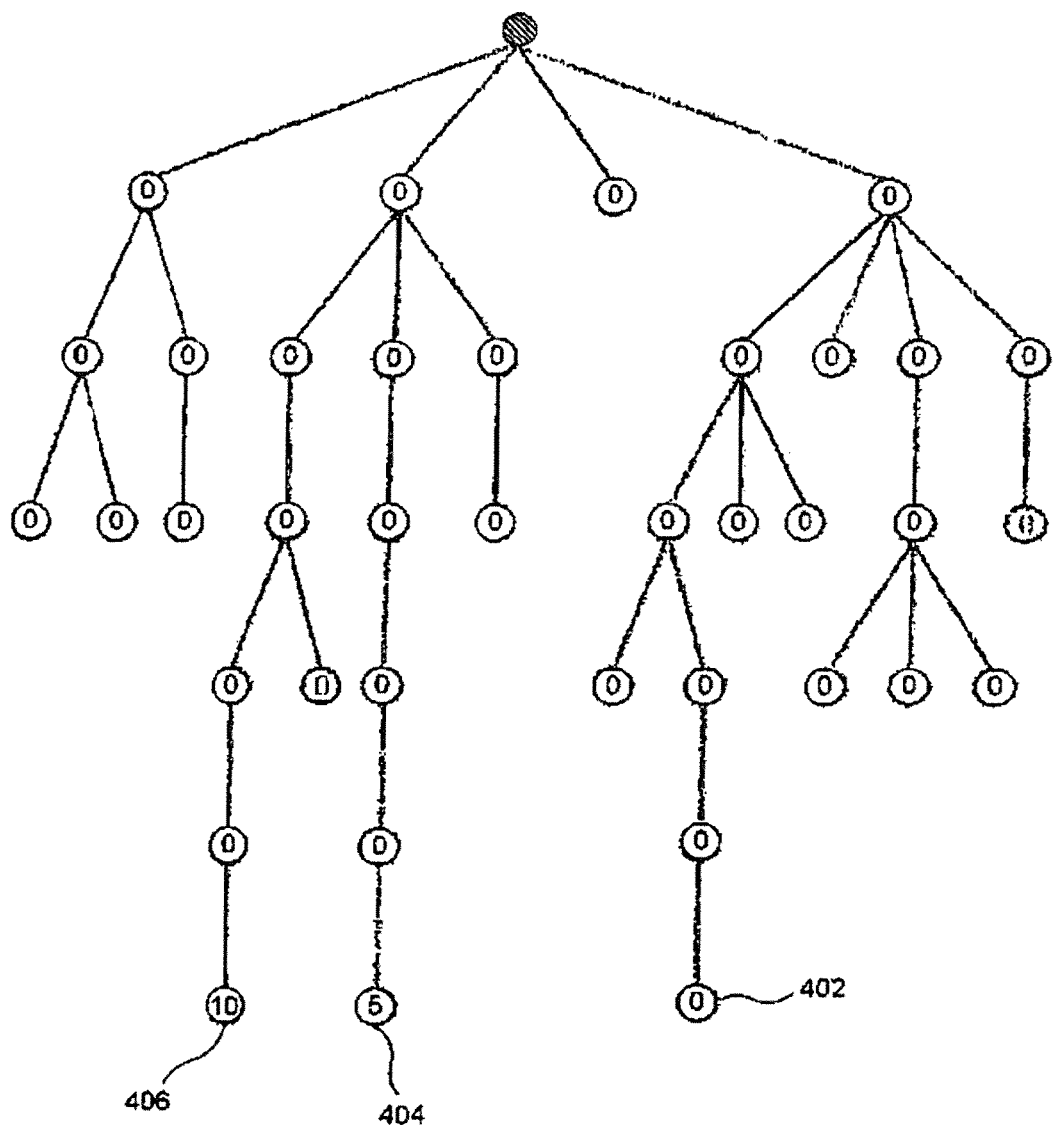
400 Fig. 6

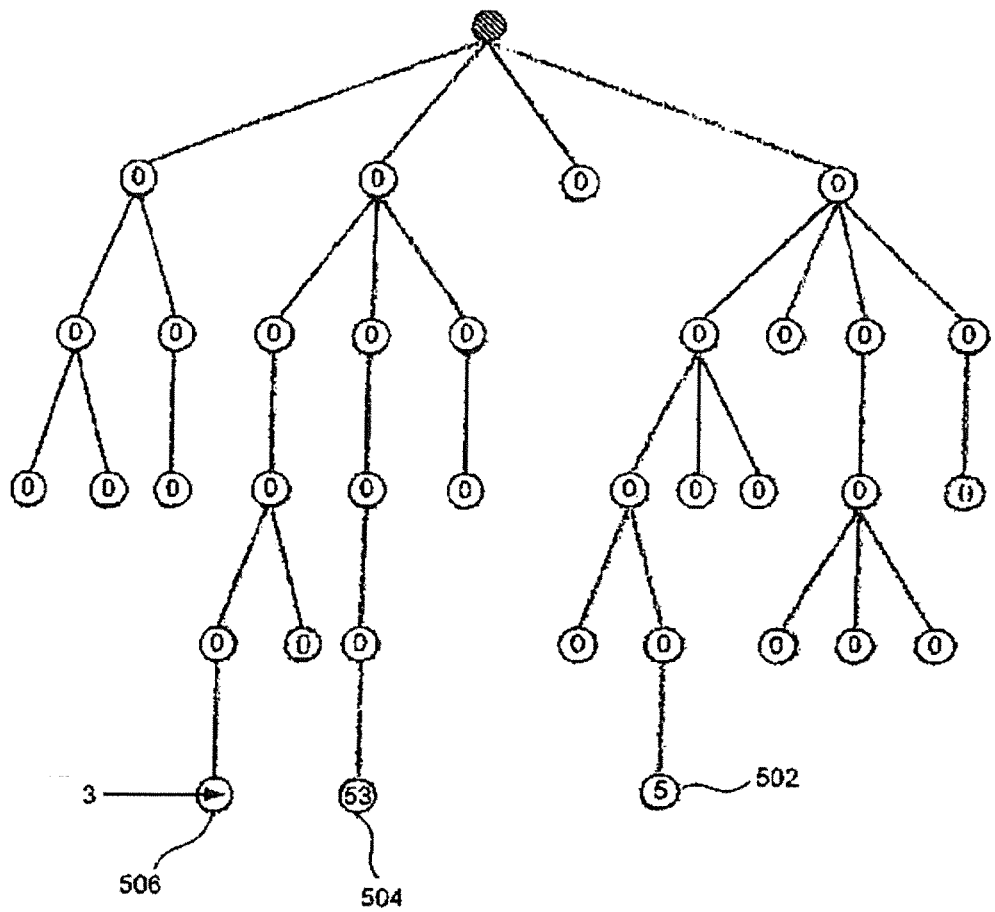
500 Fig. 7

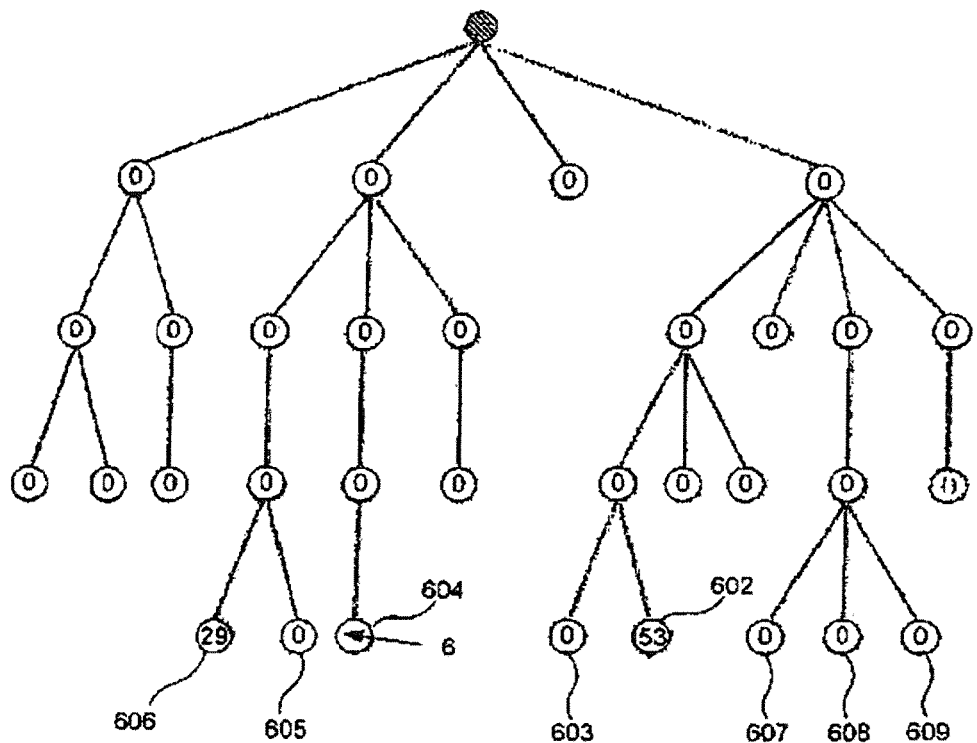
600   Fig. 8

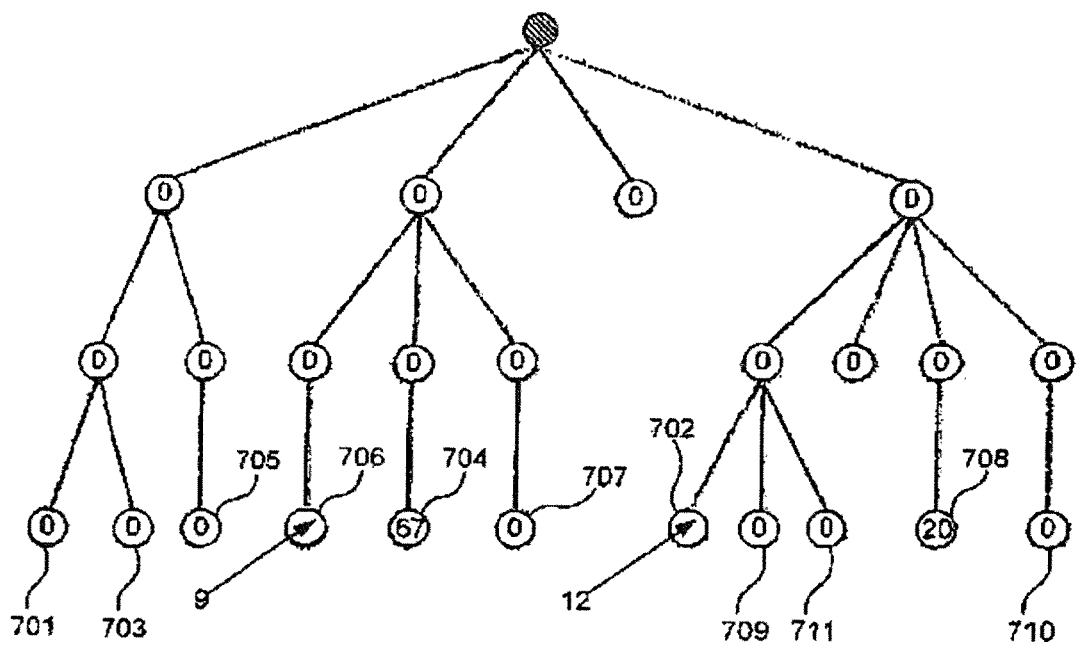
700   Fig. 9

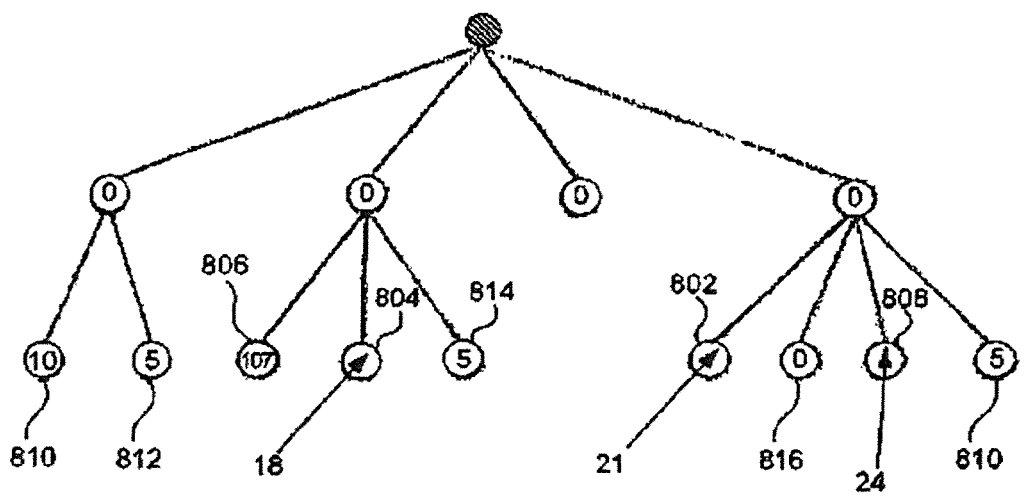
800  Fig. 10

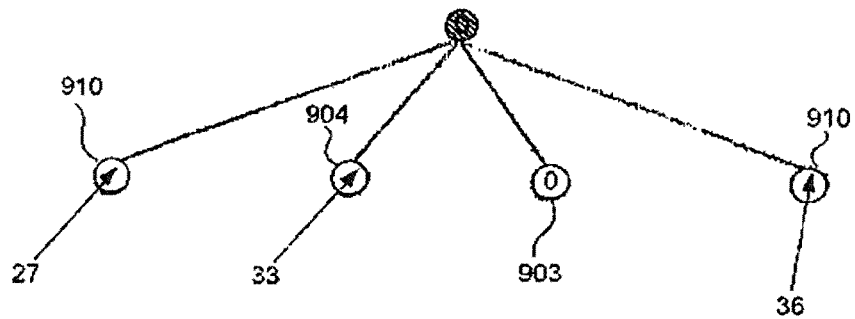
900  Fig. 11
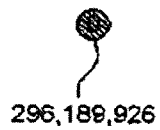
296,189,926
1000  Fig. 12

|  | Terminal Nodes Connected by One-label Edges | | | | |
|---|---|---|---|---|---|
| Terminal nodes Connected by Zero-Label Edges |  | 0 | 1 | 2 | 3 | 4 |
| | 0 | 0 | 2 | 5 | 9 | 14 |
| | 1 | 1 | 4 | 8 | 13 | |
| | 2 | 3 | 7 | 12 | | |
| | 3 | 6 | 11 | | | |
| | 4 | 10 | | | | |

Fig. 13B

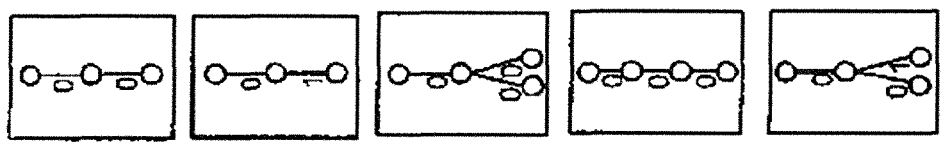
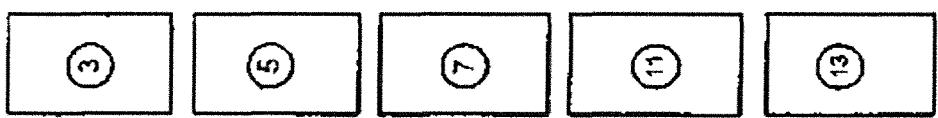
Fig. 27
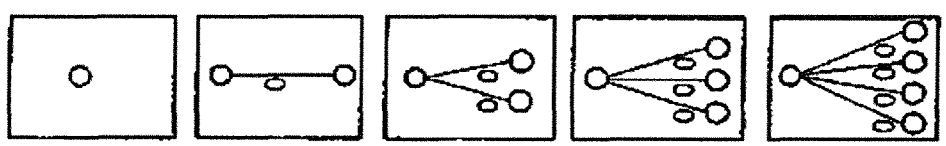
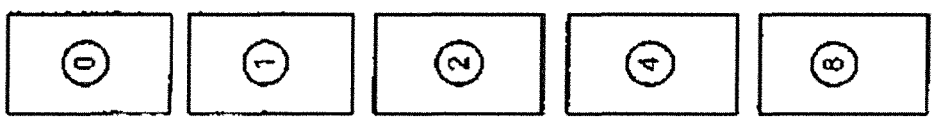

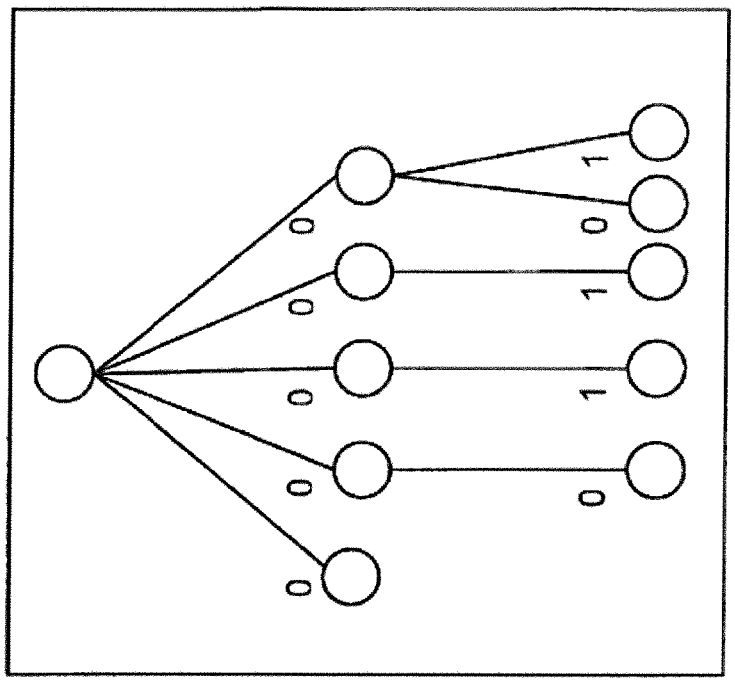
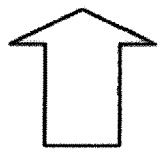
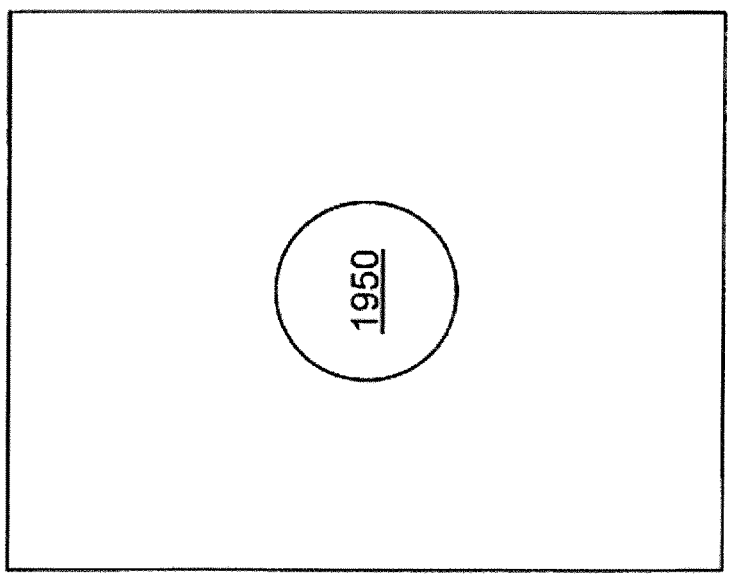
FIG. 28

| Natural # | BELTs/Tags | Non-Composite Numerals |
|---|---|---|
| 0 | ○ | — |
| 1 | ● | — |
| 2 | ●—0—● | 3 |
| 3 | ●—1—● | 5 |
| 4 | ● with two 0-branches to ● ● | 7 |
| 5 | ●—0—●—0—● | 11 |
| 6 | ● with 0-branch to ● and 1-branch to ● | 13 |

Fig. 29

METHOD AND/OR SYSTEM FOR TRANSFORMING BETWEEN TREES AND ARRAYS

RELATED APPLICATION

This application claims priority to U.S. Provisional Patent Application Ser. No. 60/667,448 filed Mar. 31, 2005, entitled METHOD AND/OR SYSTEM FOR TRANSFORMING BETWEEN TREES AND ARRAYS, assigned to the assignee of claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

FIGS. 5 through 12 are schematic diagrams of trees illustrating a process to transform between a tree and a condensed array according to an embodiment;

FIG. 13B is an array associating frontier nodes of a BELT with numerals according to an embodiment;

FIG. 27 is a table illustrating a particular embodiment of an association between numerals and BELTs and/or portions of BELTs;

FIG. 28 illustrates a representation of node label values as a portion of a BELT according to an embodiment; and FIG. 29 is a table illustrating a particular embodiment of an association between natural numerals and BELTs.

LIST OF APPENDICES

Figure 1:
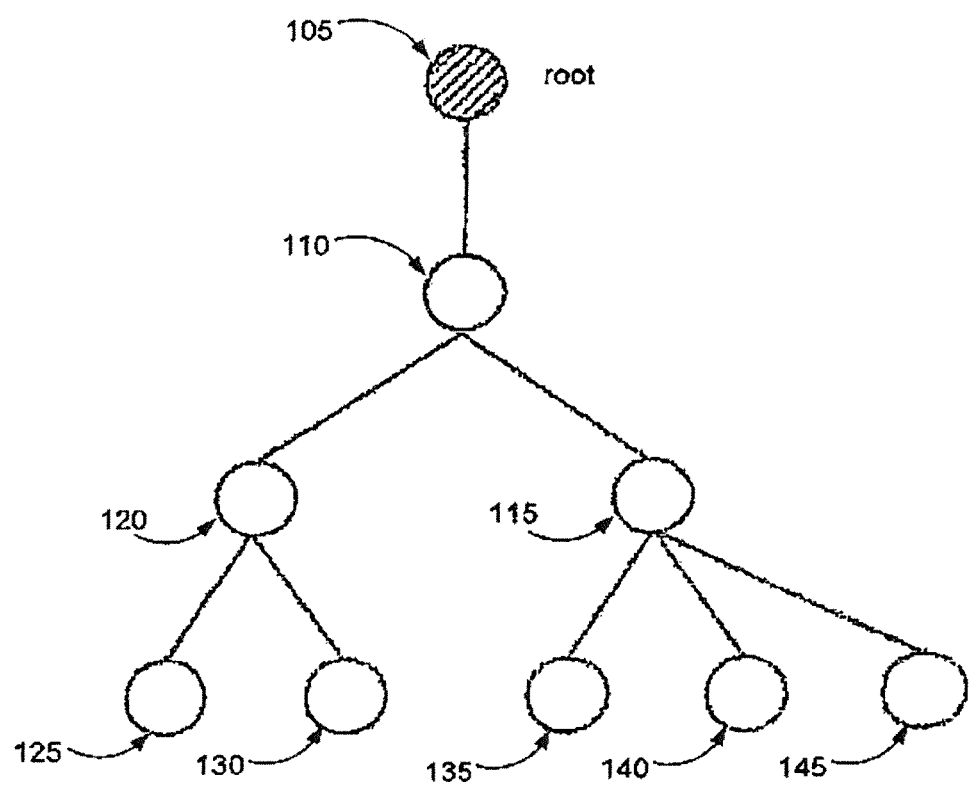
FIG. 1 is a schematic diagram of an unordered tree.
Figure 2:
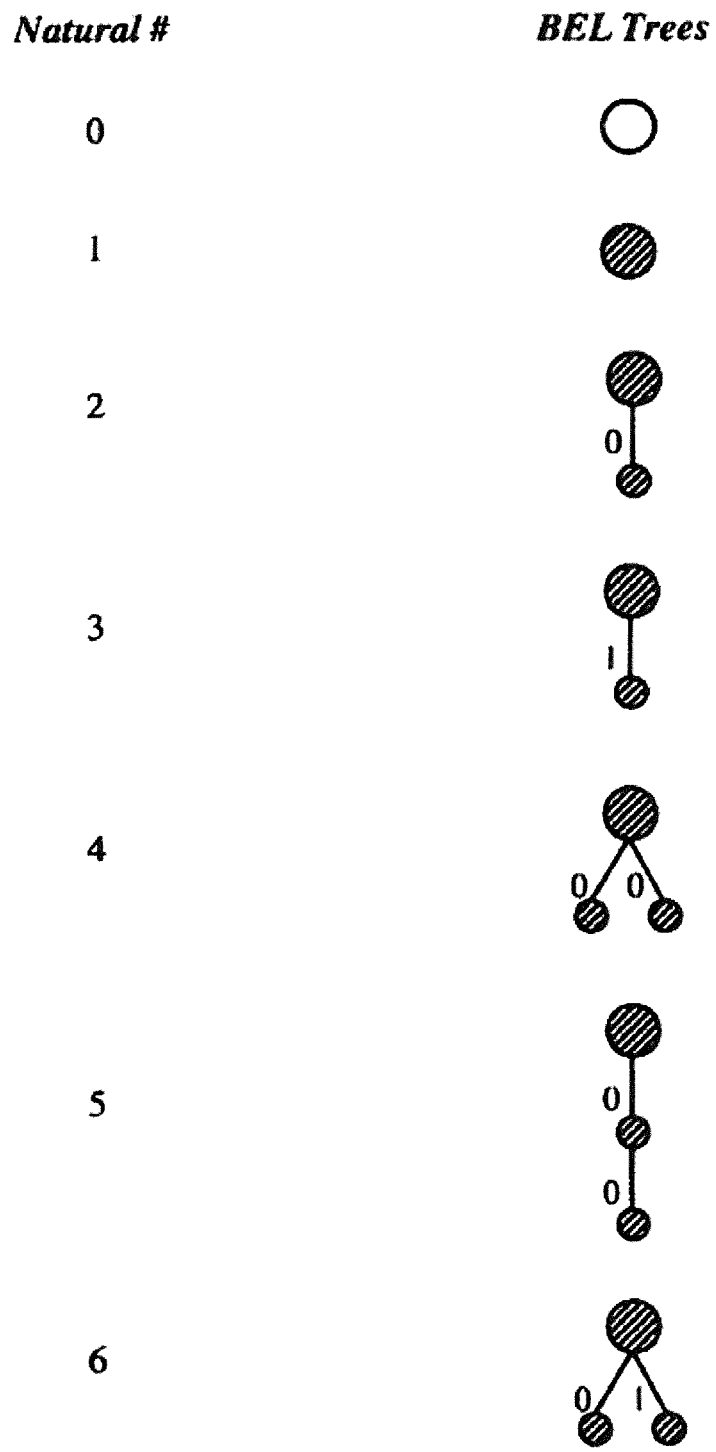
FIG. 2 is a table illustrating an embodiment of a relationship between binary edge labeled trees (BELTs) and positive natural numerals.

Appendix I comprises an array of pre-computed non-composite numerals.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing," "computing," "calculating," "transforming," "factoring," "associating," "substituting," "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices. Further, unless specifically stated otherwise, processes described herein, with reference to flow diagrams or otherwise, may also be executed and/or controlled, in whole or in part, by such a computing platform.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected and acyclic graph. Likewise, such trees may be either ordered or unordered. Here, ordered refers to the notion that there is an ordering or precedence among nodes attached to a common node corresponding to the order of the attached nodes shown in a graphical illustration. An unordered tree is illustrated here, for example, in FIG. 1 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete non-backtracking loop.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values represented as "edge label values." Similarly, in another particular embodiment, a tree may include nodes that are labeled with data and/or values represented as "node label values." However, these are merely examples of label values that may be associated with elements of a tree to store, represent and/or hold information, and claimed subject matter is not limited in these respects. Additionally, a tree storing, holding and/or representing information in nodes and edges may comprise a "feature tree" in which information may be stored, held and/or represented in node label values and/or edge label values. Accordingly, edge labeled trees and node labeled trees comprise particular types of trees in a greater class of trees known as feature trees. In one particular embodiment, such data and/or values may be limited to a particular set of data. For example, in this context, a binary edge labeled tree (BELT) refers to a tree in which the data and/or values comprise binary data, that is, in this example, either a binary one or a binary zero. Likewise, alternatively, the edges of a tree may be labeled with three values, such as 0, 1, 2. Continuing, the edges may be labeled with four values, five values, etc. In this context, the class of all finite trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with the numerals previously described. Any distinctly identifiable labels may be employed; however, in this context, it shall be understood that employing numerals to label the edges is sufficiently general to encompass any sort of data labels that may be desirable, regardless of their form.

Throughout the discussion, the term "label value" indicates information that is associated with one or more elements of a tree. In particular examples described herein, a label value may be associated with an edge and/or a node. As in particular examples of a node label value and edge label provided above, a label value may store, hold and/or represent information. In a particular embodiment, as illustrated in U.S. Provisional Application No. 60/648,950 titled "Method and/or System for Tree Transformation," filed on Jan. 31, 2005, for example, there exists a transformation between an edge labeled tree (ELT) and a node labeled tree (NLT). Here, a particular label value may take the form of a node label value and/or an edge label value based, at least in part, on the form of a tree. In a particular embodiment, although claimed subject matter is not limited in this respect, there exists a transformation between BELTs and binary node labeled trees (BNLTs). It should be understood that the information expressed in a BELT may comprise essentially the same information represented in a BNLT having the same structure of corresponding nodes and edges. Here, a transformation from a BELT to a BNLT may comprise assigning node label values to nodes in the resulting BNLT the edge label values of edges in the BELT connecting corresponding nodes to their parents. The root node in the resulting BNLT may then be assigned a null label value. Similarly, a BNLT may be transformed to a BELT using related techniques as illustrated in U.S. Provisional Application No. 60/648,950 titled "Method and/or System for Tree Transformation," filed on Jan. 31, 2005. As such, BELTs and BNLTs may comprise members of class of trees called binary labeled trees (BLTs) in which either nodes or edges hold, store and/or represent a binary label value.

To reiterate, in this context, a tree comprises an edge labeled tree if each edge of the tree respectively holds, stores and/or represents a value or piece of data. Likewise, in this context, two nodes are employed to support an edge storing, holding and/or representing a piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of claimed subject matter.

According to an embodiment, an "unlabeled tree" or "unary tree", which shall be used interchangeably throughout, may represent hierarchical data without having any information stored, held or represented in any of its edges or nodes (including root nodes and/or terminal nodes). Rather, such hierarchical data may be expressed in how nodes and/or edges in an unlabeled tree may relate to other nodes and/or edges.

According to an embodiment, trees or portions of trees may be represented by natural numerals according to an association of trees and natural numerals. Without belaboring the present discussion, additional descriptions of how natural numerals may be associated with trees are discussed in greater detail below and in U.S. patent application Ser. No. 11/005,859, filed on Dec. 6, 2004, by J. J. LeTourneau, titled, "Manipulating Sets of Hierarchical Data," assigned to the assignee of the presently claimed subject matter. It should be understood, however, that while the particular embodiments illustrated are directed to particular associations of numerals and trees, there may be many associations of trees to numerals according to corresponding particular "association embodiments," and claimed subject matter is not limited to any such particular association.

According to an embodiment, although claimed subject matter is not limited in scope in this respect, a method of enumerating a set of unordered trees may begin with enumeration of a one node binary edge labeled tree. The one node tree, which holds no data, is associated with the natural numeral one and has a graphical representation of a single node in this embodiment. For higher natural numerals, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985.

As illustrated, for this particular embodiment, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one. It should be understood that, while this particular embodiment associates a single node tree with the numeral one, and associates other trees with other numerals based, at least in part, upon this association, other embodiments illustrated below associate a single node tree with the numeral zero, or different numerals. Other trees in this association embodiment may then be based, at least in part, on this association.

Continuing with this example, to obtain the BELT for position four, observe that numeral four is the product of numeral two times numeral two. Thus, a union is formed at the root of two trees, where, here, each of those trees is associated with the natural numeral two. Likewise, to obtain the BELT for position five, begin with the BELT for position two and follow the previously articulated approach of adding a root and an edge and labeling it with a binary zero.

According to an embodiment, a "set" defines an unordered collection of unique elements or members. For example, for the purpose of illustration, a set may contain members or elements of a distinct classification, such as the set of all automobiles in a parking lot of a particular color. In a particular embodiment, for example, trees may be classified into sets defined by certain characteristics, such as the set of binary edge labeled trees or the set of unlabeled trees, and the like. However, this is merely an example of how trees may be classified into distinct sets and claimed subject matter is not limited in this respect.

According to an embodiment, a "multiset" may define an unordered collection of possibly repeating elements or members. In a particular embodiment, for example, a multiset may count and/or enumerate multiple instances of the same element or member.

According to an embodiment, a "transformation" defines a process by which elements of a first set may be mapped between and/or associated with elements of a second set. For example, in a particular embodiment, a transformation may map and/or associate a member of the set of trees with a member of the set of condensed arrays containing numerals. However, this is merely an example of how a transformation may map and/or associate members of one set to members of another set, and claimed subject matter is not limited in these respects.

According to an embodiment, a transformation may associate and/or map an element in a first set with an element in a second set as an "elementary equivalent." Here, in a particular embodiment, such a transformation may associate such elementary equivalent elements in different sets in a one-to-one and onto mapping in which the transformation defines for elements in a first set corresponding, unique elementary equivalents in a second set. Similarly, a transformation may also map and/or associate members of the second set to corresponding elementary equivalents in the first set. Examples of a transformations mapping and/or associating elementary equivalent elements of different sets may be found in, for example, "Logical Number Theory I: An Introduction," Craig Smorynski, Springer-Verlag, 1991, p. 305. In a particular embodiment, for example, a transformation may map and/or associate trees of a first type (e.g., a member of the set of unlabeled trees, node labeled trees or BELTs) to elementary equivalent trees of a second type. However, this is merely an example of how a transformation may map and/or associate members of different sets as elementary equivalents, and claimed subject matter is not limited in these respects.

An "array" as referred to herein means an arrangement of information. In one embodiment, an array may comprise one or more entries which are locatable by one or more coordinates and/or indices. In a particular example, a computing platform may define one or more arrays for storing information in a storage medium in an arrangement that enables retrieval of the stored information for processing, display, transmission and/or other purposes. However, this is merely an example of how an array may be implemented and claimed subject matter is not limited in this respect.

The quantity of information that an array may be capable of representing may be based, at least in part, upon on a capacity of a storage device that is used to store, hold and/or represent the information in the array. The quantity of information that an array may be capable of representing may also be based, at least in part, upon the manner in which information is associated and/or represented in the array. In one embodiment, a "sparse" array may store information in entries of an array in which a portion of the elements have the same value, and this value is a constant and/or known in advance. In many fields of engineering, sparse arrays (in particular, arrays that consist almost entirely of zeros) are quite common. Therefore, it is worthwhile to develop methods for handling data in such arrays.

According to an embodiment, it may be useful to transform between trees and arrays to enable computation, manipulation and/or analysis of hierarchical data which is represented in trees. In particular, it may be useful to transform trees to arrays for storage in a computing platform for computation and other purposes. Here, a sparse array may express a relationship among nodes in a tree. In one particular example, although claimed subject matter is not limited in this respect, the nodes of a tree may be sequentially numbered from 1 to n where n is the number of nodes in the tree. An n×n sparse array may identify which nodes are connected by an edge by having a "1" entry for locations i, j in the where nodes i and j are connected by an edge (for all i=1 to n and all j=1 to n). The remaining entries may hold zeros. However, this is merely an example of a sparse array and claimed subject matter is not limited in these respects.

According to an embodiment, a transformation may define a relationship between trees and "condensed" arrays. In a particular embodiment, although claimed subject matter is not limited in this respect, a condensed array may represent a tree using substantially less information than with a sparse array. In one embodiment particular embodiment, although claimed subject matter is not limited in these respects, a condensed array may comprise a fixed size in one or more dimensions. Where a condensed array comprises a table, for example, such a condensed array may have a fixed number of rows and/or columns. However, this is merely an example of a condensed array and claimed subject matter is not limited in these respects. According to a particular embodiment, a condensed array may be used for representing a tree in a compressed and/or compact format for storage in a memory device and/or for transmission in an information transmission medium. However, these are merely examples of applications of transforming between trees and condensed arrays, and claimed subject matter is not limited in these respects.

Figure 3:
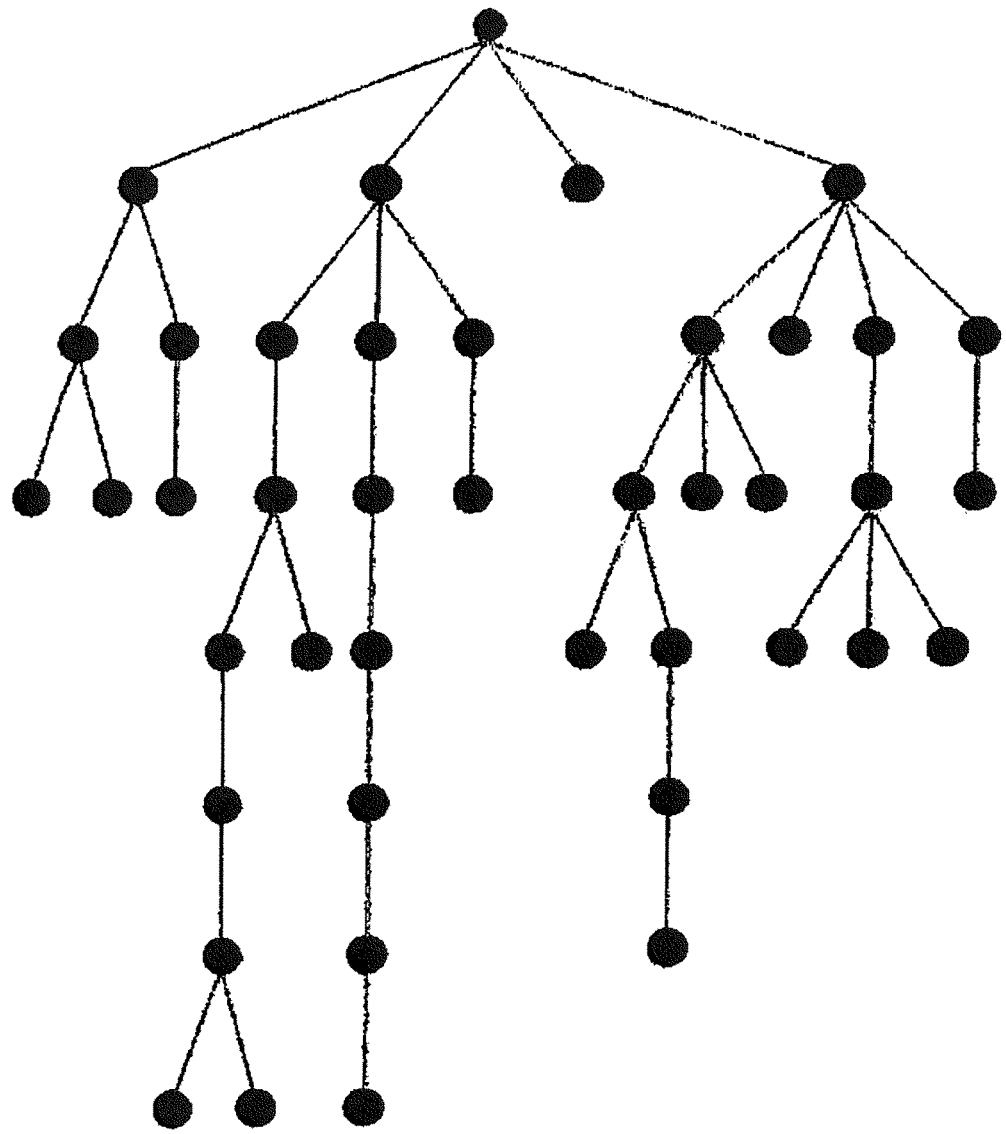
FIG. 3 is a schematic diagram of an unlabeled tree according to an embodiment.
Figure 4:
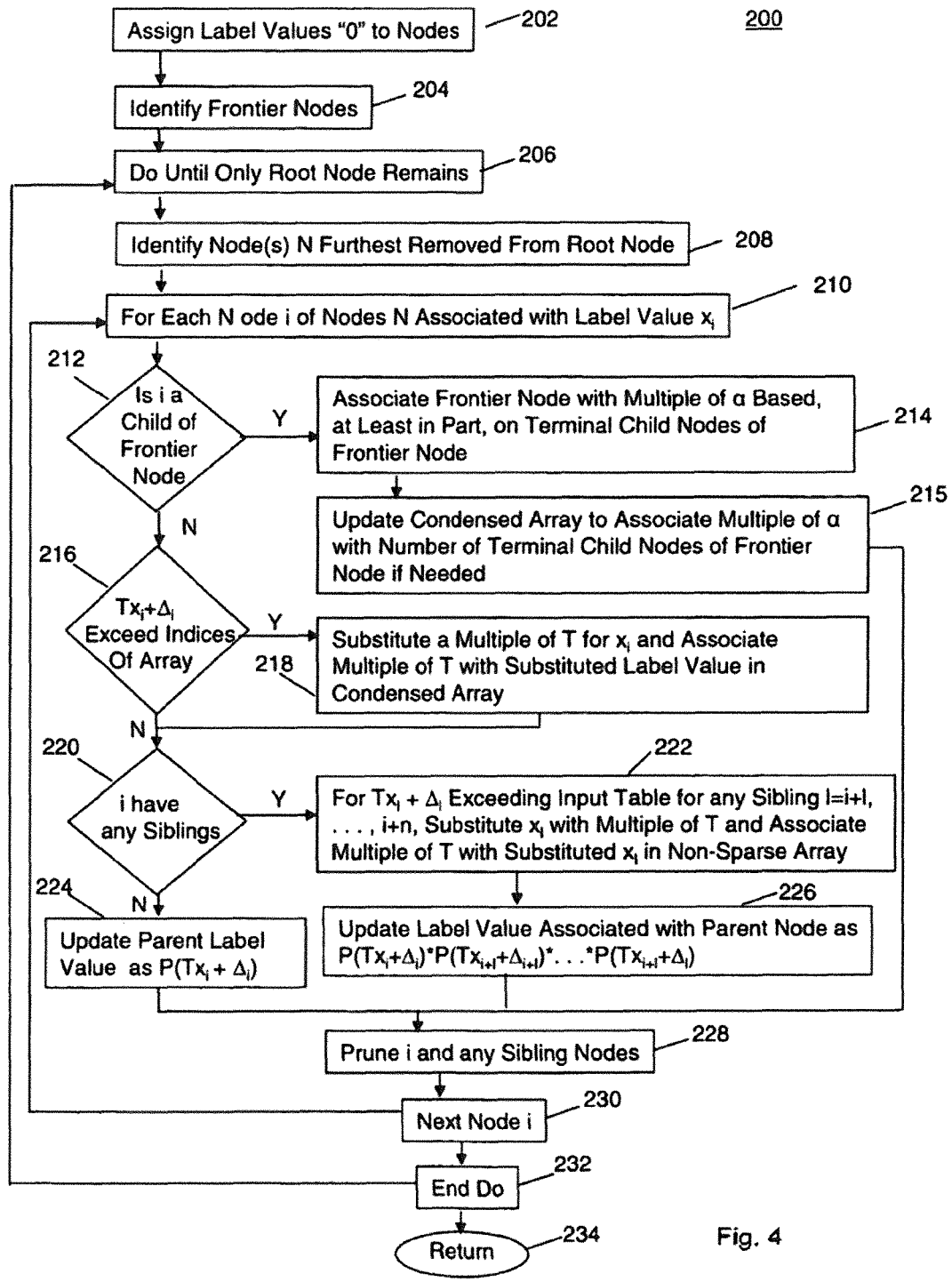
FIG. 4 is a flow diagram illustrating a process of transforming between a tree and a condensed array according to an embodiment.
Figure 5:
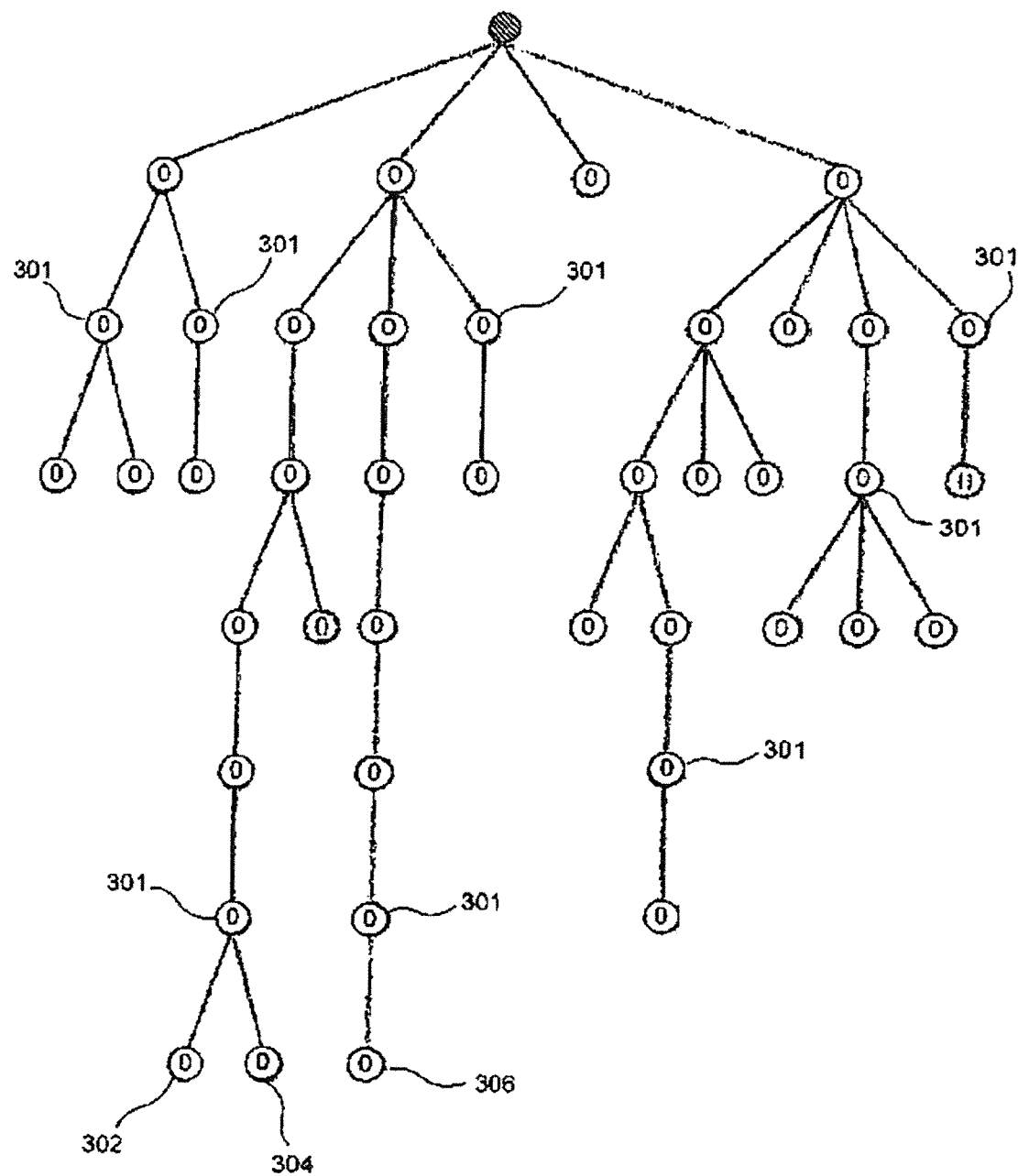

FIG. 3 is a schematic diagram of a unary or unlabeled tree 150 according to an embodiment. FIG. 4 is a flow diagram illustrating a process embodiment 200 of transforming between a tree and a condensed array. As illustrated by way of a particular example, process embodiment 200 may define a transformation of tree 150 to a condensed array. As will be illustrated below, and referred to throughout this particular example in the discussion, there exists a transformation between tree 150 and the following condensed array of Table 1 below:

TABLE 1

| Index | Substitute Numeral | Substituted Numeral |
|---|---|---|
| 1 | 3 | 127 |
| 2 | 5 | 1 |
| 3 | 6 | 941 |
| 4 | 9 | 914 |
| 5 | 10 | 2 |
| 6 | 12 | 1882 |
| 7 | 18 | 881 |
| 8 | 20 | 3 |
| 9 | 21 | 628 |
| 10 | 24 | 283 |
| 11 | 25 | Ø |
| 12 | 27 | 6731 |
| 13 | 33 | 29,108,077 |
| 14 | 35 | Ø |
| 15 | 36 | 12,098,522 |
| 16 | 39 | 296,189,926 |

In the particular embodiment of a condensed array as shown in Table 1, although claimed subject matter is not limited in this respect, a fixed number of columns represent tree 150. Here, a first column provides substituted numerals, a second column provides corresponding substitute numerals, and a third column provides sequential indices associating substituted numerals and corresponding substitute numerals provided in the first and second columns. In alternative embodiments, information in Table 1 may be expressed in a condensed array comprising a fixed number of rows which set forth the aforementioned substituted numerals, substitute numerals and sequential indices. Again, however, these are merely examples of how a tree may be expressed in a condensed array and claimed subject matter is not limited in these respects.

As illustrated below, FIG. 4 sets forth a process embodiment 200 to transform a tree to a condensed array. As will be discussed below, process embodiment 200 employs a relationship between trees and non-composite numerals according to an association of trees and numerals. Portions of a transformed tree which comprise node connected by edges, in a particular embodiment, may be represented as subtrees. Such subtrees may be associated with numerals according to an association of trees and numerals as described in the aforementioned U.S. patent application Ser. No. 11/005,859, filed on Dec. 6, 2004.

FIGS. 5 through 12 are schematic diagrams of trees illustrating a process to transform between a tree 150 and a condensed array shown Table 1 according to a particular example of process embodiment 200 of FIG. 4. In this particular example of process embodiment 200, for the purposes of discussion, a unary or unlabeled tree is transformed to a condensed array. The following discussion will make reference to FIGS. 5 through 12 to illustrate one particular example of a transformation between unary or unlabeled trees and condensed arrays. However, other examples of process embodiment 200, provided with reference to FIGS. 13B through 18, may be applied to transformations between trees with node and/or edge labeled values and condensed arrays. Also, it should be understood that any of the particular examples of process embodiment 200 described herein are merely examples of a transformation between a tree and a condensed array, and claimed subject matter is not limited in these respects.

As pointed out above, tree 150 has no edge labels and no node labels. Accordingly, tree 150 may be referred to as an unlabeled and/or unary tree. At block, 202, non-root nodes may be associated with a zero label value with the resulting tree 300 shown in FIG. 5. As illustrated from FIG. 5, a tree may comprise a single root node but multiple terminal nodes. According to an embodiment, a tree may comprise one or more nodes which are "frontier nodes." A frontier node is connected to one or more child nodes and does not have any grandchild node or any grandchildren nodes. In other words, a frontier node has at least one child node and all nodes descending from a frontier node are terminal nodes. At block 204, in the presently illustrated embodiment, frontier nodes may be identified as nodes 301.

According to an embodiment, a tree may be expressed as one or more "subtrees" merged at the root node of the tree. A subtree is connected to the root node of the tree at an edge and independently has properties of a tree, except that the subtree is part of a larger tree. For example, here, a subtree comprises at least a "root" node coupled by an edge to a root node of the larger tree. Additional nodes and edges may be connected to the root node of the subtree. While a subtree may comprise an edge connected to the root node of the tree, the size and shape of the subtree may express information like that of a tree having the same size and shape as the subtree. The subtrees merged together at the root node of a tree may be referred to as "subtree children" of the tree node and any particular one of such subtrees may be referred to as a "subtree child" of the tree in this embodiment.

By extension of the above examples of subtrees, a "parent" node in a tree having descendent nodes may itself comprise a root of a tree where descendant nodes are associated with subtree children of the parent node. Blocks 206 through 232, according to a particular embodiment, represent portions of tree 300 as numerals to be represented in entries of a condensed array such as the condensed array of Table 1. Beginning with terminal nodes which are furthest removed from the root node, process embodiment 200 associates numerals with parent nodes and their descendant nodes based, at least in part, on an association of trees and numerals. In the particular embodiment, a subtree child of a parent node may be associated with a non-composite numeral which is based, at least in part, on one or more label values associated with the descendant subtree. Accordingly, a parent node may represent a merger of its descendant subtree children as a product of non-composite numerals representing respective subtree children. In one example, this product may be applied as a label value associated with the parent node. As illustrated below, according to a particular embodiment, associating subtree children with non-composite numerals may make use of an array comprising a finite sequence of pre-computed non-composite numerals. To address finiteness of such a sequence of non-composite numerals, according to a particular embodiment, from time to time large label values may be substituted for smaller values. The condensed array may then associate the substituted larger label values with their smaller substitutes.

In addition to associating smaller numeral substitutes for larger substituted label values, a condensed array such as the condensed array of Table 1 may also associate label values associated with frontier nodes with child terminal nodes descending from the frontier nodes. As will be illustrated in the particular embodiment below, the condensed array associates larger substituted label values with substitute numerals that are multiples of a first numeral "T" (e.g., T=three in a particular embodiment illustrated below). In a particular embodiment, the condensed array also associates child terminal nodes descending from frontier nodes with substitute numerals that are multiples of a second, non-composite numeral "α" (e.g., α=five in the particular embodiment illustrated below). To prevent ambiguity as to whether a substitute entry represents a larger label value or a label value representing terminal node children of a frontier node, according to a particular example, substitute numerals entered in the condensed table may be multiples of the first non-composite numeral T or the second non-composite numeral α. In one particular embodiment, although claimed subject matter is not limited in this respect, substitute numerals may be chosen to be a multiple of T or α, but not multiples of both T and α. Here, it should be noted that the choice of representing larger substituted-label values as particular multiples of T=three and the choice of representing a number of child terminal nodes as particular multiples of α=five in are merely examples, and that multiples of different numerals may be used. However, in the particular embodiments illustrated herein, although claimed subject matter is not limited in these respects, α comprises a non-composite numeral that is greater than T.

At block 208, nodes 302, 304 and 306 of tree 300 are identified as being furthest from the root node (seven nodes removed from the root node in this particular example). Subsequent execution of blocks 210 through 228 may, according to a particular embodiment of process embodiment 200, determine label values for parents of nodes 302, 304 and 306. Diamond 212 determines that these nodes are frontier nodes.

According to a particular embodiment, although claimed subject matter is not limited in this respect, block 214 may represent a frontier node and its terminal node children as a multiple of α. In the particular example transformation of a unary tree illustrated with reference to FIGS. 5 through 12, a multiple of α may represent a count of the number of terminal node children of such a frontier node. In other non-unary trees, such as trees with labeled nodes and/or edges such as BELTs, such a multiple of α may also represent edge and/or label values associated with particular child nodes and/or edges connecting such child nodes to the parent frontier node. In this particular example of transforming a unary tree as illustrated with reference to FIGS. 5 through 12, block 214 may label the parent of nodes 302 and 304 with numeral "10" (a multiple of α to represent two terminal children) and label the parent of node 306 with "5" (a multiple of α to represent a single terminal child) as shown in FIG. 6 as resulting nodes 406 and 404. Block 215 updates the condensed array to associate the Label values associated with nodes 406 (numeral "5") and 404 (numeral "10") with respective substituted numerals "1" and "2", representing frontier nodes having a single terminal node and pair of terminal nodes as reflected below in Table 2. Terminal nodes 302, 304 and 306 are pruned at block 228.

TABLE 2

| Substitute Numeral | Substituted Numeral |
| --- | --- |
| 5 | 1 |
| 10 | 2 |

Returning to block 208, in this particular example, nodes 402, 404 and 406 of tree 400 are nodes which are furthest removed from the root node. Here, diamond 212 may determine that node 402 is a single terminal node child of a frontier node in tree 300. Accordingly, in this particular example, block 214 assigns label value associated with numeral "5" to the parent of node 402 shown as node 502 in tree 500 of FIG. 7. Since the condensed array already associates label value numeral "5" with a single terminal node depending from a frontier node, no update of the condensed array is needed at block 215. Since nodes 404 and 406 are not terminal nodes depending from frontier nodes, as determined at diamond 212, in this particular example, label values associated with their respective parents may be determined, at least in part, as a function of label values associated with nodes 404 and 406.

According to an embodiment, a label value associated with a parent node which is not a frontier node may be determined, at least in part, as a function of label values associated with its children. Here, a label value K of such a parent node may be determined according to relation (1) as follows:

$$K = P(Tx_1 + \Delta_1) * P(Tx_2 + \Delta_2) * \ldots * P(Tx_i + \Delta_i) \quad (1)$$

Where:
P(n) is the well known Kleene enumeration function for generating the sequence of non-composite numerals;
$x_i$=label value associated with child "i";
T=the aforementioned numeral used for generating smaller substitute numerals of label values; and
$\Delta_i$=a numeral to represent a label value associated with an edge connecting the child node to the parent node.

In the context of the above identified Kleene enumeration function, the term prime numerals and non-composite numerals may be used interchangeably throughout. According to an embodiment, values of factors $P(Tx_i + \Delta_i)$ which are used for determining label values associated with the parent node may be pre-computed and obtained from an array of pre-computed non-composite numerals which are indexed by natural numerals. Here, a non-composite numeral $P(Tx_i + \Delta_i)$ in the array of pre-computed non-composite numerals may be associated with an index comprising argument "$Tx_i + \Delta_i$". It should be understood that such an array may comprise a finite enumeration of non-composite numerals. For the purpose of illustrating a particular example, Appendix 1 lists the first 350 non-composite numerals from 2 through 2357. Here, Appendix 1 provides the first 350 non-composite numerals in columns A through G as follows:

P(1) to P(50)—column A
P(51) to P(100)—column B
P(101) to P(150)—column C
P(151) to P(200)—column D
P(201) to P(250)—column E
P(251) to P(300)—column F
P(301) to P(350)—column G According to an embodiment, argument "$Tx_i+\Delta_i$" may exceed indices of the array of pre-computed non-composite numerals. In the presently illustrated embodiment, the Appendix I is capable of providing a pre-computed non-composite numeral for indices between 1 and 350. However, it should be understood that this particular enumeration of the first 350 non-composite numerals is merely an example, and that other arrays of pre-computed non-composite numerals may comprise fewer than the first 350 non-composite numerals or more than the first 350 non-composite numerals.

In a particular embodiment illustrating a transformation of unary tree 150 to a condensed array, the numeral T=3 and, since in this particular of tree 150 embodiment edges are unlabeled, $\Delta_i$ may be set to a constant one for all nodes i. Accordingly, argument "$Tx_i+\Delta_i$" may be set to "$3x_i+1$". Again, however, while "$Tx_i+\Delta_i$" may be set to "$3x_i+1$" in this particular embodiment, argument "$Tx_i+\Delta_i$" may be set to different expressions (e.g., as illustrated below in the case of transforming a BELT to a condensed array). Returning to process embodiment 200 for determination of label values for parents of nodes 406 and 404, argument "$3x_i+1$" corresponding to node 406 equals thirty-one and argument "$3x_i+1$" corresponding to node 404 equals sixteen. Since thirty-one and sixteen are within indices of the array of pre-computed non-composite numerals, in this particular embodiment of an array of non-composite numerals, diamond 216 determines that label values associated with 406 and 404 are not to be substituted with smaller values that are multiples of three. Block 224 updates the label values associated with parents of nodes 406 and 404, shown as nodes 506 and 504 in FIG. 7 in this particular embodiment, as "127" and "53", respectively. Returning to block 206 in this particular example, block 208 identifies nodes 502, 504 and 506 as being the furthest removed from the root node. Diamond 212 determines that none of these nodes are children of a frontier node. Since label value associated with nodes 502 and 504 equal five and fifty-three, respectively, argument "$3x_i+1$" corresponding to node 502 equals sixteen and argument "$3x_i+1$" corresponding to node 504 equals 160. Accordingly, these arguments do not exceed indices of the array of pre-computed non-composite numerals in this particular embodiment, and diamond 216 determines that label values associated with nodes 502 and 504 are not to be substituted with smaller values that are multiples of T (where T=3 in this particular embodiment). Block 224 updates the label values associated with respective parents of nodes 502 and 504, shown as nodes 602 and 604 in FIG. 8, as "53" and "941." Block 228 then prunes nodes 402 and 404.

Regarding update of a label value for parent of node 506, argument "$3x_i+1$" for label value associated with "127" exceeds indices of the array of pre-computed non-composite numerals as determined at diamond 216. Accordingly, block 218 substitutes this label value with a multiple of three. Since this is the first substitution of a larger label value to a multiple of T in this particular transformation of tree 150, block 218 will substitute the larger label value associated with "127" with "3" and indicate this substitution in an updated condensed array as illustrated in Table 3.

TABLE 3

| Substitute Numeral | Substituted Numeral |
| --- | --- |
| 3 | 127 |
| 5 | 1 |
| 10 | 2 |

This substitution is illustrated in FIG. 7 with a line through the larger label value "127" and the inclusion of "3" as an updated label value. Block 224 updates a label value associated with the parent of node 506 as P(3*3+1)=29, as indicated for node 606 in FIG. 8, and block 228 prunes node 506.

Returning to block 208 in connection with tree 600 of FIG. 8, nodes 602 through 609 are nodes furthest removed from the root node. Beginning with nodes 607, 608 and 609, diamond 212 determines that these nodes are children of a frontier node. Accordingly, block 214 determines updates of a label value associated with the parent frontier node with a multiple of α (where α=5 in this particular embodiment). As reflected in the condensed array, numerals "5" and "10" have already been used to indicate frontier nodes having a single terminal node and two terminal node children of frontier nodes as illustrated in tree 400 or FIG. 6. Since the next multiple of α (where α=5 in this particular embodiment), fifteen, is also a multiple of T (where T=3 in this particular embodiment), block 214 may update a label value associated with parent of nodes 607, 608 and 609 with "20" (which is the next multiple of α after fifteen). This label is reflected in an update to the condensed array to associate the label value "20" with a frontier node having three terminal node children as shown in Table 4.

TABLE 4

| Substitute Numeral | Substituted Numeral |
| --- | --- |
| 3 | 127 |
| 5 | 1 |
| 10 | 2 |
| 20 | 3 |

Nodes 602 and 603, which are not children of a frontier node as determined at diamond 212, have label values associated with "53" and "0", respectively, and diamond 216 determines that argument "$3x_i+1$" does not exceed indices of the array of pre-computed non-composite numerals for either label value. Accordingly, block 226 determines a label value associated with the parent of nodes 602 and 603 as P(3*53+1)*P(3*0+1)=241*2=1882. This updated label value is reflected as a label value associated with node 702 of tree 700 in FIG. 9. In a similar fashion, nodes 605 and 606, which are not children of a frontier node, have label values associated with "0" and "29," respectively, and diamond 216 determines that argument "$3x_i+1$" does not exceed indices of the array of pre-computed non-composite numerals for either label value. Accordingly, block 226 determines a label value associated with parent of nodes 605 and 606 as P(3*29+1)*P(3*0+1)=457*2=914. This updated label value is reflected as a label value associated with node 706 of tree 700 in FIG. 9.

Regarding update of a label value for the parent of node 604, argument "$3x_i+1$" for a label value associated with "941" exceeds indices of the array of pre-computed non-composite numerals as determined at diamond 216. Accordingly, block 218 substitutes this label value with a multiple of three. Since this is a second substitution of a larger label value to a multiple of T, in this particular transformation of tree 150, block 218 will substitute the larger label value associated with "941" with "6" and indicate this substitution in an updated condensed array as illustrated in Table 5.

TABLE 5

| Substitute Numeral | Substituted Numeral |
|---|---|
| 3 | 127 |
| 5 | 1 |
| 6 | 941 |
| 10 | 2 |
| 20 | 3 |

This substitution is illustrated in FIG. 8 with a line through the larger label value "941" and the inclusion of "6" as an updated label value. Block 224 updates a label value associated with parent of node 604 as P(3*6+1)=67, as indicated for node 704 in FIG. 9, and block 228 prunes node 604.

Returning to block 208 in connection with tree 700 of FIG. 9, continuing with the present example, nodes 701 through 711 are nodes furthest removed from the root node. Beginning with nodes 701, 703, 705, 707 and 710, diamond 212 determines that these nodes comprise children of a frontier node. Here, parent of nodes 701 and 703, has two child terminal nodes. Accordingly, a label value associated with this parent node is updated as "10" to be consistent with a label value applied to node 406 (FIG. 6) representing a frontier node with two terminal node children (and as reflected in the condensed array). This is reflected in a label value associated with "10" applied to node 810 of tree 800 (FIG. 10). Similarly, parents of the non-sibling nodes 705, 707 and 710 are updated as "5" to be consistent with a label value applied to node 404 (FIG. 6) representing a frontier node with a single terminal node child (and as reflected in the condensed array). This is reflected in a label value associated with "5" applied to nodes 810, 812 and 814 of tree 800 (FIG. 10).

Regarding update of label values associated with the parents of non-sibling nodes 704 and 708, argument "$3x_i+1$" does not exceed indices of the array of pre-computed non-composite numerals. Accordingly, label values associated with these parent nodes are updated as P(3*67+1)=P(202)=881 and P(3*20+1)=P(61)=283. These updated label values are illustrated in FIG. 10, in a particular example, as label values associated with nodes 804 and 808 of tree 800 (FIG. 10). Block 228 then prunes nodes 704 and 708.

Regarding update of label values associated with parent of node 706, argument "$3x_i+1$" exceeds indices of the array of pre-computed non-composite numerals as determined at diamond 216. Accordingly, block 218 substitutes label value "914" with a multiple of three. Since this is a third substitution of a larger label value to a multiple of three in this particular transformation of tree 150, block 218 will substitute the larger label value associated with "914" with "9" and indicate this substitution in an updated condensed array of Table 6.

TABLE 6

| Substitute Numeral | Substituted Numeral |
|---|---|
| 3 | 127 |
| 5 | 1 |
| 6 | 941 |
| 9 | 914 |

TABLE 6-continued

| Substitute Numeral | Substituted Numeral |
|---|---|
| 10 | 2 |
| 20 | 3 |

This substitution is illustrated in FIG. 9, in this particular example, with a line through the larger label value "914" and inclusion of "9" as an updated label value. Block 224 updates a label value associated with parent of node 604 as P(3*9+1)=107, as indicated for node 806 in the particular embodiment of FIG. 10, and block 228 prunes node 706.

Regarding update of a label value associated with parent of sibling nodes 702, 709 and 711, node 702 is not a child of a frontier node as determined at diamond 212. Argument "$3x_i+1$" corresponding with a label value associated with node 702 exceeds indices of the array of pre-computed non-composite numerals as determined at diamond 216. Accordingly, block 218 substitutes the label value "1882" with a multiple of three. Since this is a fourth substitution of a larger label value to a multiple of three in this particular transformation of tree 150, block 218 will substitute the larger label value associated with "1882" with "12" and indicate this substitution in an updated condensed array of Table 7.

TABLE 7

| Substitute Numeral | Substituted Numeral |
|---|---|
| 3 | 127 |
| 5 | 1 |
| 6 | 941 |
| 9 | 914 |
| 10 | 2 |
| 12 | 1882 |
| 20 | 3 |

This substitution is illustrated in FIG. 9, in a particular example, with a line through the larger label value "1882" and inclusion of "12" as an updated label value. Since nodes 709 and 711 are siblings of node 702, block 222 determines that argument "$3x_i+1$" corresponding with label values associated with nodes 709 and 711 do not exceed indices of the array of pre-computed non-composite numerals. Accordingly, in this particular embodiment, block 222 makes no substitutions of label values associated with nodes 709 and 711 and block 226 updates a label value associated with parent of nodes 702, 709 and 711 as P(3*12+1)*P(3*0+1)*P(3*0+1)=P(37)*P(1)*P(1)=157*2*2=628, as indicated for node 802 in FIG. 10, and block 228 prunes nodes 702, 709 and 711.

Returning to block 208 in connection with tree 800 of FIG. 10, continuing with this particular example, nodes 802 through 816 are nodes furthest removed from the root node. Beginning with nodes 810 and 812, diamond 212 determines that these nodes are not children of a frontier node. Argument "$3x_i+1$" corresponding with the label values associated with nodes 810 and 812 also do not exceed indices of the array of pre-computed non-composite numerals as determined at diamond 216. Accordingly, block 226 updates a label value associated with parent of sibling nodes 810 and 812 as P(3*10+1)*P(3*5+1)=P(31)*P(16)=127*41=6731, as indicated for node 910 in FIG. 11, and block 228 prunes nodes 810 and 812.

Regarding update of a label value associated with parent of sibling nodes 804, 806 and 814, these nodes are not children of a frontier node as determined at diamond 212.

Argument "$3x_i+1$" corresponding with a label value associated with node 804 exceeds indices of the array of pre-computed non-composite numerals as determined at diamond 216. Accordingly, block 218 substitutes label value "881" with a multiple of three. This is a fifth substitution of a larger label value to a multiple of three in this particular transformation of tree 150. Since fifteen is a multiple of both T and a (where T=3 and α=5 in this particular embodiment), block 218 may substitute the larger label value associated with "881" with "18", which is the next multiple of three after fifteen, and indicate this substitution in an updated condensed array illustrated in Table 8.

TABLE 8

| Substitute Numeral | Substituted Numeral |
| --- | --- |
| 3 | 127 |
| 5 | 1 |
| 6 | 941 |
| 9 | 914 |
| 10 | 2 |
| 12 | 1882 |
| 18 | 881 |
| 20 | 3 |

This substitution is illustrated in FIG. 10 with a line through the larger label value "881" and inclusion of "18" as an updated label value. Since nodes 806 and 814 are siblings of node 804, block 222 determines that argument "$3x_i+1$" corresponding with label values associated with nodes 806 and 814 do not exceed indices of the array of pre-computed non-composite numerals. Accordingly, block 222 makes no substitutions of label values associated with nodes 806 and 814. Block 226 updates label value associated with parent of nodes 804, 806 and 814 as P(3*107+1)*P(3*18+1)*P(3*5+1)=P(322)*P(55)*P(16)=2137*257*53=29,108,077, as indicated for node 904 in FIG. 11, and block 228 prunes nodes 804, 806 and 814.

Regarding update of a label value associated with a parent of sibling nodes 802, 808, 810 and 816, these nodes are not children of a frontier node as determined at diamond 212. Argument "$3x_i+1$" corresponding with a label value associated with node 802 exceeds indices of the array of pre-computed non-composite numerals as determined at diamond 216. Accordingly, block 218 substitutes label value "628" with a multiple of three. Since this is a sixth substitution of a larger label value to a multiple of three in this particular transformation of tree 150, block 218 may substitute the larger label value associated with "628" with the next multiple of three (after "18") "21", and indicate this substitution in an updated condensed array of Table 9.

TABLE 9

| Substitute Numeral | Substituted Numeral |
| --- | --- |
| 3 | 127 |
| 5 | 1 |
| 6 | 941 |
| 9 | 914 |
| 10 | 2 |
| 12 | 1882 |
| 18 | 881 |
| 20 | 3 |
| 21 | 628 |

This substitution is illustrated in FIG. 10 with a line through the larger label value "628" and inclusion of "21" as an updated label value. Block 222 determines that argument "$3x_i+1$" corresponding with label values associated with nodes 810 and 816 do not exceed indices of the array of pre-computed non-composite numerals, in this particular embodiment. However, block 222 determines that argument "$3x_i+1$" corresponding with a label value associated with nodes 808 does exceed indices of the array of pre-computed non-composite numerals. Here, block 222 substitutes label value "283" with a multiple of three. Since this is a seventh substitution of a larger label value to a multiple of three in this particular transformation of tree 150, block 218 may substitute the larger label value associated with "283" with the next multiple of three (after "21") "24", and indicate this substitution in an updated condensed array of Table 10.

TABLE 10

| Substitute Numeral | Substituted Numeral |
| --- | --- |
| 3 | 127 |
| 5 | 1 |
| 6 | 941 |
| 9 | 914 |
| 10 | 2 |
| 12 | 1882 |
| 18 | 881 |
| 20 | 3 |
| 21 | 628 |
| 24 | 283 |

This substitution is illustrated in FIG. 10, in this particular example, with a line through the larger label value "283" and inclusion of "21" as an updated label value. Block 226 then updates a label value associated with parent of sibling nodes 802, 808, 810 and 816 as P(3*21+1)*P(3*0+1)*P(3*24+1)*P(3*5+1)=P(64)*P(1)*P(73)*P(16)=311*2*367*53=12,098,522, as indicated for node 902 in FIG. 11, and block 228 prunes nodes 802, 808, 810 and 816.

Returning to block 208 in connection with tree 900 of FIG. 10, nodes 902, 903, 904 and 910, remaining non-root nodes, are one node removed from the root node. Diamond 212 may determine that the parent root node does not comprise a frontier node. Argument "$3x_i+1$" corresponding with a label value associated with node 910 exceeds indices of the array of pre-computed non-composite numerals as determined at diamond 216. Accordingly, block 218 substitutes a label value "6731" with a multiple of three. Since this is the eighth substitution of a larger label value to a multiple of three in this particular transformation of tree 150, block 218 may substitute the larger label value associated with "6731" with the next multiple of three (after "24") "27", and indicate this substitution in an updated condensed array of Table 11.

TABLE 11

| Substitute Numeral | Substituted Numeral |
| --- | --- |
| 3 | 127 |
| 5 | 1 |
| 6 | 941 |
| 9 | 914 |
| 10 | 2 |
| 12 | 1882 |
| 18 | 881 |
| 20 | 3 |
| 21 | 628 |
| 24 | 283 |
| 27 | 6731 |

This substitution is illustrated in FIG. 11, in this particular example, with a line through the larger label value "6731"

and inclusion of "27" as an updated label value. Block 222 determines that argument "$3x_i+1$" corresponding with label values associated with node 903 does not exceed indices of the array of pre-computed non-composite numerals. However, block 222 determines that argument "$3x_i+1$" corresponding with label value associated with nodes 902 and 904 exceed indices of the array of pre-computed non-composite numerals. Here, block 222 substitutes label values "29,108,077" and "12,098,522" with multiples of three. Since the next multiple of three (after "27") "30" is a multiple of both T and α (where T=3 and α=5 in this particular embodiment), this numeral will not be used as a substitute label value in this particular example. Accordingly, in ninth and tenth substitutions of a larger label value to a multiple of three in this particular transformation of tree 150, block 218 may substitute the larger label value associated with "29,108,077" with the next multiple of three (after "30") "33", and substitute the larger label value associated with "12,0988,522" with the next multiple of three "36." Block 222 may also indicate this substitution in an updated condensed array of Table 12.

TABLE 12

| Substitute Numeral | Substituted Numeral |
|---|---|
| 3 | 127 |
| 5 | 1 |
| 6 | 941 |
| 9 | 914 |
| 10 | 2 |
| 12 | 1882 |
| 18 | 881 |
| 20 | 3 |
| 21 | 628 |
| 24 | 283 |
| 27 | 6731 |
| 33 | 29,108,077 |
| 36 | 12,098,522 |

These substitutions are illustrated in FIG. 11 with a line through the larger label values "29,108,077" and "12,098,522" and the inclusion of "33" and "36" as new label value. Block 226 may then update a label value associated with parent of nodes 902, 903, 904 and 910 as P(3*27+1)*P(3*33+1)*P(3*0+1)*P(3*36+1)=P(88)*P(100)*P(0)*P(109)=457*541*2*599=296,189,926. This updated label value is indicated in FIG. 12 for the root node. Also, a final condensed array may be updated as shown in Table 1 to associate the next multiple of three (after "36") "39" with label value "296,189,926" associated with the root node. Regarding the multiples of five 25 and 35 as substitute numerals in the condensed array, these numerals are not used as substitutes for any label values in the transformation of tree 150. However, although claimed subject matter is not limited in these respects, a condensed array may include these numerals as place holders that are associated with a symbol such as "Ø" to indicate that there are no associated substituted label values. In alternative embodiments, however, rows and/or columns in a condensed array for which there are no substituted label values may be omitted.

Figure 13A:
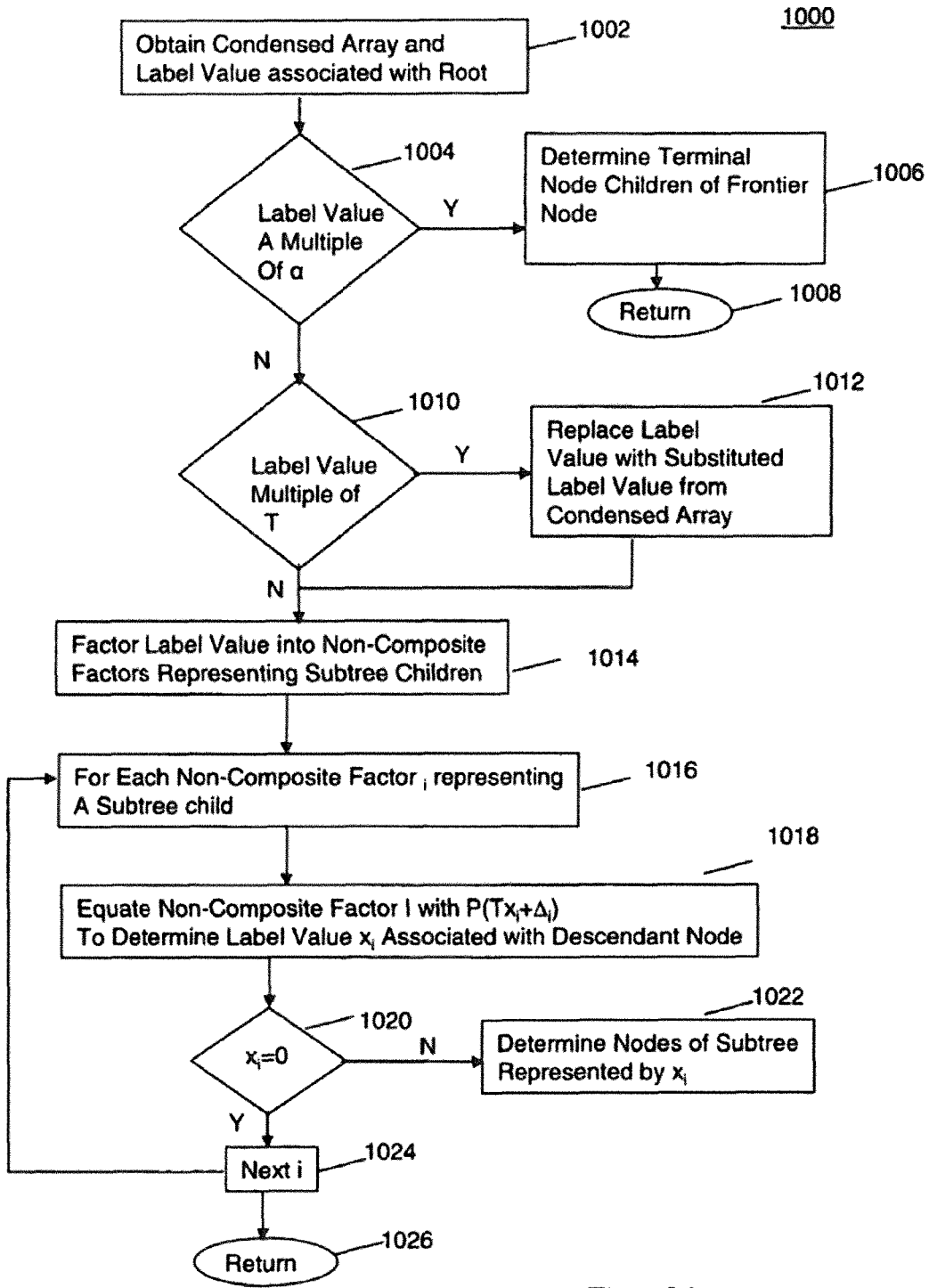
FIG. 13A is a flow diagram illustrating a process of transforming between a condensed array and a tree according to a particular embodiment.
Figure 14:
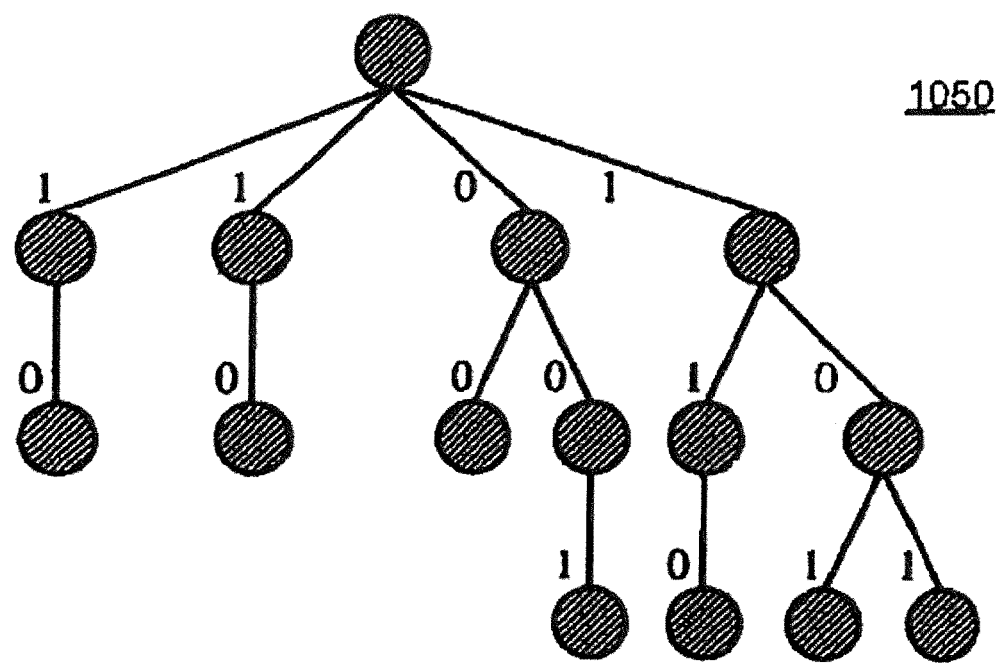
FIGS. 14 through 18 are schematic diagrams of trees illustrating a process to transform between a BELT and a condensed array according to an embodiment.

Thus, tree 150 may be transformed to the condensed array of Table 1. Here, it should be evident that tree 150 may be completely recovered from information in the condensed array. FIG. 13A illustrates a process embodiment 1000 of transforming a condensed array to a tree according to a particular embodiment. However, this is merely an example of a process to transform a condensed array to a tree and claimed subject matter is not limited in these respects.

Process embodiment 1000 will be illustrated with reference to the transformation between trees and condensed arrays illustrated with reference to FIGS. 5 through 12. In one, embodiment of a condensed array, as illustrated in Table 1, a label value associated with the root node may be represented as a substituted numeral associated with a distinct index (e.g., associated with the highest or lowest index). However, the condensed array need not store a label value associated with the root node and claimed subject matter is not limited in these respects. In the presently illustrated embodiment, however, block 1002 may obtain a label value associated with the root node as the substituted numeral "296,189,926" in the condensed array associated with the highest index "16". Diamond 1004 determines that this substitute numeral is not a factor of α (where, again, α=5 for this particular embodiment) which would indicate a frontier node in this particular embodiment. Diamond 1010 determines that this substitute numeral is also not a factor of T (where, again, T=3 for this particular embodiment) which would indicate a substitute for a larger label value that is stored in the condensed array in this particular embodiment.

Accordingly, at block 1014, substituted numeral "296,189,926" may be factored into its component non-composite factors: 457; 541; 2 and 599. These non-composite factors are associated with subtrees of the root node according to an association of trees and numerals. These non-composite factors may be located in an array of pre-computed non-composite numerals, as shown in Appendix I for this particular embodiment, for identifying indices that corresponding to these non-composite factors. These indices correspond with argument "$Tx_i+\Delta_i$" (where, again, "$Tx_i+\Delta_i$"="$3x_i+1$" for this particular embodiment) relating label values $x_i$ of child nodes to the non-composite factors. Here, the indices of the array of pre-computed non-composite numerals which are associated with the non-composite factors 457, 541, 2 and 599 comprise 88, 100, 1 and 109, respectively. At successive iterations of block 1018, these indices may be equated with argument "$3x_i+1$" to provide label values "27," "33," "0," and "36" of nodes 910, 904, 903 and 902, respectively.

Following an iteration of block 1018 providing label value $x_i$="0", diamond 1020 determines that the corresponding subtree is a terminal node. Following iterations of block 1018 for remaining label values $x_i$="27," "33" and/or "36", diamond 1020 determines that corresponding subtrees comprise two or more nodes. For these remaining label values, therefore, block 1022 recursively executes process embodiment 1000 to identify nodes in subtrees corresponding with these label values while setting respective node values $x_i$ (determined at block 1018) to be label values obtained at block 1002 from execution of recursive instances.

Being multiples of three, as determined at diamond 1010 in recursive instances, remaining label values "27," "33" and "36" comprise substitutes for larger label values provided in the condensed array as "6731"; "29,108,077" and "12,876,562", respectively. Accordingly, block 1012 replaces label values which are factors of three with these larger label values.

Continuing with the example for the recursive iteration of process embodiment 1000 in connection with a sub tree represented by the label value "6731" (corresponding with node 910), block 1014 factors "6731" into its non-composite factors 127 and 53. As illustrated above, the non-composite factors 127 and 53 may be located in the array of pre-computed non-composite numerals for identifying indices 31 and 16 at corresponding iterations of block 1018. Equating these indices 31 and 16 with argument "$3x_i+1$" provides label values $x_i$ of "10" and "5", respectively, corresponding to descendants of node 910. Since these values are not equal to zero, as determined at block 1020, block 1022 may initiate recursive instances of process embodiment 1000 to identify nodes corresponding to these subtrees. Being multiples of α (where α=5 in this particular embodiment), as determined at diamond 1004, these label values "10" and "5" correspond with frontier nodes having two terminal node children and one terminal node child, respectively, as indicated in the condensed array of Table 1. Here, label value "10" corresponds with a subtree comprising nodes 701 and 703, and label value "5" corresponds with a subtree comprising node 705.

Thus, in the above illustrated example of execution of process embodiment 1000 a portion of tree 150 is recovered from label value "296,189,926" and the condensed array of Table 1. In similar fashion, a remaining portion of tree 150 may be recovered from the label values "29,108,077" and "12,876,562" corresponding with nodes 902 and 904 by factoring these numerals into their respective non-composite factors at block 1014 and execution of blocks 1016 through 1024 (including recursive instances of process embodiment 1000 initiated at block 1022).

While the particular embodiments illustrated above with reference to FIGS. 5 through 12 are direct to transforming between unary or unlabeled trees and condensed arrays, the process illustrated above with reference to FIGS. 4 and 13A may be applied to transforming between edge and/or node labeled trees and condensed arrays. In an example of an m-ary edge labeled tree, an edge connecting two nodes may store, hold and/or represent any of an m number of values. Similarly, in an example of an m-ary node labeled tree, a node may store, hold and/or represent any of an m number of values. Accordingly, m-ary edge labeled trees and m-ary node labeled trees are subsets of the set of m-ary labeled trees. The discussion below in connection with FIGS. 13B through 18 provides particular examples of transforming between BELTs and condensed arrays for the purpose of illustrating transformations between trees and condensed arrays. However, these are merely examples of how such transformations may be employed and claimed subject matter is not limited in this respect. For example, as discussed below, the described techniques are also applicable to transforming between condensed arrays and BNLTs, m-ary edge labeled trees and/or m-ary node labeled trees.

As pointed out above in connection with relation (1), a label value associated with a parent node may be determined based, at least in part, upon the label values associated with its child nodes. For an m-ary edge labeled tree, according to a particular embodiment, T may be set to a value of m or larger while $\Delta_i$, associated with a child node i, may take on any value from $\Delta_i$=1, 2, ..., m−1 depending, at least in part, on a particular edge label value associated with an edge connecting node i to its parent node. Also, a value of α (where multiples of represent terminal node children of a frontier node in a condensed array) may again be selected as a non-composite numeral that is greater than T. In an embodiment to transform a five edge labeled tree, where m=5, α may be set to seven. However, this is merely an example of how α may be selected for a particular example embodiment and claimed subject matter is not limited in these respects.

According to an embodiment of transforming between an m-ary edge labeled tree and a condensed array, terminal node children of a frontier node may be represented as a numeral generated from the well known m dimensional Cantor function capable of uniquely expressing m-dimensional coordinates as a single numeral. The single numeral may then be associated with one or more frontier nodes and a multiple of α in the condensed array. Here, such a Cantor function may define a one-to-one and onto mapping between m-dimensional expressions of frontier nodes and single numerals. In the case of a BELT (where m=2), for example, a label value associated with a frontier node may be expressed as an ordered pair (x,y). Here, x may represent a number of terminal child nodes connected to the frontier node by a zero-labeled edge while y may represent a number of terminal child nodes connected to the frontier node by a one-labeled edge. As illustrated in FIG. 13B, a Cantor pairing function may associate any combination of x and y values with a single numeral. Accordingly, a frontier node in a BELT and its child terminal nodes may be represented by a single numeral generated from the Cantor pairing function of FIG. 13B. However, the Cantor pairing function is merely an example of how a frontier node of a BELT and its child terminal nodes may be represented as a single numeral, and claimed subject matter is not limited in these respects.

For trees with edges capable of having more than two different values, other Cantor functions may define a one-to-one and onto mapping between ordered groupings of three or more numerals and a single numeral. A numeral in such an ordered grouping may represent a number of terminal nodes connected to a frontier node with an edge of a corresponding edge label value. Such other Cantor functions defining a one-to-one and onto mapping between ordered groupings of three or more numerals and single numerals are well known as illustrated in "Logical Number Theory I: An Introduction," Craig Smorynski, Springer-Verlag, 1991, pp. 23-24.

In a particular embodiment directed to transforming between BELTs and condensed arrays is described with reference to FIGS. 14 through 18. Again, in this particular embodiment, process embodiment 200 of FIG. 4 may set T=3 (which is greater than m=2). However, it should be understood that, in other embodiments, process embodiment 200 may set T=2. Setting T=3, process embodiment 200 may then select α=5, a non-composite numeral greater than three. As illustrated below, process embodiment 200 may transform tree 1050 to a condensed array as shown in Table 13.

TABLE 13

| Index | Substitute Numeral | Substituted Numeral |
|-------|--------------------|--------------------|
| 1     | 3                  | 254                |
| 2     | 5                  | 1                  |
| 3     | 6                  | 22597              |
| 4     | 9                  | ∅                  |
| 5     | 10                 | 2                  |
| 6     | 12                 | ∅                  |
| 7     | 18                 | ∅                  |
| 8     | 20                 | ∅                  |
| 9     | 21                 | ∅                  |
| 10    | 24                 | ∅                  |
| 11    | 25                 | 4                  |
| 12    | 27                 | 7167379            |

Figure 15:
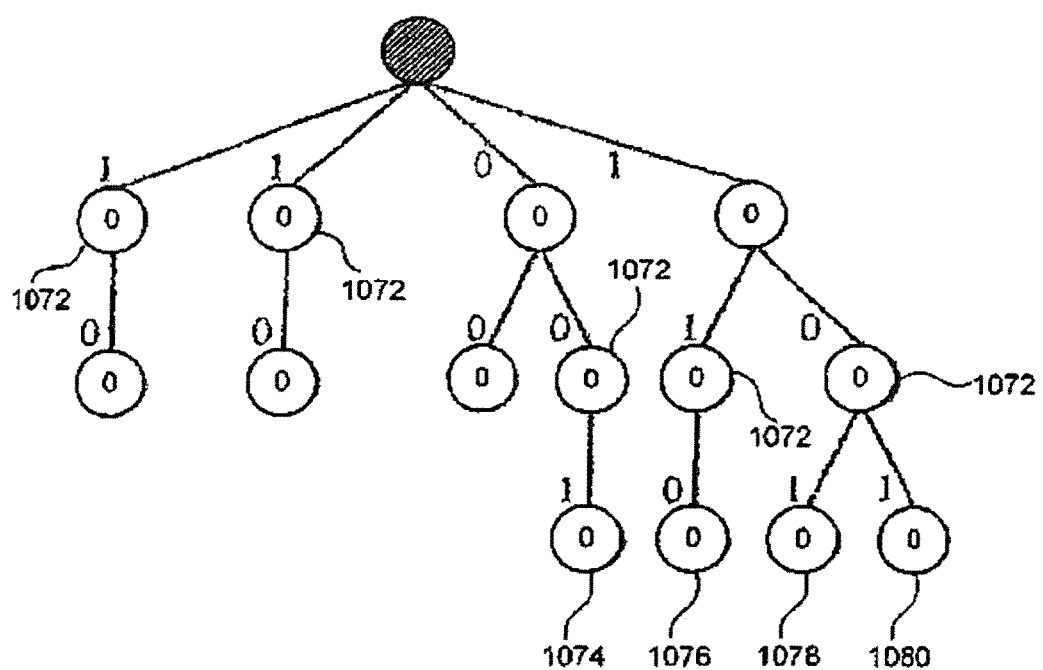
Figure 16:
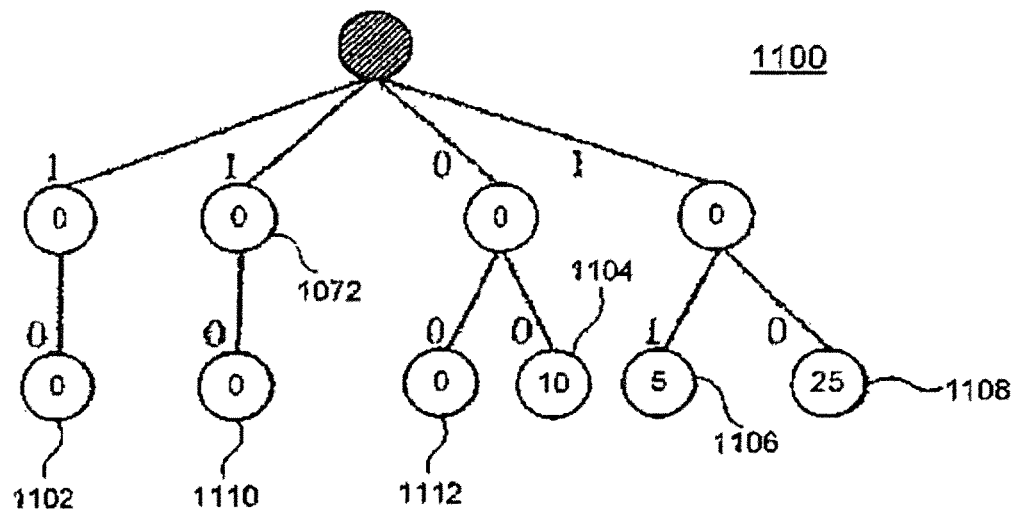

Block 202 may assign label values "0" to nodes as shown in FIG. 15. Block 204 may then identify frontier nodes 1072. Block 208 identifies nodes 1074, 1076, 1078 and 1080 as nodes that are furthest removed from the root node. For subsequent iterations of processing through blocks 210 through 230, diamond 212 determines that nodes 1074, 1076, 1078 and 1080 are also children of frontier nodes.

In the presently illustrated embodiment of transforming a BELT to a condensed array, block 214 may associate a frontier node with an with an ordered pair (x,y), as illustrated above, where x represents a number of child nodes connected by a zero-labeled edge and y represents a number of child nodes connected by a one-labeled edge. The parent of node 1076, having a single child node connected by a zero-labeled edge, may be associated with (1, 0). According to Cantor pairing function of FIG. 14B, this ordered pair maps to the numeral "1". Block 214 may associate numeral "1" with a multiple of α (where α=5 in the presently illustrated embodiment). Here, frontier parent of node 1076 may be updated as "5" as indicated at node 1106 of tree 1100 in FIG. 16. Block 215 may then associated substitute numeral "5" with a substituted numeral "1" as shown in Table 14. Block 214 may associate frontier node parent of node 1074, having a single child node connected by a one-labeled edge, with ordered pair (0,1). According to the Cantor pairing function of FIG. 14B, this ordered pair maps to numeral "2". Block 214 may associate numeral "2" with a multiple of five such as the numeral "10." Here, frontier parent of node 1074 may be updated as "10" as indicated at node 1104 of tree 1100. Block 215 may then associated the substitute numeral "10" with a substituted numeral "2" as shown in Table 14. Block 214 may associate frontier node parent of nodes 1078 and 1080, having a two child nodes connected by respective one-labeled edges, with ordered pair (0,2). According to the Cantor pairing function of FIG. 14B, this ordered pair maps to numeral "4". The next multiple of five (after "10") is fifteen which is a multiple of both a and T. In the particular illustrated embodiment, although claimed subject matter is not limited in this respect the numeral "15" may be excluded as a substitute numeral to avoid ambiguity. The next multiple of five, (after "15") "20", may be set aside as a substitute numeral for an ordered pair (1,1) mapping to numeral "3" according to the Cantor pairing function of FIG. 14B. Accordingly, numeral "4", associated with frontier node parent of nodes 1078 and 1080, may be associated with a substitute numeral "25" (the next multiple of five after "20"). Here, block 214 may update a label value associated with frontier node parent of nodes 1078 and 1080 as "25" as shown at corresponding node 1108 of tree 1100 in FIG. 16. Block 215 may update the condensed array to associate substitute numeral "25" with substituted numeral "4". Block 228 may then prune nodes 1074, 1076, 1078 and 1080.

TABLE 14

| Substitute Numeral | Substituted Numeral |
| --- | --- |
| 5 | 1 |
| 10 | 2 |
| 25 | 4 |

Returning to block 208 of process embodiment 200, in this particular example, block 208 identifies nodes 1102, 1104, 1106, 1108, 1110 and 1112 as being furthest removed from the root node. In subsequent iterations of processing through blocks 210 through 230, diamond 212 determines that nodes 1102 and 1110 are also children of frontier nodes. Here, like frontier node parent of node 1076 in tree 1070, frontier node parents of nodes 1102 and 1110 are connected to a single terminal node by a zero-labeled edge. Block 214 may also associate these frontier nodes with ordered pair (1,0), corresponding with numeral "1" of the Cantor function of FIG. 14B. Accordingly, block 214 may also associate this numeral "1" with substitute numeral "5" in the condensed array of Table 14 and update label values associated with these frontier nodes as "5" as shown at nodes 1152 and 1160 of tree 1150 in FIG. 17, and block 228 may prune nodes 1102 and 1110.

Regarding update of label value associated with parent of sibling nodes 1104 and 1112, diamond 212 determines that these nodes are not children of a frontier node. Here, diamond 216, determines whether argument "$Tx_i+\Delta_i$" for these particular nodes exceeds an indices of the array of pre-computed non-composite numerals. For this particular embodiment, as discussed above, the value of T is set to three. Again, however, this is merely an example of a numeral that may be assigned to T and claimed subject matter is not limited in these respects. The value $\Delta_i$ may be determined based, at least in part, on an edge label value associated with an edge connecting a particular node i to its parent node. In this particular example of transforming a BELT to a condensed array, a value of one may be assigned to $\Delta_i$ if i is connected to its parent by a zero-labeled edge and a value of two may be assigned to $\Delta_i$ if i is connected to its parent by a one-labeled edge. However, it should be understood that these are merely examples of values that may be assigned to $\Delta_i$ based, at least in part, on an edge labeled value connecting node i to its parent, and claimed subject matter is not limited in these respects.

For node 1112, argument $Tx_i+\Delta_i=3*0+1=1$, which does not exceed indices of the array of pre-computed non-composite. Similarly for node 1104, $Tx_i+\Delta_i=3*10+1=31$, which also does not exceed indices of the array of pre-computed non-composite numerals. As determined at diamond 216 and block 222, label values associated with nodes 1104 and 1112 are not to be substituted. Also, parent of sibling nodes 1104 and 1112 may be updated at block 226 as $P(3*0+1)*P(3*10+1)=P(1)*P (31)=2*127=254$. Accordingly, a label value associated with parent of sibling nodes 1104 and 1112 is updated as "254" shown at node 1154 of tree 1150 of FIG. 17, and block 228 may prune nodes 1104 and 1112.

Regarding update of label value associated with parent of sibling nodes 1104 and 1112, diamond 212 determines that these nodes are not children of a frontier node. For node 1106, argument $Tx_i+\Delta_i=3*5+2=17$, which does not exceed indices of the array of pre-computed non-composite numerals. Similarly for node 1104, $Tx_i+\Delta_i=3*25+1=76$, which also does not exceed indices of the array of pre-computed non-composite numerals. As determined at diamond 216 and block 222, label values associated with nodes 1104 and 1112 are not to be substituted. Also, parent of sibling nodes 1106 and 1108 may be undated at block 226 as $P(3*5+2)*P(3*25+1)=P(17)*P (76)=59*383=22597$. Accordingly, the label value associated with parent of sibling nodes 1106 and 1108 is updated as "22597" shown at node 1156 of tree 1150 of FIG. 17, and block 228 may prune nodes 1104 and 1112.

Figure 17:
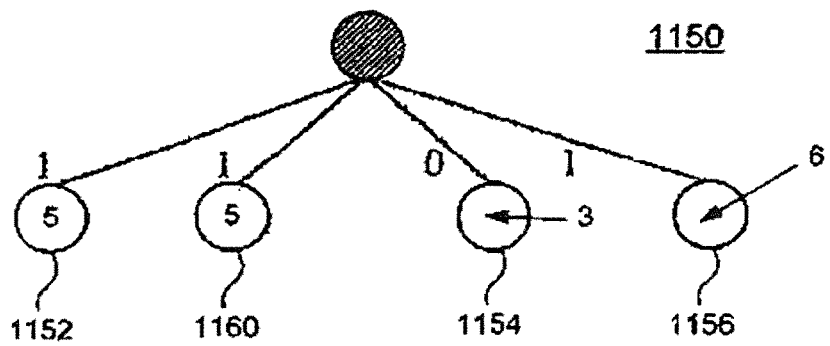
Figure 18:

Returning to block 208 of process embodiment 200 in connection with tree 1150 of FIG. 17, continuing with the current example, remaining nodes 1152, 1154, 1156 and 1160 are one node removed from the root node. Subsequent iterations of blocks 210 through 230 may determine at diamond 212 that these nodes are not frontier nodes. Nodes 1152 and 1160 are associated with a label value "5" and are connected to the root node by respective one-labeled edges. Accordingly, $Tx_i+\Delta_i=3*5+2=17$, which does not exceed indices of the array of pre-computed non-composite numerals. For node 1154, having a label value associated with "254" and being connected to the root node by a zero-labeled edge, $Tx_i+\Delta_i=3*254+1=763$, which exceeds indices of the array of pre-computed non-composite numerals. Similarly, for node 1156, having a label value associated with "22597" and being connected to the root node by a one-labeled edge, $Tx_i\Delta_i=3*22597+1=67792$, which exceeds indices of the array of pre-computed non-composite numerals. Here, label values associated with 1154 and 1156 are substituted with multiples of T (where T=3 for this particular embodiment). Since the condensed array of Table 14 has no substituted numerals associated with a multiple of three, the condensed array as shown in Table 15 associates numeral "3" with a substituted numeral "254" as a label value associated with node 1154. This substitution is reflected in FIG. 18, in this particular example, as a line through substituted label value "254" of node 1154 and inclusion of "3" as a substitute label value. The condensed array as shown in Table 15 also associates the next multiple of three (after "3") "6" with a substituted label value "22597" of node 1156. This substitution is reflected in FIG. 18, in this particular example, as a line through the substituted label value "23597" of node 1156 and inclusion of "6" as a substitute label value.

TABLE 15

| Substitute Numeral | Substituted Numeral |
|---|---|
| 3 | 254 |
| 5 | 1 |
| 6 | 22597 |
| 10 | 2 |
| 25 | 4 |

Block 226 may then update a label value associated with the root node as $P(3*5+2)*P(3*5+2)*P(3*3+1)*P(3*6+2)=P(17)*P(17)*P(10)*P(20)=59*59*29*71=7167379$. This numeral may then be associated with the next multiple of exceeding the highest substitute numeral already in the condensed array, "27" as shown in the condensed array of Table 13. However, this is merely an example of how a substitute numeral associated with the root node may be represented in a condensed array and claimed subject matter is not limited in these respects. Accordingly, BELT 1050 may be transformed to the condensed array of Table 13. In addition, a transformation of BELT 1050 to the condensed array of Table 13 may also be reversed according to a particular embodiment. As illustrated above with reference to FIGS. 5 through 12 above, process embodiment 1000 (FIG. 13A) may also transform the condensed array of Table 13 back to BELT 1050. Here, process embodiment 1000 will be illustrated with reference to the transformation between BELTS and condensed arrays illustrated with reference to FIGS. 14 through 18. In one embodiment of a condensed array, as illustrated in Table 13, block 1002 may obtain a label value associated with the root node as the substituted numeral "7,167,379" in the condensed array associated with the highest index "12". Diamond 1004 determines that this substituted numeral is not a factor of α (where, again, α=5 for this particular embodiment) which would indicate a frontier node. Diamond 1010 determines that this substituted numeral is also not a factor of T (where, again, T=3 for this particular embodiment) which would indicate a substitute for a larger label value that is stored in the condensed array.

Accordingly, at block 1014, substituted numeral "7,167,379" may be factored into its component non-composite factors: 59; 59; 29 and 71. These non-composite factors are associated with subtrees of the root node according to an association of trees and numerals. These non-composite factors may be located in the array of pre-computed non-composite numerals for identifying indices that corresponding to these non-composite factors. These indices correspond with argument "$Tx_i+\Delta_i$" (where, again, "$Tx_i+\Delta_i$"="$3x_i+1$" for this particular embodiment) relating label values $x_i$ of child nodes to the non-composite factors. Here, the indices of the array of pre-computed non-composite numerals which are associated with the non-composite factors 59, 59, 29 and 71 comprise 17, 17, 10 and 20, respectively.

According to a particular embodiment for transforming between condensed arrays and m-ary edge Labeled trees, block 1018 may determine a label value $x_i$ and an edge label value connecting the subtree corresponding to non-composite factor i to its parent node based, at least in part, on a non-composite factor i determined at block 1014. Relation (2) expresses the label value $x_i$ as follows $i=P(Tx_i+\Delta_i)$ $P^{-1}(i)=Tx_i+\Delta_i$ $x_i[P^{-1}(i)-\Delta_i]/T$     (2)

where: $P^{-1}(i)$=inverse of the Kleene enumeration function providing an index associated with the non-composite factor i in the array of pre-computed non-composite numerals.

While the terms "$P^{-1}(i)$" and "T" may comprise known integers, the term "$\Delta_i$" (associated with an edge label value) may comprise an integer from 1 to T−1. In the currently illustrated particular embodiment, however, only a single value of $\Delta_i$ within the range of 1 to T−1, inclusive, may provide a non-fractional or integer result for $x_i$ according to relation (2). Returning to the aforementioned non-composite factor 59 and corresponding index 17, $x_i=[17-\Delta_i]/3=5$, where $\Delta_i=2$ for providing a non-fractional result for $x_i$. The expression $\Delta_i=2$ also corresponds with an one-labeled edge connecting the node to its parent according to this particular embodiment of transforming between condensed arrays and BELTs. Accordingly, the non-composite factors 59 correspond with a subtree comprising nodes 1152 and 1160 having a label value associated with "5" and being connected to the root node by a one-labeled edge.

Since $x_i=5$, diamond 1020 initiates execution of recursive instances of process embodiment 1000 at block 1022 to transform nodes 1152 and 1160 to frontier nodes having respective single child nodes 1102 and 1110 connected by zero-labeled edges. Here, diamond 1004 recognizes that the label value five is a multiple of α, and block 1006 determines the terminal node children of the frontier nodes. Block 1006 may associate label value "5" with substituted numeral "1". Block may then associate substituted numeral "1" with ordered pair (1,0) of the Cantor pairing function of FIG. 13B to determine that nodes 1152 and 1160 comprise frontier nodes connected to a single child node by a zero-labeled edge.

Turning now to the subtree associated with non-composite numeral 29, continuing with the present example, relation (2) may determine $x_i=[10-\Delta_i]/3=3$, where $\Delta_i=1$ for providing a non-fractional result for $x_i$. This corresponds with node 1154 having a node label "3" and connected to the root node by a zero-labeled edge. Since $x_i=3$, diamond 1020 may initiate execution of a recursive instance of process embodiment 1000 at block 1022. Here, diamond 1010 determines that $x_i$ is a multiple of a which is three. Therefore, block 1012 may replace the label value "3" with substituted numeral "254" from the condensed array. Block 1014 may then factor "254" into its non-composite factors "2" and "127" associated with respective subtrees. Taking the subtree associated with non-composite numeral "2" first, block 1018 may, according to relation (2), determine $x_i=[1-\Delta_i]/$ 3=0, where $\Delta_i=1$ for providing a non-fractional result for $x_i$. This corresponds with a single terminal node connected to its parent by a zero-labeled edge in this particular embodiment, corresponding with node 1112, and diamond 1020 returns execution to block 1016. Now taking the subtree associated with the next non-composite factor "127", continuing with the current example, block 1018 may, according to relation (2), determine $x_i=[31-\Delta_i]/3=10$, where $\Delta_i=1$ for providing a non-fractional result for $x_i$. This corresponds with node 1104 connected to its parent node by a zero-labeled edge in this particular embodiment. Since $x_i=10$, diamond 1020 may initiate execution of a recursive instance of process embodiment 1000 at block 1022. Here, diamond 1004 determines that x is a multiple of five, indicating a frontier node. Block 1006 then associates "10" in the condensed array with substituted numeral "2". According to the Cantor pairing function of FIG. 13B, this corresponds with the ordered pair (0,1) and/or a frontier node connected to a single terminal node child by an one-labeled edge. This corresponds with nodes terminal node 1074 and its parent frontier node shown in tree 1070 in this particular embodiment.

Without belaboring the discussion, it should be clear that process embodiment 1000 may transform the remaining subtree associated with the non-composite numeral "71" to complete the transformation back to tree 1050.

The particular embodiments illustrated with reference to FIGS. 5 through 12 and FIGS. 14 through 18 make particular use of node label values for representing hierarchical data. In particular, FIGS. 5 through 12 and 15 through 18 may show a node being associated with a node label value representing a subtree connected to the node by one or more child nodes. However, it should be understood that other embodiments may make use of other types of label values such as edge label values and/or other expressions/devices of information to represent essentially the same information expressed in node label values shown in FIGS. 5 through 12 and 15 through 18, and that claimed subject matter is not limited in these respects.

Additionally, FIGS. 3 through 12 illustrate a particular embodiment for transforming between a unary tree and a condensed array and FIGS. 13B through 18 illustrate another particular embodiment for transforming between a BELT and a condensed array. In other embodiments, a transformation between an edge and/or node labeled tree and a condensed array may comprise a transformation between the edge and/or node labeled tree and a unary tree that is an elementary equivalent of the edge and/or node labeled tree. A transformation between the unary tree and the condensed array, such as that illustrated above with reference to FIGS. 3 through 12, may complete the transformation between the condensed array and the edge and/or node labeled tree. In a particular embodiment, as illustrated in U.S. Provisional Application No. 60/648,950 titled "Method and/or System for Tree Transformation," filed on Jan. 31, 2005, for example, there exists a transformation between BELTs and elementary equivalent unary trees, and a transformation between node label trees and elementary equivalent unary tree. Accordingly, hierarchical data represented as a BELT and/or node labeled tree may be transformed to a unary tree representation, which is then transformed to a condensed array. Similarly, hierarchical data represented as a condensed array may be transformed to a unary tree, which is then transformed to a BELT and/or node labeled tree. Again, however, these are merely examples of transformation between trees and condensed arrays, and claimed subject matter is not limited in these respects.

Such a transformation between a unary and a BELT and/or node labeled tree is illustrated, according to a particular embodiment, with reference to FIGS. 19 through 29. FIGS. 19 through 24 are schematic diagrams of trees illustrating a transformation between an unlabeled tree and a BELT according to an embodiment. This is illustrated as a sequence of operations depicted here as graph operations, although such a transformation may alternatively be implemented by operations implemented otherwise, one such example being by a computing platform, for example. Likewise, other embodiments in which trees of one form are transformed to trees of another form are also included within the scope of claimed subject matter.

Figure 19:
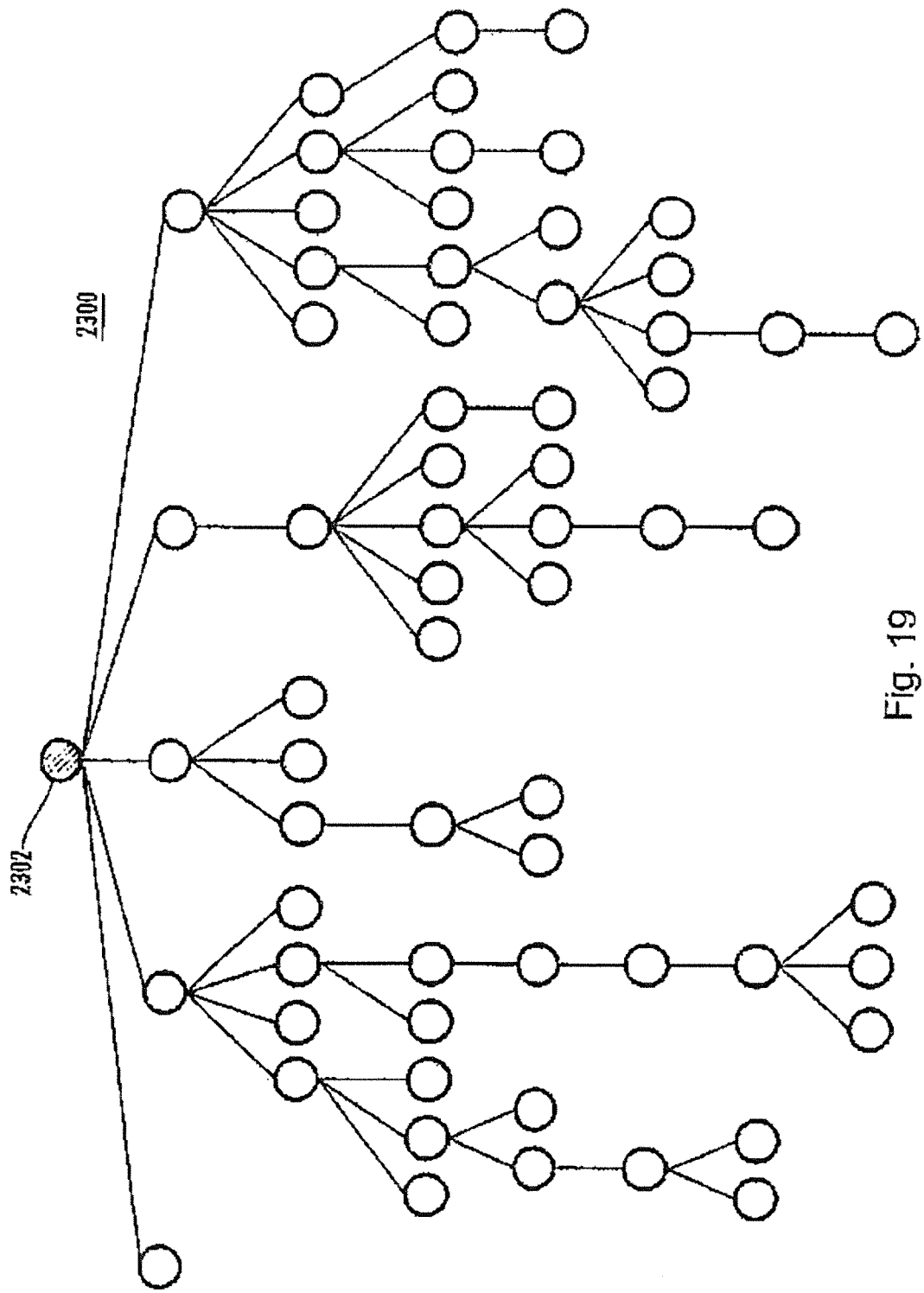
FIGS. 19 through 24 are schematic diagrams of trees illustrating a transformation of an unlabeled tree to a BELT according to an embodiment.
Figure 20:
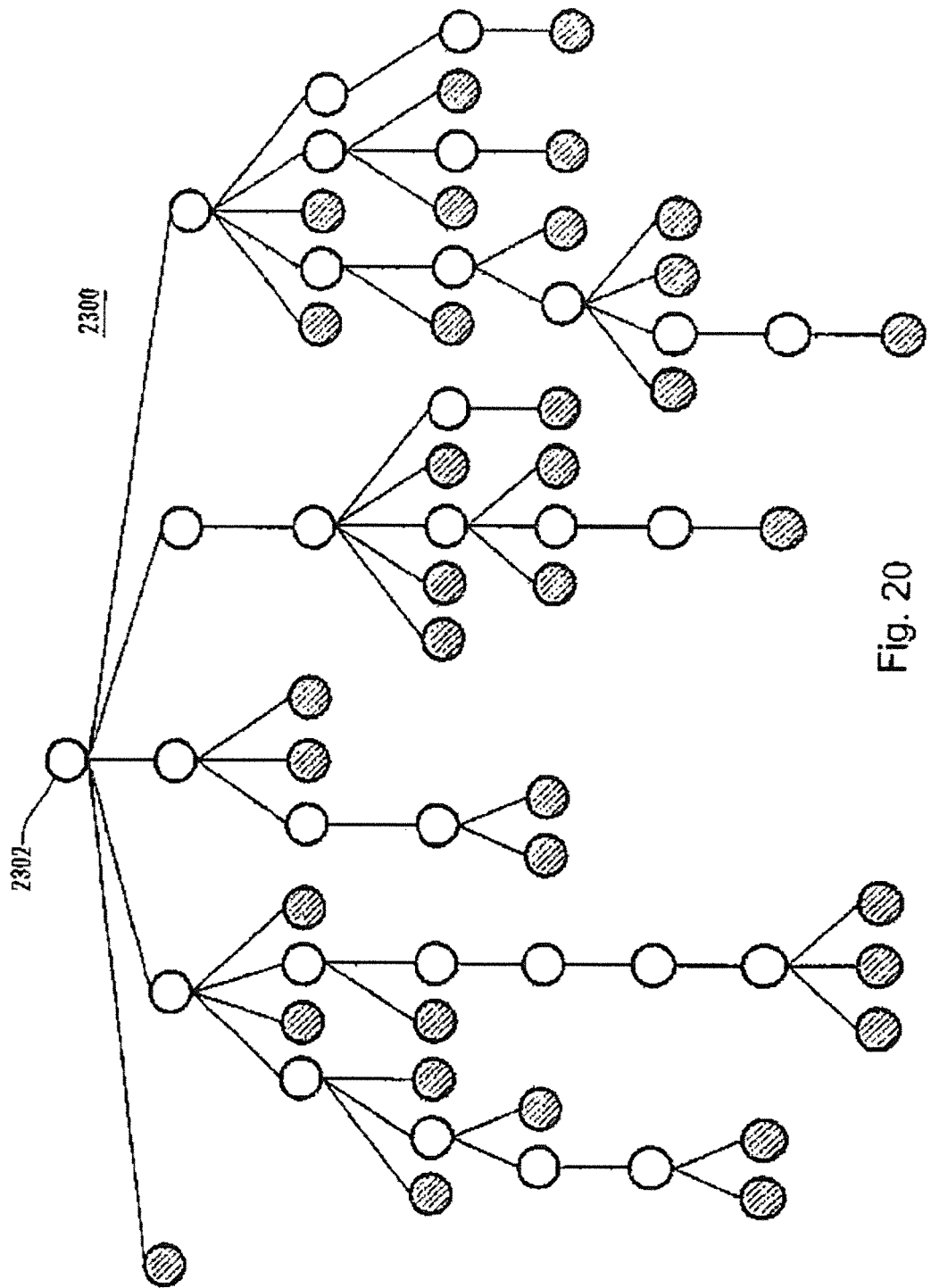
Figure 21:
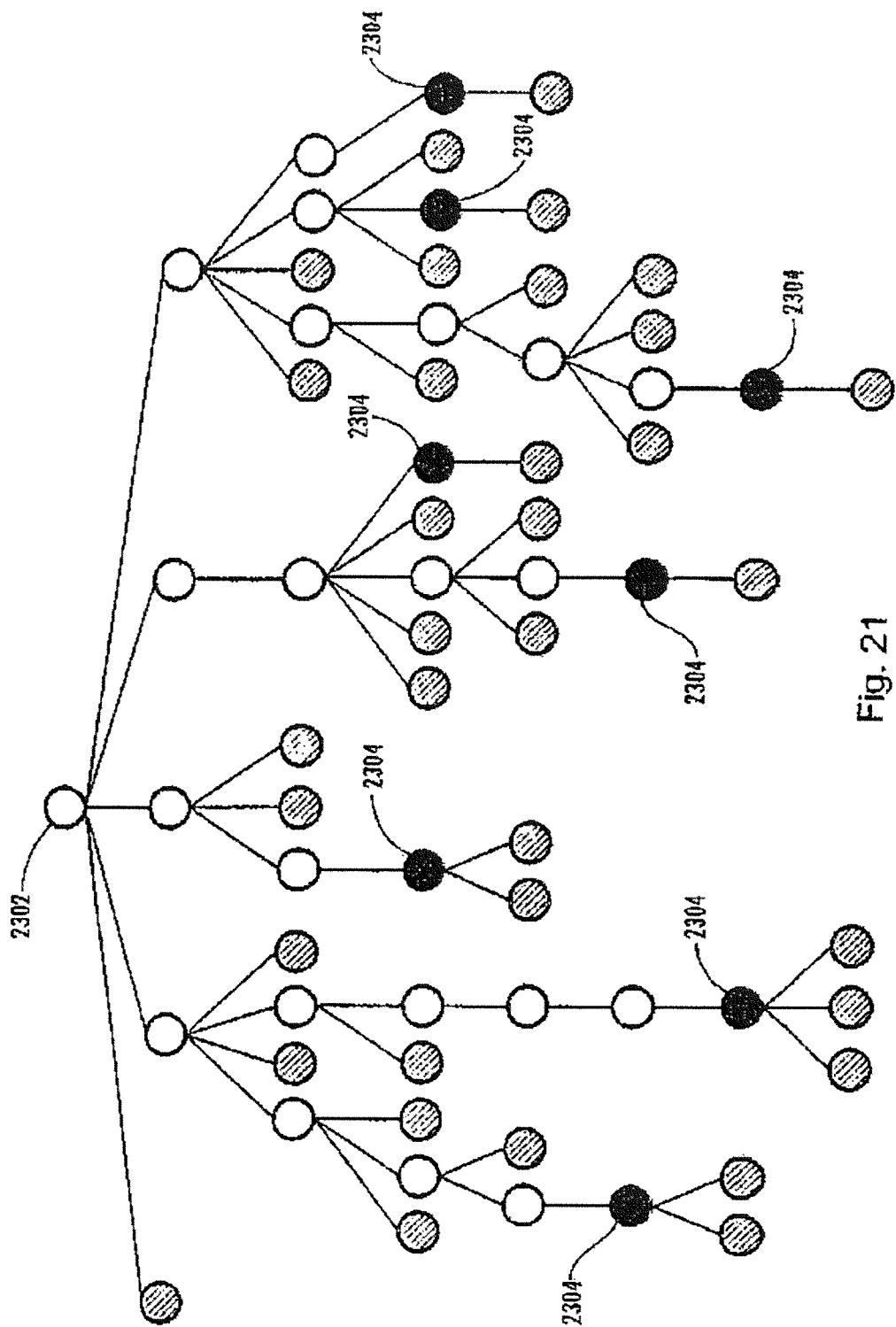

FIG. 19 is a schematic diagram of an unlabeled tree 2300 comprising a root node 2302 according to an embodiment. Identifying root node 2302 indicates a directional flow of hierarchical data represented in unlabeled tree 2300 descending away from root node. FIG. 20 is a schematic diagram of unlabeled tree 2300 showing terminal nodes as cross-hatched nodes. As illustrated in FIG. 21, by way of example, according to a particular embodiment, frontier nodes 2304 in tree 2300 are connected to one or more corresponding child terminal nodes.

Figure 22:
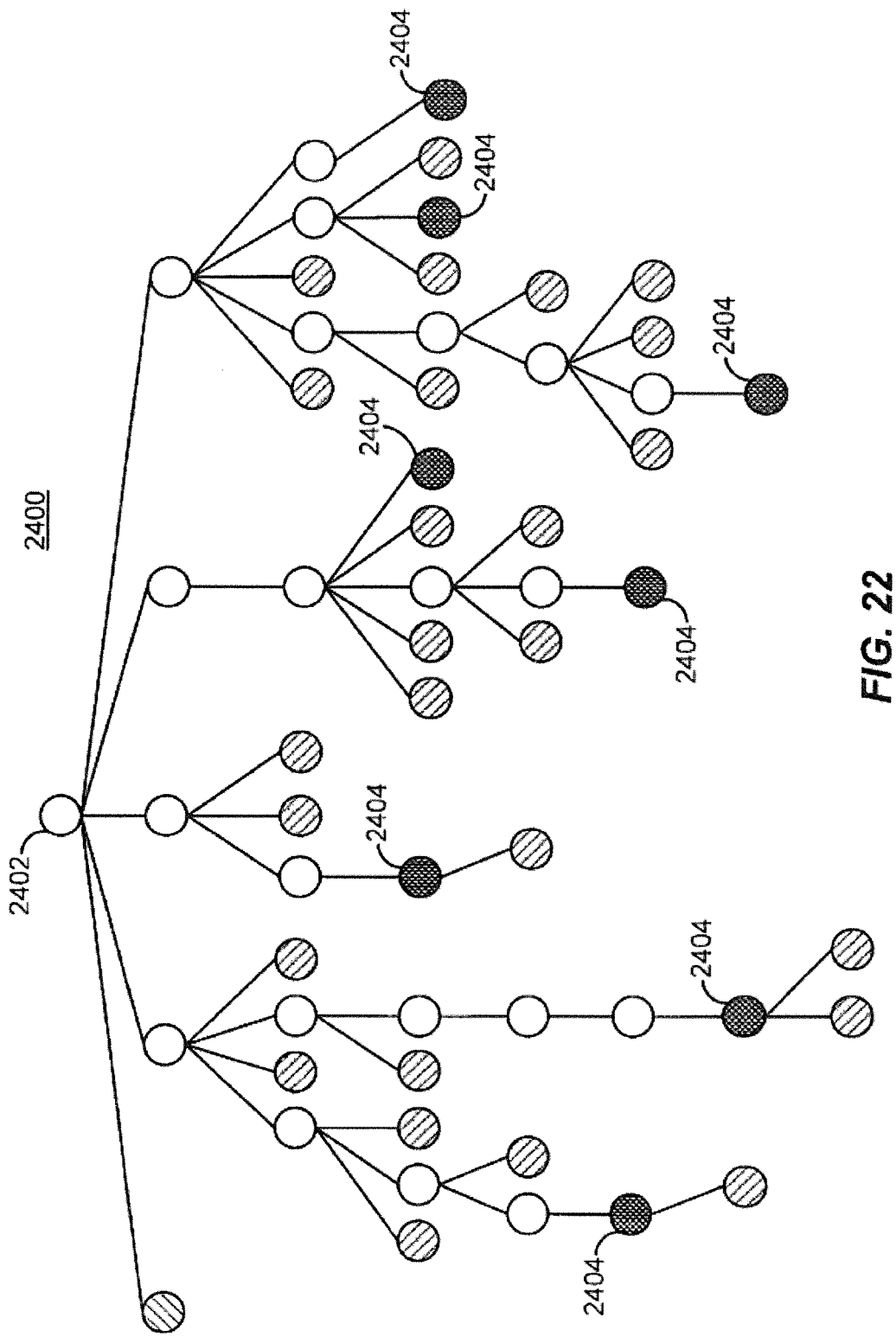
Figure 23:
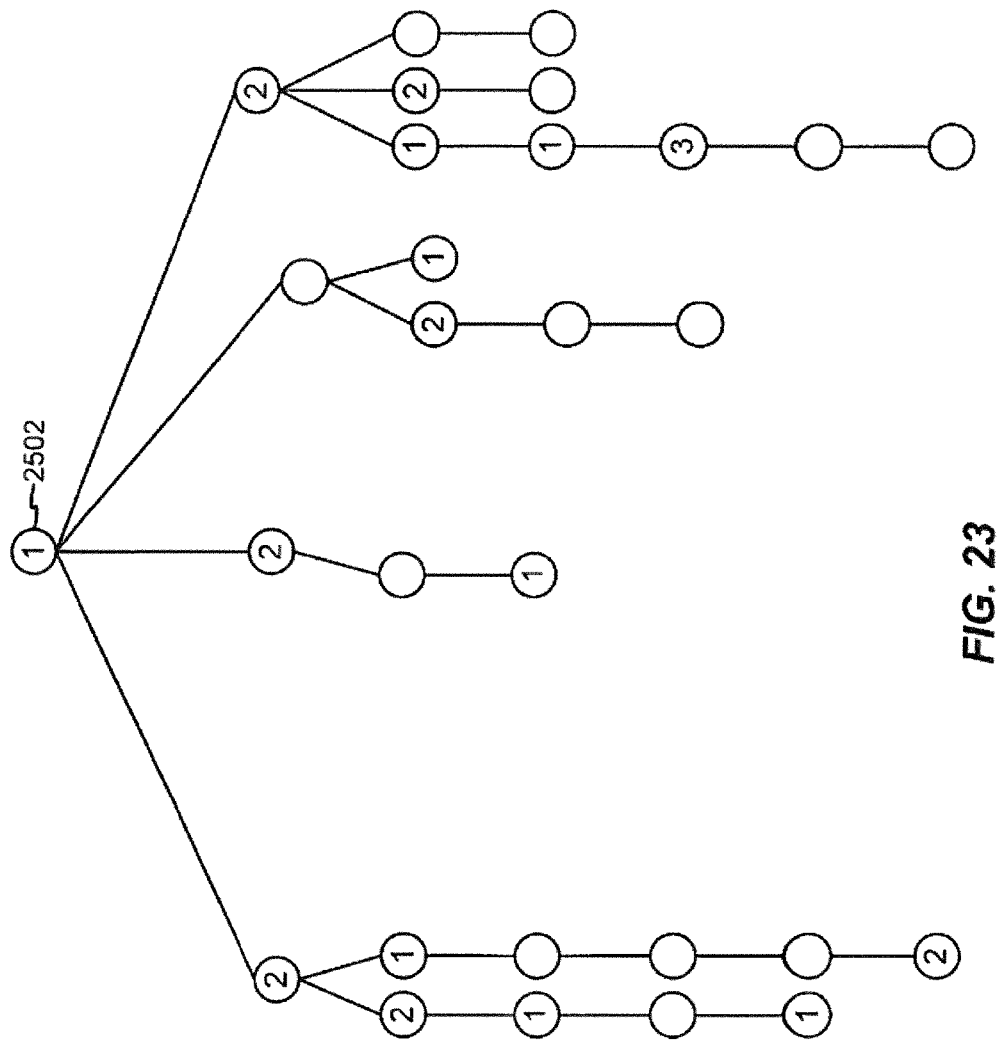
Figure 24:
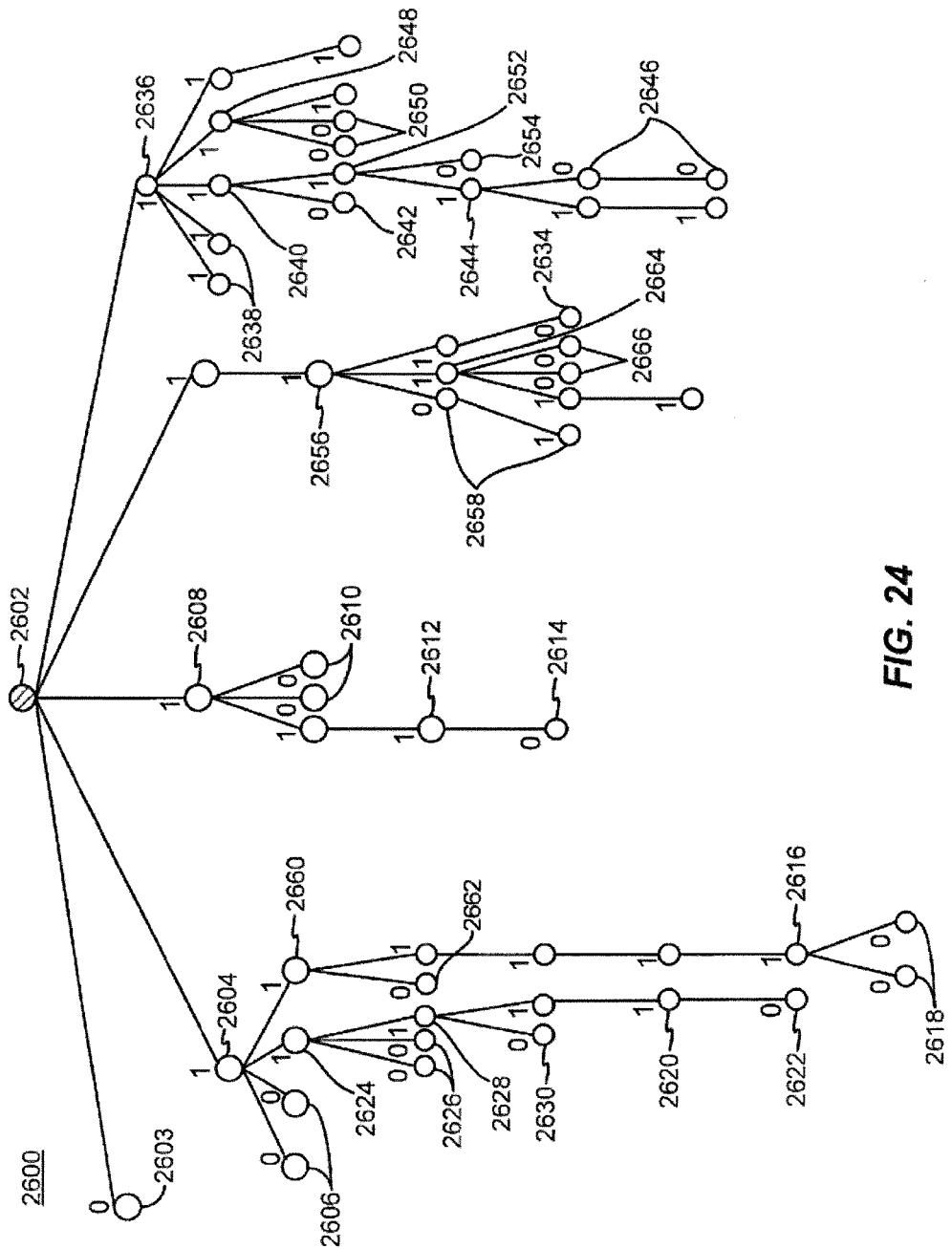

FIGS. 22 through 24 are schematic diagrams illustrating a process to transform between an unlabeled tree 2300 and a BELT that comprises an elementary equivalent of unlabeled tree 2300. In this particular embodiment, unlabeled tree 2300 may represent hierarchical data and the transformation illustrated below may map unlabeled tree 2300 to a BELT that represents essentially the same hierarchical data. According to an embodiment, tree 2300 is transformed to a node labeled tree 2500 shown in FIG. 23 which comprises an elementary equivalent of tree 2300. Then, as illustrated above, node labeled tree 2500 may be transformed to a BELT 2600 shown in FIG. 24 which comprises an elementary equivalent of tree 2600. Accordingly, in a particular embodiment, the resulting tree 2600 comprises an elementary equivalent of tree 2300. However, this is merely an example of a transformation between an unlabeled tree and a BELT that is an elementary equivalent of the unlabeled tree and claimed subject matter is not limited in this respect.

According to an embodiment, FIG. 22 illustrates a process of "pruning" terminal nodes in tree 2300 from frontier nodes. Here, tree 2400 shows darkened nodes 2404 which correspond with frontier nodes 2304 of tree 2300. According to an embodiment, tree 2400 may be generated by pruning and/or removing one terminal node connected to each of the corresponding frontier nodes 2304. The remaining terminal nodes of tree 2300 (i.e., the unpruned terminal nodes) are indicated with cross-hatching. However, this is merely an example of how terminal nodes may be pruned from corresponding frontier nodes and claimed subject matter is not limited in this respect.

FIG. 23 is a schematic diagram of a node labeled tree 2500 which may be determined, at least in part, from tree 2400. According to an embodiment, the remaining terminal nodes of tree 2300 indicated with cross-hatching in tree 2400 are replaced with node label values associated with parent nodes in tree 2500. In a particular embodiment, for example, nodes in tree 2400 having a natural numeral k of such remaining terminal nodes as children are associated with nodes in tree 2500 having a node label value associated with k and the remaining terminal node children in tree 2400 are removed in the resulting tree 2500. Again, tree 2500 may represent essentially the same hierarchical data represented in tree 2400. Here, the resulting node labeled tree 2500 determined from the above described transformation may comprise an elementary equivalent of unlabeled tree 2300. However, this is merely an example how an unlabeled tree may be transformed to an elementary equivalent node labeled tree and claimed subject matter is not limited in this respect.

Nodes in tree 2500 contain a numeral as a node label value to represent a count of remaining terminal nodes removed from corresponding nodes in tree 2400. While not shown in FIG. 23, the remaining nodes in tree 2500 not showing a node label may nevertheless be assigned a node label value associated with natural numeral "0." According to an embodiment, tree 2500 may be transformed to an elementary equivalent BELT by replacing nodes in tree 2500 having a non-zero node label value with an equivalent portion of a BELT. In a particular embodiment, the portion of a BELT equivalent to the non-zero node label value may be determined according to an association embodiment of numerals and trees.

Figure 25:
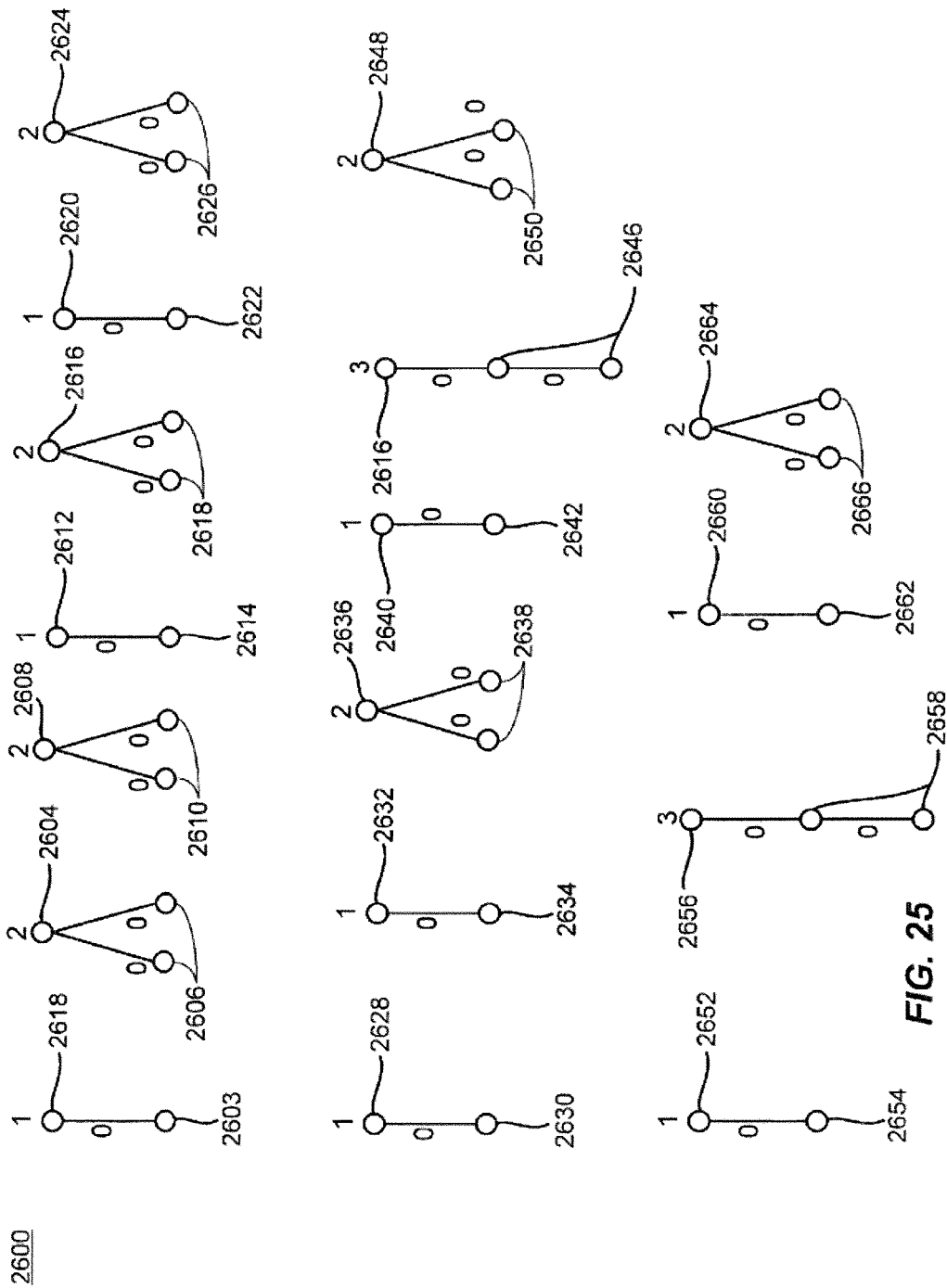
FIG. 25 is a schematic diagram associating particular node label values with portions of BELTs according to an embodiment of the BELT shown in FIG. 19.

FIG. 24 is a schematic diagram of a BELT 2600 resulting from a transformation from node labeled tree 2500 according to an embodiment. According to a particular embodiment, edges in BELT 2600 corresponding with edges existing in node labeled tree 2500 may be labeled with a numeral "1." Then, nodes in BELT 2600 corresponding to nodes in node labeled tree 2500 having non-zero node label values may be connected to portions of BELTs which are based, at least in part, on the non-zero label values. Here, the non-zero node label values may be associated with the portions of BELTS according to an association of BELTs and numerals according to a particular association embodiment. In this particular embodiment, for the purpose of illustration, FIG. 25 shows portions of BELTs in BELT 2600 corresponding with a non-zero node label value in node labeled tree 2500. FIG. 25 also shows non-zero node label values in node label tree 2500 above corresponding to portions of BELTs in BELT 2600. Here, the edge between the prior nodes and the new nodes is labeled with a zero value. For nodes with a value k that is a power of two, including the value one, the node value is deleted and ($\log_2(k)+1$) new nodes are attached, labeling the edge between the new nodes and the old nodes with a zero value.

The remaining node label values comprise non-powers of two that are three or larger. These node label values may be factored into one or more non-composite numerals according to a particular association embodiment. For such a resulting non-composite numeral factor of a node's label, a tag representing the non-composite numeral factor may be connected to the node by an edge having an edge label value associated with binary zero. The tag may comprise a portion of a BELT representing the non-composite numeral factor according to an association of BELTs and numerals of a particular association embodiment.

As described below in greater detail, the association of portions of BELTs and numerals may associate unique portions of BELTs and corresponding numerals. In other words, in a particular association embodiment, for any numerical node label value there is a unique corresponding BELT portion. Accordingly, the resulting BELT 2600 may express essentially the same hierarchical data as the node labeled tree 2500 and comprise an elementary equivalent of the node labeled tree 2500. However, it should be understood that this is merely an example of a transformation between a node labeled tree and an elementary equivalent BELT and claimed subject matter is not limited in these respects. Since the node labeled tree 2500 comprises an elementary equivalent of the unlabeled tree 2300, BELT 2600 may also comprise an elementary equivalent of unlabeled tree 2300. However, again, this is merely an example of a transformation between an unlabeled tree and an elementary equivalent BELT, and claimed subject matter is not limited in these respects.

Figure 26:
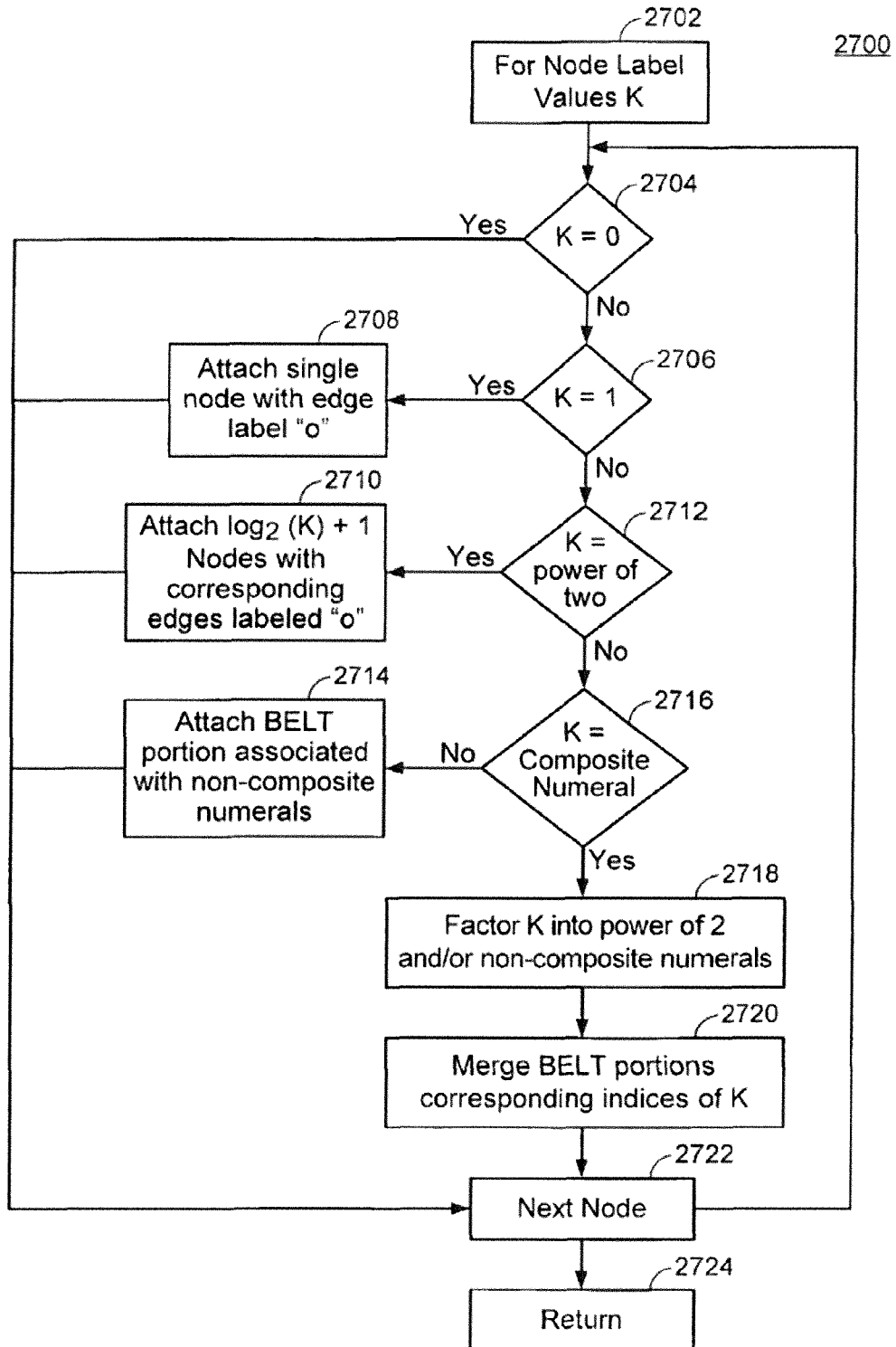
FIG. 26 is a flow diagram illustrating a process of associating node label values with BELTs and/or portions of BELTs according to an embodiment.

FIG. 26 is a flow diagram illustrating a process 2700 of associating node label values with BELTs and/or portions of BELTs according to an embodiment of the transformation illustrated above with reference to FIGS. 23 through 25. Here, process 2700 may be used to associate node label values associated with nodes in node labeled tree 2500 with corresponding portions of BELTs in BELT 2600, according to the particular association embodiment illustrated in FIG. 25. FIG. 27 is a table showing a particular association embodiment that may be determined according to process 2700. However, it should be understood that process 2700 and FIG. 26 merely illustrate particular association embodiments and that claimed subject matter is not limited in these respects.

Process 2700 may determine BELT portions corresponding to node labels "k" of a node label tree, as illustrated in the transformation from node labeled tree 2500 to BELT 2600 illustrated above. If a particular node label value k is equal to zero, as determined at diamond 2704, process 2700 merely removes any node label value from a corresponding node in the resulting BELT. For a particular node label value k equal to one, as determined at diamond 2706, block 2708 may attach to a corresponding node in the resulting BELT a single node by an edge having a label value associated with binary zero. Such a BELT portion corresponding to numeral "1" is shown in the association embodiment of FIG. 27.

For a particular node label value k equal to a power of two, as determined at diamond 2712, block 2710 may attach to a corresponding node in the resulting BELT, $\log_2(k)+1$ nodes by corresponding edges having a label value associated with binary zero. This is illustrated in the particular association embodiment shown in FIG. 27 with reference to BELT portions corresponding to numerals two, four and eight. Here, two nodes are attached to the corresponding node in the resulting BELT by corresponding edges for a node label value k=2. Three nodes are attached to the corresponding node in the resulting BELT by corresponding edges for a node label value k=4; and four nodes are attached to the corresponding node in the resulting BELT by corresponding edges for a node label value k=8.

According to an embodiment, a node label value k may comprise a natural numeral that is a product of natural numerals x and y greater than one. Under this condition, k comprises a composite numeral capable of being factored into natural numerals x and y. Here, the BELT portion representing k in a resulting BELT may be represented as a merger of respective BELT portions represented by the natural numerals x and y at a corresponding node in the resulting BELT providing, in effect, a root node for the merged BELT portions. Alternatively, a node label value k may comprise a non-composite natural numeral that cannot be factored into positive natural numerals other than one and itself.

Returning to process 2700, if a node label value k comprises a non-composite natural numeral greater than three, as determined at diamond 2716, block 2714 may attach a BELT portion associated with the non-composite numeral to a corresponding node in the resulting BELT. Here, the BELT portion may be determined from a particular association of BELTs with non-composite numerals.

Returning again to process 2700, if a node label value k comprises a composite natural numeral, as determined at diamond 2716, block 2718 may first factor k by the largest power of two, "w". This factor may be represented by a BELT portion comprising $\log_2(w)$ nodes attached to the corresponding node in the resulting BELT by corresponding edges with label values "0." The remainder may then be factored into non-composite numerals greater than two. According to a particular association embodiment, as illustrated with reference to block 2714, for example, block 2718 may determine BELT portions corresponding to these non-composite factors of the remainder. Here, for such a resulting non-composite numeral factor of a node's node label, a tag representing the non-composite numeral factor may be connected to the node by an edge having an edge label value associated with binary zero. The tag may comprise a portion of a BELT representing the non-composite numeral factor according to an association of BELTs and numerals of a particular association embodiment. Such an association of BELTs and numerals according to one particular embodiment is illustrated in detail below.

According to a particular association embodiment, a composite numeral may be represented by individual BELTs and/or BELT portions corresponding with individual factors making up the composite numeral. Here, a "merger" operation may join the BELTs and/or BELT portions corresponding with the individual factors at a common root node to form the BELT and/or BELT portions corresponding with the composite numeral. Accordingly, such a merger operation of BELTs at a root node may correspond with multiplication of numerals corresponding with the merged BELTs. Without belaboring the discussion, such a merger operation is further illustrated in the aforementioned U.S. patent application Ser. No. 11/005,859, filed on Dec. 6, 2004, by J. J. LeTourneau, titled, "Manipulating Sets of Hierarchical Data."

Returning to process 2700, block 2720 may merge the BELT portions corresponding to these non-composite factors determined at block 2718, and any BELT portion corresponding to a power of two factor "w" of k, at the corresponding node in the resulting BELT. As illustrated in FIG. 31, by way of example, a node value of 1950 may be factored at block 2718 into non-composite numerals as follows:

$$1950 = 2 \times 3 \times 5 \times 5 \times 13$$

As may be observed from FIG. 28, according to the particular association embodiment illustrated in FIG. 27, the BELT portion corresponding to numeral 1950 comprises a merger of BELT portions corresponding to the individual non-composite factors 3, 5, 5 and 13. For the remaining factor "2," an additional node is connected by an edge having a label value associated with binary zero. Accordingly, it should be recognized for this particular embodiment that while block 2710 may attach $\log_2(k)+1$ nodes in the resulting BELT for a node label value power of two k, block 2720 may merge $\log_2(w)$ nodes for a power of two factor w of a composite node label value (with BELT portions representing non-composite factors greater than two).

Process 2700 should be understood to be merely illustrative of a particular process for generating BELT portions corresponding to node label values in a corresponding node labeled tree. In alternative embodiments, possible node label values may be associated in a look up table with corresponding BELT portions determined, at least in part, according to a particular association embodiment.

Regarding particular association embodiments, FIG. 27 shows that the number of nodes representing non-composite numerals may grow roughly logarithmically with respect to the corresponding non-composite numerals. Nevertheless, it should be understood that the association of non-composite numerals and BELTs as illustrated in FIG. 22 is merely an example of how non-composite numerals may be associated with BELTs in a particular embodiment, and that many other association embodiments may be used without departing from claimed subject matter. This particular association embodiment, however, makes use of an association of BELTs and natural numerals. FIG. 24 is a table illustrating a particular embodiment of an association between natural numerals BELTs. Here, the resulting BELTs may be used as tags corresponding to non-composite node label values associated with nodes in a node labeled tree and/or factors thereof. As illustrated in particular embodiments above, these tags are attached to corresponding nodes in the resulting BELT by edges having a label value associated with binary zero (in which a tag is connected by an edge having a label value associated with binary zero). It should be recognized that BELTs corresponding to numerals zero and one are used to represent tags corresponding to node label values zero and one as illustrated in FIG. 22. As illustrated in FIG. 24, the tags associated with non-composite node label values and/or factors three, five, seven, eleven and thirteen correspond with the BELTs associated with numerals two, three, four, five and six, respectively. This matches the association of non-composite numerals greater than two and BELT portions shown in FIG. 22

Such an association of BELTs and numerals as illustrated may be generated by an enumeration of BELTs and associating natural numerals to such enumerated BELTs. Thus, for this particular embodiment, although claimed subject matter is not limited in scope in this respect, a method of enumerating a set of trees begins with enumeration of an empty binary edge labeled tree and a one node binary edge labeled tree. Here, the empty tree is associated with the zero and has a symbolic representation as illustrated in FIG. 24 (circle). Likewise, the one node tree, which holds no data, is associated with the one and has a graphical representation of a single node. For higher positive natural numerals, however, this embodiment of a method of enumerating a set of trees comprises positioning a tree at location k, k being a positive numeral greater than three, in which k comprises the product of u and v, u and v comprising positive numerals greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural numeral greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary zero label is not in the enumeration at some position lower than j; however, if the binary edge labeled tree obtainable from that first tree, as just described, is present in the enumeration with a binary zero label for the new edge, but not with a binary "1" label, then the tree at position j is that tree with a binary "1" label for the new edge. This may be illustrated, for example in FIG. 24, as described in more detail below.

For a particular embodiment, although claimed subject matter is not limited in scope in this respect, a method of enumerating a set of ordered trees may begin with enumeration of an empty binary edge labeled tree and a one node binary edge labeled tree. Thus, the empty tree is associated with the zero and has a symbolic representation as illustrated in FIG. 24 (circle). Likewise, the one node tree, which holds no data, is associated with the one and has a graphical representation of a single node. For higher positive natural numerals, ordered trees may be generated by a process described, for example, in "The Lexicographic Generation of Ordered Trees," by S. Zaks, The Journal of Theoretical Computer Science, Vol. 10(1), pp. 63-82, 1980; or Enumerating Ordered Trees Lexicographically," by M. C. Er, Computation Journal, Vol. 28, Issue 5, pp. 538-542, 1985.

As illustrated, for this particular embodiment, and as previously described, the empty tree has zero nodes and is associated with the zero. Likewise, the one node tree root comprises a single node and is associated with the one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree is positioned at location k, then a non-composite numeral is associated with the zero-push of that tree and a non-composite numeral is associated with the one-push for that tree. Furthermore, the non-composite index of the zero-push of the tree comprises 2k−1, whereas the non-composite index of the one-push of the tree comprises 2k, where the index corresponds to argument of the aforementioned well-known Kleene enumeration on positive natural numerals of non-composite numerals. Here, a zero-push of a tree associated with natural numeral k provides a tree associated with P(2k−1) and a one-push of the tree associated with natural numeral k provides a tree associated with P(2k). Thus, referring again to FIG. 24, the one-push of the root tree is the tree at position three. This follows from FIG. 24 since P(2*1)=P(2)=3. Likewise, the tree at position five is the zero-push of the tree at position 2. Again, this follows since P(2*2−1)=P(3)=5.

The embodiments illustrate in FIGS. 14 through 20 involve connecting tags (BELT portions representing node label values and/or factors thereof) to unlabeled nodes by edges having a label value associated with binary zero and assign an edge label value associated with binary one to the remaining edges in the resulting BELT. In alternative embodiments, however, such edges connecting tags may have a label value associated with binary one with the remaining edges having a label value associated with binary zero, although claimed subject matter is not limited in these respects.

Also, the transformations illustrated above with reference to FIGS. 14 through 20 are particularly directed to transforming an unlabeled tree and/or a node labeled tree to a BELT. However, it should be recognized that, as a BLT may essentially be represented as either a BELT or a BNLT, such techniques illustrated herein would equally apply to the representation of hierarchical data of an unlabeled tree and/or node labeled tree in a BNLT.

It will, of course, be understood that, although particular embodiments have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

APPENDIX I

| | A | B | C | D | E | F | G |
|---|---|---|---|---|---|---|---|
| 1 | 2 | 233 | 547 | 877 | 1229 | 1597 | 1993 |
| 2 | 3 | 239 | 557 | 881 | 1231 | 1601 | 1997 |
| 3 | 5 | 241 | 563 | 883 | 1237 | 1607 | 1999 |
| 4 | 7 | 251 | 569 | 887 | 1249 | 1609 | 2003 |
| 5 | 11 | 257 | 571 | 907 | 1259 | 1613 | 2011 |
| 6 | 13 | 263 | 577 | 911 | 1277 | 1619 | 2017 |
| 7 | 17 | 269 | 587 | 919 | 1279 | 1621 | 2027 |
| 8 | 19 | 271 | 593 | 929 | 1283 | 1627 | 2029 |

APPENDIX I-continued

| A | B | C | D | E | F | G |
|---|---|---|---|---|---|---|
| 9 | 23 | 277 | 599 | 937 | 1289 | 1637 | 2039 |
| 10 | 29 | 281 | 601 | 941 | 1291 | 1657 | 2053 |
| 11 | 31 | 283 | 607 | 947 | 1297 | 1663 | 2063 |
| 12 | 37 | 293 | 613 | 953 | 1301 | 1667 | 2069 |
| 13 | 41 | 307 | 617 | 967 | 1303 | 1669 | 2081 |
| 14 | 43 | 311 | 619 | 971 | 1307 | 1693 | 2083 |
| 15 | 47 | 313 | 631 | 977 | 1319 | 1697 | 2087 |
| 16 | 53 | 317 | 641 | 983 | 1321 | 1699 | 2089 |
| 17 | 59 | 331 | 643 | 991 | 1327 | 1709 | 2099 |
| 18 | 61 | 337 | 647 | 997 | 1361 | 1721 | 2111 |
| 19 | 67 | 347 | 653 | 1009 | 1367 | 1723 | 2113 |
| 20 | 71 | 349 | 659 | 1013 | 1373 | 1733 | 2129 |
| 21 | 73 | 353 | 661 | 1019 | 1381 | 1741 | 2131 |
| 22 | 79 | 359 | 673 | 1021 | 1399 | 1747 | 2137 |
| 23 | 83 | 367 | 677 | 1031 | 1409 | 1753 | 2141 |
| 24 | 89 | 373 | 683 | 1033 | 1423 | 1759 | 2143 |
| 25 | 97 | 379 | 691 | 1039 | 1427 | 1777 | 2153 |
| 26 | 101 | 383 | 701 | 1049 | 1429 | 1783 | 2161 |
| 27 | 103 | 389 | 709 | 1051 | 1433 | 1787 | 2179 |
| 28 | 107 | 397 | 719 | 1061 | 1439 | 1789 | 2203 |
| 29 | 109 | 401 | 727 | 1063 | 1447 | 1801 | 2207 |
| 30 | 113 | 409 | 733 | 1069 | 1451 | 1811 | 2213 |
| 31 | 127 | 419 | 739 | 1087 | 1453 | 1823 | 2221 |
| 32 | 131 | 421 | 743 | 1091 | 1459 | 1831 | 2237 |
| 33 | 137 | 431 | 751 | 1093 | 1471 | 1847 | 2239 |
| 34 | 139 | 433 | 757 | 1097 | 1481 | 1861 | 2243 |
| 35 | 149 | 439 | 761 | 1103 | 1483 | 1867 | 2251 |
| 36 | 151 | 443 | 769 | 1109 | 1487 | 1871 | 2267 |
| 37 | 157 | 449 | 773 | 1117 | 1489 | 1873 | 2269 |
| 38 | 163 | 457 | 787 | 1123 | 1493 | 1877 | 2273 |
| 39 | 167 | 461 | 797 | 1129 | 1499 | 1879 | 2281 |
| 40 | 173 | 463 | 809 | 1151 | 1511 | 1889 | 2287 |
| 41 | 179 | 467 | 811 | 1153 | 1523 | 1901 | 2293 |
| 42 | 181 | 479 | 821 | 1163 | 1531 | 1907 | 2297 |
| 43 | 191 | 487 | 823 | 1171 | 1543 | 1913 | 2309 |
| 44 | 193 | 491 | 827 | 1181 | 1549 | 1931 | 2311 |
| 45 | 197 | 499 | 829 | 1187 | 1553 | 1933 | 2333 |
| 46 | 199 | 503 | 839 | 1193 | 1559 | 1949 | 2339 |
| 47 | 211 | 509 | 853 | 1201 | 1567 | 1951 | 2341 |
| 48 | 223 | 521 | 857 | 1213 | 1571 | 1973 | 2347 |
| 49 | 227 | 523 | 859 | 1217 | 1579 | 1979 | 2351 |
| 50 | 229 | 541 | 863 | 1223 | 1583 | 1987 | 2357 |

What is claimed is:

1. A method, comprising:
accessing instructions from one or more physical memory devices for execution by one or more processors;
executing instructions accessed from the one or more physical memory devices by the one or more processors;
storing, in at least one of the physical memory devices, signal values resulting from having executed the instructions on the one or more processors;
wherein the accessed instructions to transform between a tree and an array of numerical signal values; and
wherein executing the transformation instructions further comprising:
transforming the tree to the array of numerical signal values, based at least in part on a unique mapping between tree structures and numerical signal values, the array of numerical signal values comprising one or more rows and columns of numerical signal values and an associated index for the one or more rows and columns of numerical signal values;
performing manipulation of the tree, wherein the performing manipulation of the tree comprises processing the array of numerical signal values to yield an updated array of numerical signal values, the updated array of numerical signal values utilizing less storage space in the one or more physical memory devices than the array of numerical signal values;
storing the updated array of numerical signal values in the one or more physical memory devices; and
generating a resulting tree, wherein the generating the resulting tree comprises transforming the updated array of numerical signal values to an updated tree, based at least in part on the unique mapping between the tree structures and numerical signal values.

2. The method of claim 1, wherein the updated array of numerical signal values comprises a condensed array of numerical signal values representing the tree in a compressed format.

3. The method of claim 1, wherein executing the accessed transformation instructions further comprises: associating numerical label values with at least some nodes and/or edges in the tree; and associating label values with at least some parent nodes of child nodes based, at least in part, on non-composite numerical signal values derived, at least in part, from label values associated with the child nodes.

4. The method of claim 3, wherein executing the accessed transformation instructions further comprises pruning the child nodes.

5. The method of claim 3, wherein a numerical label value associated with at least one of the parent nodes is based, at least in part, on a combination of non-composite numerical signal values derived, at least in part, from label values associated with the child nodes.

6. The method of claim 3, wherein executing the accessed transformation instructions further comprises determining the non-composite numerical signal values from an array of non-composite numerical signal values indexed by sequential indices.

7. The method of claim 1, wherein executing the accessed transformation instructions further comprises representing a parent node as a product of factors associated with one or more subtrees of the parent node.

8. The method of claim 1, wherein the transforming the tree to the array of numerical signal values comprises using digital signal values, responsive to executing the accessed transformation instructions, to select one or more numerical label values for portions of the tree and wherein the tree comprises a complex two dimensional graphical hierarchy, the complex two dimensional graphical hierarchy being in the form of a tree hierarchy.

9. The method of claim 8, wherein executing the accessed transformation instructions further comprises associating a binary one or zero for at least one of a new node or a new edge of the tree hierarchy.

10. The method of claim 8, wherein executing the accessed transformation instructions further comprises determining that the tree hierarchy comprises a node labeled tree.

11. The method of claim 8, wherein the array of numerical signal values comprises a condensed array of numerical signal values fixed in one dimension.

12. The method of claim 11, wherein the condensed array of numerical signal values comprises a condensed multi-dimensional array.

13. The method of claim 8, wherein executing the accessed transformation instructions further comprises:
accessing from one or more memories, one or more digital signal values comprising numeral values representing at least a portion of the tree hierarchy based at least in part on a stored ordered association between numeral values and tree hierarchies;
wherein the transforming the tree hierarchy to a condensed array of numerical signal values comprises transforming between at least one of the one or more digital signal values comprising numeral values representing at least a portion of the tree hierarchy; and associating the at least one of the one or more digital signal values to represent one or more non-composite numerical signal values from the numeral values with at least one of a node or an edge of the tree hierarchy.

14. The method of claim 6, wherein executing the accessed transformation instructions further comprises:

deriving one or more additional digital signal values to represent one or more non-composite numerical signal values from the numeral values to be associated with the at least one of the node or the edge of the tree; and associating the one or more additional digital signal values to represent a numerical label value with a parent node of the at least one node of the tree to be based, at least in part, on the derived one or more additional signal values to represent one or more non-composite numerical signal values.

15. An apparatus comprising:

means for accessing instructions from one or more physical memory devices for execution by one or more processors; means for executing instructions accessed from the one or more physical memory devices by the one or more processors; means for storing, in at least one of the physical memory devices, signals values resulting from having executed the instructions on the one or more processors; wherein the accessed instructions to transform between a tree and an array of numerical signal values; and wherein the means for executing the transformation instructions comprises:

means for transforming the tree to the array of numerical signal values, based at least in part on a unique mapping between tree structures and numerical signal values, the array of numerical signal values comprising one or more rows and columns of numerical signal values and an associated index for the one or more rows and columns of numerical signal values;

means for performing manipulation of the tree, wherein the performing manipulation of the tree comprises processing the array of numerical signal values to yield an updated array of numerical signal values, the updated array of numerical signal values utilizing less storage space in the one or more physical memory devices than the array of numerical signal values;

means for storing the updated array of numerical signal values in a memory of the apparatus; and means for generating a resulting tree, wherein the generating the resulting tree comprises transforming the updated array of numerical signal values to an updated tree, based at least in part on the unique mapping between the tree structures and numerical signal values.

16. The apparatus of claim 15, wherein the updated array of numerical signal values comprises a condensed array of numerical signal values representing the tree in a compressed format.

17. The apparatus of claim 15, wherein the means for executing the accessed transformation instructions further comprises: means for associating numerical label values with at least some nodes and/or edges in the tree; and means for associating label values with at least some parent nodes of child nodes based, at least in part, on non-composite numerical signal values derived, at least in part, from label values associated with the child nodes.

18. An article comprising:

a non-transitory storage medium comprising instructions stored thereon;

wherein the instructions being accessible from the non-transitory storage medium to store as physical memory states on one or more physical memory devices, the one or more physical memory devices coupled to one or more processors able to execute the instructions stored as physical memory states, the one or more physical memory devices also able to store binary digital signal quantities, if any, as physical memory states, that are to result from execution of the instructions on the one or more processors, wherein the executable instructions to transform between a tree and an array of numerical signal values; and wherein the transformation instructions further to:

transform the tree to the array of numerical signal values, based at least in part on a unique mapping between tree structures and numerical signal values, the array of numerical signal values comprising one or more rows and columns of numerical signal values and an associated index for the one or more rows and columns of numerical signal values;

perform manipulation of the tree to process the array of numerical signal values to yield an updated array of numerical signal values, the updated array of numerical signal values to utilize less storage space in the one or more physical memory devices than the array of numerical signal values;

store the updated array of numerical signal values in a memory of the computing device; and generate a resulting tree and wherein to generate the resulting tree is to comprise transformation of the updated array of numerical signal values to an updated tree, to be based at least in part on the unique mapping between the tree structures and numerical signal values.

19. The article of claim 18, the transformation instructions being further executable by the one or more processors to: associate numerical label values with at least some nodes and/or edges in the tree; and associate label values with at least some parent nodes of child nodes based, at least in part, on non-composite numerical signal values derived, at least in part, from label values associated with the child nodes.

20. The article of claim 19, the transformation instructions being further executable by the one or more processors to prune child nodes.

21. The article of claim 19, wherein a numerical label value associated with at least one of the parent nodes is to be based, at least in part, on a combination of non-composite numerical signal values to be derived, at least in part, from label values to be associated with the child nodes.

22. The article of claim 19, the transformation instructions being further executable by the one or more processors to determine the non-composite numerical signal values from an array of non-composite numerical signal values indexed by sequential indices.

23. The article of claim 18, the transformation instructions being further executable by the one or more processors to represent a parent node as a product of factors associated with one or more subtrees of the parent node.

24. An apparatus comprising:

one or more processors coupled to one or more physical memory devices to store executable instructions and to store binary digital storage quantities as physical memory states, wherein the executable instructions being accessible from the one or more physical memory devices for execution by one or more processors; and the one or more processors able to store in at least one of the physical memory devices, binary digital signal quantities, if any, that are to result from execution of the instructions on the one or more processors, wherein the accessed executable instructions to transform between a tree and an array of numerical signal values; and wherein the transformation instructions further to:

transform the tree to the array of numerical signal values, based at least in part on a unique mapping between tree structures and numerical signal values, the array of numerical signal values comprising one or more rows and columns of numerical signal values and an associated index for the one or more rows and columns of numerical signal values;

perform manipulation of the tree to process the array of numerical signal values to yield an updated array of numerical signal values, the updated array of numerical signal values to utilize less storage space in the one or more physical memory devices than the array of numerical signal values;

store the updated array of numerical signal values in a memory of the computing device; and generate a resulting tree and wherein to generate the resulting tree is to comprise transformation of the updated array of numerical signal values to an updated tree, to be based at least in part on the unique mapping between the tree structures and numerical signal values.

* * * * *